United States Patent
Smith et al.

(10) Patent No.: US 6,968,711 B2
(45) Date of Patent: *Nov. 29, 2005

(54) TEMPERATURE CONTROLLED SHIPPING CONTAINERS

(75) Inventors: Douglas M. Smith, Albuquerque, NM (US); Tamara L. O'Brien, Houston, TX (US); Kevin H. Roderick, Albuquerque, NM (US); Lois X. Warren, Bernalillo, NM (US); Richard G. Perkes, Stewkley (GB); Vanessa Sinclair, Leighton Buzzard (GB); Quentin Shrimpton, Bucknell (GB)

(73) Assignee: Nanopore, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/165,753

(22) Filed: Jun. 6, 2002

(65) Prior Publication Data

US 2003/0014994 A1 Jan. 23, 2003

Related U.S. Application Data

(63) Continuation-in-part of application No. 09/970,094, filed on Oct. 2, 2001, now Pat. No. 6,688,132, and a continuation-in-part of application No. 09/876,841, filed on Jun. 6, 2001, now Pat. No. 6,584,797.

(51) Int. Cl.[7] ............................. F25D 3/08; F17C 13/00; F25B 21/00; F25B 17/08

(52) U.S. Cl. ............................. 62/371; 62/480; 62/457.9

(58) Field of Search ............................. 62/371, 457.9, 62/457.7, 238.1, 238.3, 494, 476, 480, 101, 109

(56) References Cited

U.S. PATENT DOCUMENTS

| | | | |
|---|---|---|---|
| 2,088,276 A | 7/1937 | Nesselmann et al. | 62/118 |
| 3,894,538 A | 7/1975 | Richter | 128/260 |
| 4,048,810 A | 9/1977 | Zeilon | 62/101 |
| 4,205,531 A | 6/1980 | Brunberg et al. | 62/101 |
| 4,250,720 A | 2/1981 | Siegel | 62/480 |

(Continued)

FOREIGN PATENT DOCUMENTS

| | | | |
|---|---|---|---|
| DE | 4207857 A1 * | 9/1993 | B60H/1/32 |
| GB | 2095386 | 9/1982 | |
| WO | WO 89/00271 | 1/1989 | |

OTHER PUBLICATIONS

Pending U.S. Appl. No. 09/876,841; filed Jun. 6, 2001; Smith et al.
Pending U.S. Appl. No. 09/970,094; filed Oct. 2, 2001; Smith et al.
Pending U.S. Appl. No. 10/165,758; filed Jun. 6, 2002; Smith et al.
Pending U.S. Appl. No. 09/932,264; Entitled "Cooling Device"; Smith et al.; filed Aug. 17, 2001.
Pending U.S. Appl. No. 10/046,661; Entitled "Cooling Device"; Roderick; filed Oct. 26, 2001.
Pending U.S. Appl. No. 09/691,371; Entitled "Desiccant Composition"; Smith et al.; filed on Oct. 18, 2000.

*Primary Examiner*—Chen Wen Jiang
(74) *Attorney, Agent, or Firm*—Marsh Fischmann & Breyfogle LLP

(57) ABSTRACT

Novel sorption cooling devices capable of providing cooling over an extended period of time are disclosed. The sorption cooling devices are particularly useful for temperature-controlled shipping containers that are required to maintain a temperature below ambient for a time sufficient to complete delivery of the container and its contents. The shipping containers can be utilized to cost-effectively transport temperature-sensitive products.

65 Claims, 45 Drawing Sheets

U.S. PATENT DOCUMENTS

| | | | |
|---|---|---|---|
| 4,736,599 A | 4/1988 | Siegel | 62/294 |
| 4,742,868 A | 5/1988 | Mitani et al. | 165/104.12 |
| 4,752,310 A | 6/1988 | Maier-Laxhuber et al. | 62/4 |
| 4,759,191 A | 7/1988 | Thomas et al. | 62/101 |
| 4,928,495 A | 5/1990 | Siegel | 62/4 |
| 5,038,581 A | 8/1991 | Maier-Laxhuber et al. | 62/457.9 |
| 5,048,301 A | 9/1991 | Sabin et al. | 62/101 |
| 5,088,302 A | 2/1992 | Tomizawa et al. | 62/480 |
| 5,186,020 A | 2/1993 | Rockenfeller et al. | 62/457.9 |
| 5,269,293 A | 12/1993 | Loser et al. | 128/204.15 |
| 5,291,942 A | 3/1994 | Ryan | 165/104.12 |
| 5,309,985 A | 5/1994 | Erickson | 165/104.12 |
| 5,318,540 A | 6/1994 | Athayde et al. | 604/141 |
| 5,355,684 A | 10/1994 | Guice | 62/54.2 |
| 5,440,896 A | 8/1995 | Maier-Laxhuber et al. | 62/269 |
| 5,628,205 A | 5/1997 | Rockenfeller et al. | 62/480 |
| 5,660,049 A | 8/1997 | Erickson | 62/107 |
| 5,666,819 A * | 9/1997 | Rockenfeller et al. | 62/480 |
| 5,802,870 A | 9/1998 | Arnold et al. | 62/480 |
| 5,816,069 A | 10/1998 | Ebbeson | 62/457.9 |
| 5,881,573 A * | 3/1999 | Ebbeson | 62/480 |
| 5,924,302 A | 7/1999 | Derifield | 62/457.2 |
| 5,943,876 A | 8/1999 | Meyer et al. | 62/371 |
| 5,950,450 A | 9/1999 | Meyer et al. | 62/457.9 |
| 6,192,703 B1 | 2/2001 | Salyer et al. | 62/457.7 |
| 6,438,992 B1 | 8/2002 | Smith et al. | 62/480 |
| 6,584,797 B1 * | 7/2003 | Smith et al. | 62/371 |

* cited by examiner

TEMPERATURE CONTROLLED SHIPPING CONTAINERS

CROSS-REFERENCE TO RELATED APPLICATIONS

This application claims priority and is a continuation in part to U.S. patent application Ser. No. 09/876,841 filed Jun. 6, 2001 now U.S. Pat. No. 6,584,797 and U.S. patent application Ser. No. 09/970,094 filed Oct. 2, 2001 now U.S. Pat. No. 6,688,132. Each of these U.S. Patent Applications is incorporated herein by reference in its entirety.

BACKGROUND OF THE INVENTION

1. Field of the Invention

The present invention is directed to improved sorption cooling devices and methods for using sorption cooling devices. In particular, the present invention is directed to sorption cooling devices that are particularly adapted to maintain a reduced temperature within an enclosed container for an extended period of time. The cooling devices are particularly useful for temperature-controlled shipping containers that must maintain a temperature below ambient for extended time periods, such as from 1 hour to about 120 hours, or more.

2. Description of Related Art

The shipment of products that must have their temperature maintained within a specific range below ambient is one of the fastest growing market segments in the modern shipping industry. This growth is driven by a number of factors including widespread concerns about safety in the cold food distribution chain, increasing numbers of pharmaceutical and life sciences products which must have their temperature maintained within certain limits, the rapid growth in high-value specialty chemicals such as those used in the semiconductor industry, the increasing number of sophisticated medical tests which require the shipment of patient specimens to an external laboratory, the increased number of clinical trials associated with new pharmaceutical discovery and the increased delivery of products directly to the customer as a result of Internet ordering.

This field is generally referred to as controlled temperature packaging (CTP). TP can be segmented by the target temperature range, namely: frozen (below 0° C.); 2° to 8° C.; and less than ambient (e.g., less than 30° C). In addition, CTP may be segmented by container size, namely: greater than pallet; one cubic foot to pallet; and less than one cubic foot. Containers having a size greater than pallet are typically cooled by mechanical refrigeration and the shipment times are typically from days to many weeks. The one cubic foot to pallet size segment is dominated by systems using ice (e.g., gel packs) and/or dry ice as a coolant wherein the containers are insulated using expanded polystyrene (EPS). The market segment for containers less than one cubic foot in size is very limited due to an unmet need for a small, lightweight cooling mechanism.

Although many basic ice/EPS systems are in use, there is a wide variation in quality and performance of the packaging depending on the value of the product and the sensitivity of the product to temperature fluctuation. A relatively simple system includes a cardboard box into which EPS sheets have been cut and placed. The container is then filled with dry ice in which, for example, frozen fish is shipped. A more sophisticated approach is a validated system consisting of custom molded EPS forms in a rigid box with both frozen and warm gel packs, the combination of which has been tested through a range of temperature cycles for specified thermal properties. Such a validated system can be used for shipping pharmaceuticals. For example, many pharmaceutical products such as vaccines and antibodies must be maintained within a range of 2° C. to 8° C.

The existing ice/EPS cooling system is unsatisfactory for various reasons including: increased environmental concerns associated with the disposal of large quantities of EPS and gel packs; the high cost of shipping; and the required freezers at the shipping source to maintain the frozen packs. The high cost of shipping is directly related to the high volume associated with the EPS and the high volume and mass associated with the gel packs. For a one cubic foot box with a 60 hour lifetime at 2° C. to 8° C., over 90 percent of the volume is consumed by EPS and gel packs. Some reduction in volume and shipping costs may be obtained by using vacuum insulation panels (VIPs), but the high cost of VIPs has precluded significant market penetration.

An example of the foregoing system is illustrated in U.S. Pat. No. 5,924,302 by Derifield issued on Jul. 20, 1999. This patent illustrates a shipping container that includes a plurality of cavities adapted to receive a coolant (e.g., gel packs) that surround a cavity adapted to receive an item to be shipped.

Electrically cooled shipping containers are illustrated in U.S. Pat. No. 6,192,703 by Salyer et al., issued on Feb. 27, 2001. This patent discloses a portable refrigerator unit and storage container employing vacuum insulation panels and a phase change material. Phase change materials undergo a change in physical form (e.g., solid to liquid) thereby absorbing heat from the surrounding environment. A battery driven refrigeration system provides cooling of the shipping container.

The use of reactor-based rechargeable portable coolers are illustrated in U.S. Pat. No. 5,186,020 by Rockenfeller et al., issued on Feb. 16, 1993. This patent discloses a portable cooler utilizing a gas-liquid-gas phase change to effect cooling of chamber. However, the reactor-based apparatus disclosed by Rockenfeller et al. requires a source of electricity to effect the initial gas-liquid phase change. As a result, the apparatus occupies additional space and has additional weight, making it cost-ineffective and severely impairing its utility either for a single-use basis or for a shipping container.

A sorption cooler is illustrated in U.S. Pat. No. 5,048,301 by Sabin et al. This patent discloses a sorption cooling unit where the cooling liquid is maintained in the evaporator prior to the sorption process. A disadvantage of this device is that too much energy is consumed by having to cool the cooling liquid in the evaporator upon activation of the sorption unit. Space is also wasted in that the evaporator will require a relatively large volume to enable an efficient evaporation process because both the liquid and evaporation volume are located in the same general space. Furthermore, space limitations restrict the amount of cooling liquid that may be maintained in the evaporator.

Thus, there is a need for a temperature-controlled container, such as a shipping container, having a lightweight cooling device that does not occupy a large volume. It would also be advantageous if the temperature of the container was controllable over a range of temperatures. It would also be advantageous if the cooling device had the ability to maintain the reduced temperature for an extended period of time. It would also be advantageous if the cooling device could be used cost effectively on a single-use basis.

SUMMARY OF THE INVENTION

The present invention is directed to sorption cooling devices and temperature-controlled containers incorporating sorption cooling devices, particularly temperature-controlled shipping containers for the transportation of temperature sensitive products.

The sorption cooling devices according to the present invention provide numerous advantages over sorption cooling devices utilized in the prior art. According to one embodiment, a sorption cooling device includes a liquid supply apparatus that is responsive to changes in the ambient temperature. The apparatus includes a rigid housing, a first flexible pouch disposed within the rigid housing that contains a high vapor pressure substance, a second flexible pouch enclosing a supply liquid and disposed within the rigid housing adjacent to the first flexible pouch and a liquid conduit for providing liquid communication between the second pouch and an evaporator. The high vapor pressure substance causes the first flexible pouch to exert pressure on the second flexible pouch and assist in the flow of liquid from second flexible pouch to the liquid conduit. Increases in temperature increase the vapor pressure within the first flexible pouch, thereby increasing the flow rate of the liquid and the cooling rate.

According to another embodiment, a sorption cooling device is provided that includes absorber, and evaporator, a vapor passageway disposed between the evaporator and absorber to direct vapor from the evaporator to the absorber and a reservoir adapted to supply refrigerant liquid to the evaporator. The reservoir includes a rigid housing, a first flexible pouch disposed within the rigid housing and enclosing a high vapor pressure substance, a second flexible pouch disposed within the rigid housing and adjacent to the first flexible pouch that encloses a refrigerant liquid and a liquid conduit for providing liquid communication between the second flexible pouch and the evaporator. The high vapor pressure substance causes the first flexible pouch to exert pressure on the second flexible pouch to assist in the flow of refrigerant liquid from the second flexible pouch to the liquid conduit.

According to another embodiment of the present invention, a sorption cooling device is provided including an evaporator, an absorber adapted to absorb vapor from the evaporator, a first reservoir adapted to contain a first refrigerant liquid, a second reservoir adapted to contain a second refrigerant liquid, means for supplying liquid from the first reservoir to the evaporator at a first liquid flow rate and means for supplying liquid from the second reservoir to the evaporator at a second liquid flow rate, wherein the first liquid flow rate is faster than the second liquid flow rate. The first reservoir can quickly provide the evaporator with refrigerant liquid to initiate cooling while the second reservoir maintains the cooling over an extended period of time.

According to yet another embodiment of the present invention, a method for operating a sorption cooling device is provided. The sorption cooling device includes an evaporator and absorber. A first portion of liquid is provided to the evaporator and a first liquid supply rate and a second portion of liquid is provided to the evaporator at a second liquid supply rate that is lower than the first liquid supply rate. This enables the sorption cooling device to rapidly cool during an initial stage and maintain cooling over an extended period of time.

According to another embodiment of the present invention, a sorption cooling device is provided that includes an evaporator for providing cooling, absorber adapted to absorb vapor formed in the evaporator, at least first reservoir adapted to contain a refrigerant liquid and supply the refrigerant liquid to the evaporator, a refrigerant liquid disposed in the first reservoir and a flow restriction device disposed between the refrigerant liquid and the evaporator to restrict flow of refrigerant liquid to the evaporator. By restricting the flow of liquid to the evaporator, the cooling provided by the sorption cooling device can be extended over a long period of time.

According to another embodiment of the present invention, a sorption cooling device is provided that includes an evaporator for providing cooling, absorber adapted to absorb vapor formed in the evaporator, a liquid reservoir adapted to contain a refrigerant liquid and supply the liquid to the evaporator and a freezing point suppression agent within the evaporator that is adapted to lower the freezing point of the refrigerant liquid when the refrigerant liquid is fed to the evaporator. Examples of useful freezing point suppression agents include salts sodium chloride, calcium chloride and similar salts.

According to another embodiment of the present invention, a sorption cooling device is provided that includes an evaporator for providing cooling, an absorber adapted to absorb vapor formed in the evaporator and vapor passageway adapted to permit vapor flow from the evaporator to the absorber. The vapor passageway includes a thermally insulating material heading a thermal resistance of at least about 2.8 K·m$^2$/W. Accordingly, heat generated in the absorber is thermally isolated from the evaporator, enhancing the cooling capability of the sorption cooling device.

According to another embodiment of the present invention, a sorption cooling device is provided including an evaporator having a cooling surface, an absorber adapted to absorb vapor formed in the evaporator and a vapor passageway disposed between the evaporator and absorber. The absorber includes a desiccant and a thermally conductive material disposed within the desiccant, wherein the thermally conductive material has a higher thermal conductivity than the desiccant. The higher thermal conductivity material enhances the ability of the absorber to transfer heat away from the evaporator, thereby enhancing the cooling ability of the sorption cooling device.

The present invention is also directed to temperature-controlled containers incorporating sorption cooling devices, such as temperature-controlled shipping containers. According to one embodiment, a temperature controlled container is provided that includes a bottom container portion having a bottom wall in at least a first sidewall defining a cavity adapted to contain a product therein. A top container portion includes a top surface and a bottom surface and is adapted to combine with a bottom container portion to define a product cavity, the top container portion forming the top wall of the container. A sorption cooling device is disposed in the top portion wherein the cooling surface of the evaporator is adapted to provide cooling to the product cavity.

According to another embodiment of the present invention, a temperature-controlled shipping container is provided that includes at least a sidewall and top and bottom walls defining a cavity adapted to contain a product within the cavity. A sorption cooling device is incorporated in the container that is adapted to cool the cavity. The sorption cooling device includes an evaporator in thermal communication with the cavity, an absorber adapted to absorb vapor formed in the evaporator, a vapor passageway disposed between the absorber and evaporator and a reservoir adapted supply refrigerant liquid to the evaporator wherein a vapor pressure within the reservoir causes the flow rate of refrigerant liquid to increase in response to an increase in ambient temperature. The reservoir can include a rigid housing, a first flexible pouch disposed within the rigid housing and enclosing high vapor pressure substance within the first flexible pouch and a second flexible pouch disposed within the rigid housing adjacent to the first flexible pouch and enclosing a refrigerant liquid. A liquid conduit is provided for liquid communication between second flexible pouch and the evaporator. The high vapor pressure substance causes the first flexible pouch to exert pressure on the second flexible pouch to assist the flow of refrigerant liquid to the liquid conduit.

According to another embodiment, a temperature controlled container is provided that includes a container heading at least a sidewall and top and bottom walls defining a cavity adapted to contain a product therein, the sorption cooling device having an evaporator, an absorber and a vapor passageway disposed between the evaporator and the absorber wherein the evaporator is disposed in thermal communication with the cavity to provide cooling to the cavity and a liquid reservoir adapted to provide liquid to the evaporator upon activation of the sorption cooling device.

According to another embodiment, a temperature-controlled shipping container is provided that includes an insert having top, bottom and sidewalls defining a cavity within the insert and a sorption cooling unit incorporated in the insert wherein the sorption cooling unit includes an evaporator positioned adjacent to the cavity to provide cooling to cavity. A container substantially encloses the insert.

According to another embodiment of the present invention, a temperature controlled shipping container is provided that includes a container having at least sidewall and top and bottom walls defining a cavity that is adapted to contain a product therein. A sorption cooling device is incorporated in the temperature-controlled shipping container that includes a liquid reservoir, an evaporator in thermal communication with the cavity to provide cooling to the cavity, an absorber which is thermally isolated from the cavity and means for supplying liquid from the reservoir to the evaporator upon activation of the device.

The present invention also provides a method for transporting a product that requires cooling. The method includes the steps of placing the product within a product cavity defined by at least top and bottom walls, placing a sorption cooling device in thermal communication with the cavity whereby the sorption cooling device is adapted to cool the cavity upon activation of the device, activating the sorption cooling device to initiate cooling of the cavity, transporting the product contained in the cavity from a first location to second location and removing the product from the cavity.

DESCRIPTION OF THE INVENTION

The present invention is generally directed to sorption cooling devices and, in a particularly preferred embodiment, is directed to temperature-controlled containers incorporating one or more sorption cooling devices that enable the internal cavity of the container to be maintained at a reduced temperature. Such containers are particularly useful as shipping containers for the transport of a variety of goods that are sensitive to ambient temperature conditions.

When the sorption cooling device is incorporated into a shipping container, the goods to be transported can be placed within a product cavity that is defined by the shipping container. The shipping container can be in the form of a traditional box, a cylindrical tube, a shipping envelope or virtually any other form that is useful for transporting goods. The sorption cooling devices of the present invention enable a wide range of container sizes to be used from very small (e.g., down to several cubic inches) up to pallet size (e.g., to over 100 cubic feet). The sorption cooling device is then placed in thermal communication with the product cavity to provide cooling to the goods contained within the cavity. The device can be activated prior to placement near the product cavity or at some time after placement. Cooling can continue in a well-controlled manner to maintain the desired temperature (e.g., not greater than about 8° C.) for an extended time period of up to about 120 hours or more, such as from about 24 to about 72 hours, to enable the goods to arrive at their destination without being subjected to temperatures in excess of a desired maximum temperature.

The fundamental operation of a sorption cooling device is well known. The boiling point of a liquid can be lowered by reducing the pressure over the liquid, such as by placing the liquid in a vacuum. A liquid, for example water, that is under a substantially reduced pressure will boil and absorb heat from the surrounding environment. This absorption of heat creates the desired cooling affect. To prevent the development of high vapor pressure over the boiling liquid, which would stop the boiling of the liquid, the vapor that is generated must be continuously removed and the removal of the vapor must be done without the introduction of outside air. Thus, an absorptive material, such as a desiccant, can be utilized to absorb the vapor and permit the liquid to continue boiling and absorbing heat from the environment. An example of a sorption cooling device is described in U.S. Pat. No. 4,250,720 by Siegel, which is incorporated herein by reference in its entirety.

Figure 1:
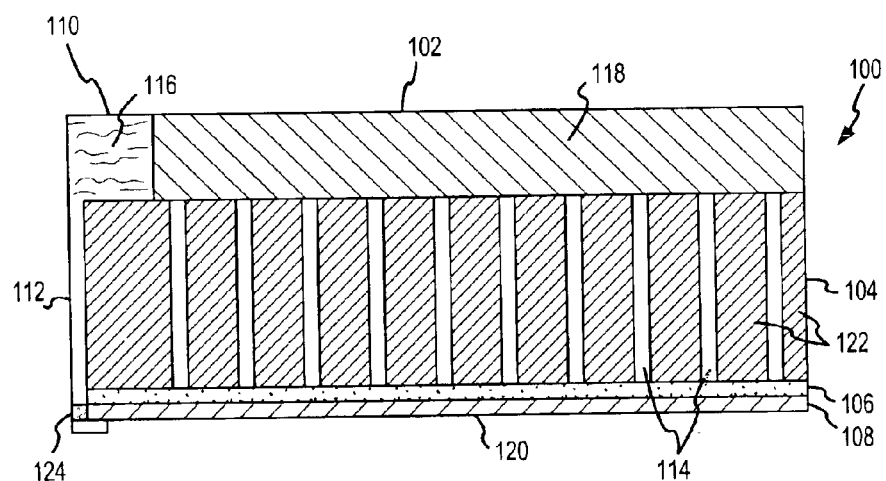
FIGS. 1 and 2 illustrate a cross-sectional view of a sorption cooling device in accordance with an embodiment of the present invention.
Figure 2:
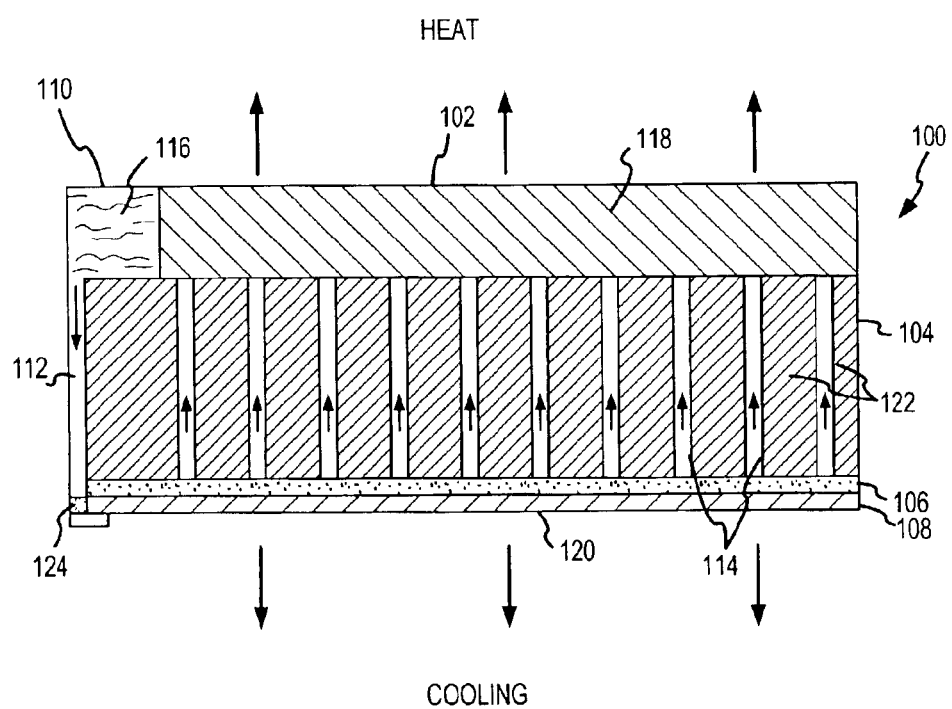
Figure 3:
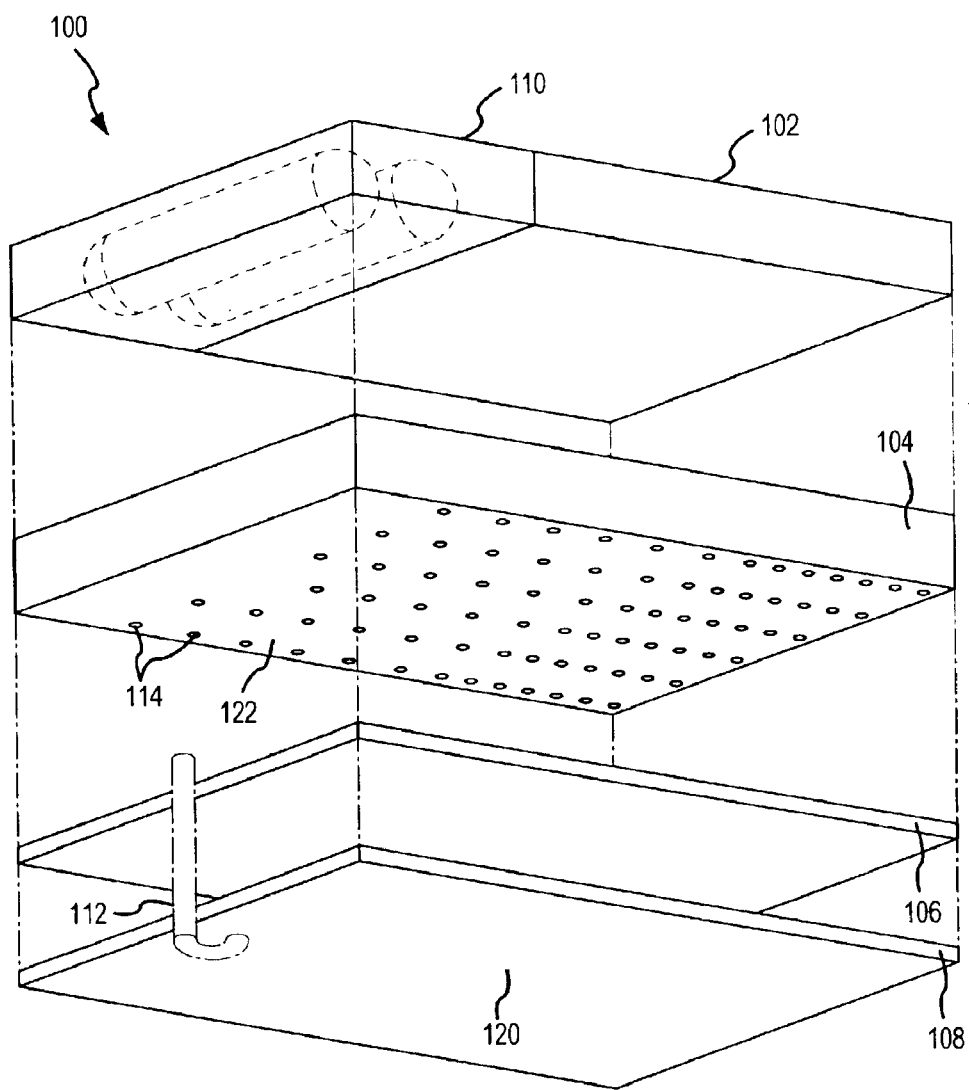
FIG. 3 illustrates an exploded view of a sorption cooling device in accordance with an embodiment of the present invention.

The sorption cooling device that is utilized for the temperature-controlled shipping container according to the present invention can have a variety of configurations. Preferred sorption cooling devices are relatively lightweight and do not occupy a large volume, leading to high cooling densities. FIGS. 1 and 2 illustrate a cross-sectional view of one such sorption cooling device that is preferred in accordance with an embodiment of the present invention and FIG. 3 illustrates an exploded view of the same cooling device. It will be appreciated that the physical dimensions of the various components illustrated in the Figures are not drawn to scale. The sorption cooling device 100 includes an absorber 102 containing an absorptive material such as desiccant 118 and an evaporator 108 that includes a cooling surface 120. A vapor passageway 104 is disposed between the evaporator 108 and absorber 102 to provide vapor communication between the evaporator 108 and absorber 102. The vapor passageway 104 includes a thermally insulative material 122 disposed between the evaporator 108 and absorber 102 and a plurality of apertures 114 through the thermally insulative material for vapor communication. A vapor permeable membrane 106 is disposed between the evaporator 108 and the vapor passageway 104. A liquid reservoir 110 containing a refrigerant liquid 116 is connected to the evaporator 108 by a liquid conduit 112. A flow restriction 124 can be disposed between the liquid 116 and the evaporator 108, such as in the liquid conduit 112.

Referring to FIG. 2, upon activation of the device 100, at least a portion of the refrigerant liquid 116 exits the liquid reservoir 110 and passes to the evaporator 108 by means of the liquid conduit 112. As the liquid 116 enters the evaporator 108, it will evaporate due to reduced pressure thereby causing the evaporator to take in heat from its surroundings at the cooling surface 120. The vapor formed in the evaporator 108 passes through the vapor permeable membrane 106, through the apertures 114 and is absorbed into the absorber 102. The vapor is absorbed by the desiccant 118 in the absorber 102 thereby causing heat to be generated in an amount greater than that taken in by the evaporator 108. The thermally insulative material 122 reduces the amount of heat that is transferred back to the evaporator 108 from the absorber 102.

In order for the liquid to boil in the evaporator 108, the sorption cooling device 100 is enclosed in an airtight enclosure (not illustrated) at a reduced internal pressure and preferably is maintained under a substantial vacuum. More particularly, the pressure within the enclosure surrounding the cooling device (i.e., the evaporator and absorber) is preferably not greater than about 20 mbar (15 torr), more preferably not greater than about 10 mbar (7.5 torr) and even more preferably not greater than about 4 mbar (3 torr). As is discussed in more detail below, the liquid reservoir 110 can be maintained at a higher pressure than the remainder of the sorption cooling device. To maintain the reduced pressure and to provide an adequate shelf life for the device, the sorption cooling device 100 is preferably enclosed in an impermeable casing material such as a metallized polyester film to prevent the leakage of gases into the device. In one embodiment, the sorption cooling device 100 is disposed in a semi-rigid, thermally-formed plastic tray and a metallized film is adhered to the top surface of the plastic tray to enclose the cooling device within the tray which is evacuated to a reduced pressure.

In operation, the liquid reservoir 110 is activated to release the liquid 116 to the evaporator 108. The liquid reservoir can have a higher pressure than the remainder of the cooling device to feed the liquid to the evaporator 108. For example, the liquid reservoir 110 can be a simple polymeric pouch exposed to ambient pressure that is punctured to release the liquid 116. Alternatively, a valving mechanism can be used to expose the liquid 116 to reduced pressure in the evaporator 108. In either case, the liquid is exposed to the evaporator 108 and is thereby exposed to a substantial drop in pressure causing the liquid to flow to the evaporator 108 and vaporize.

The temperature-controlled shipping containers in accordance with the present invention require that the product be cooled for an extended period of time, such as from 1 hour to 120 hours, to provide a sufficient amount of time for the product to reach its destination. To provide adequate cooling over a long period of time, there must either be a large quantity of refrigerant liquid initially present in the evaporator or additional liquid must be added to the evaporator over a period of time. If all of the liquid is stored in the evaporator (e.g., without a separate reservoir), then the entire volume of liquid must be cooled before the device can provide external cooling. Furthermore, there is a practical limit to the amount of liquid that can be stored in the evaporator. It is preferable for these and other reasons according to the present invention to maintain the liquid in a remote location (e.g., reservoir 110) and distribute the liquid to the evaporator in a controlled fashion and enable the sorption cooling device to provide cooling for an extended period of time.

The liquid feed rate from the liquid reservoir to the evaporator will be proportional to the pressure difference between the total pressure in the reservoir (i.e., the water vapor pressure plus the residual air pressure) and the pressure in the evaporator (i.e., water vapor pressure at the evaporator temperature and the residual air pressure after evacuation). To initiate a faster liquid feed rate when the sorption cooling device is first activated, a small amount of residual pressure can be incorporated in the reservoir. For example, the initial pressure in the reservoir housing can be from about 4 mbar (3 torr) to about 700 mbar (525 torr) and preferably is not greater than about 700 mbar (525 torr). When residual pressure is used, the total pressure in the reservoir will rapidly decrease as the liquid flows from the reservoir to the evaporator, decreasing the feed rate and thereby decreasing the cooling rate. This residual pressure is useful to initially bring the contents of a product cavity down to the desired temperature in a short period of time.

It will be appreciated that the liquid reservoir 110 can be located at virtually any position in relation to the remainder of the sorption cooling device, as long as fluid communication is provided from the reservoir 110 to the evaporator 108. According to one embodiment of the present invention, the reservoir is separated from the evaporator 108 by the thermally insulative material 122 and that the liquid reservoir 110 is disposed adjacent to the absorber 102. For example, the liquid reservoir 110 can be disposed adjacent to the absorber 102 in such a manner that the top of the liquid reservoir 110 and the top of the absorber 102 are substantially planar, creating a substantially flat top surface for the cooling device, as is illustrated in FIGS. 1 and 2. This configuration can simplify the incorporation of the device into a container having a flat external surface. In some instances it is not desired or required that all the liquid be supplied immediately or in an uncontrolled fashion to the evaporator. To restrict liquid flow between the evaporator 108 and liquid reservoir 110, a flow restriction device 124, as is discussed in more detail below, may be incorporated between the liquid 116 and the evaporator 108.

According to one embodiment of the present invention, the liquid reservoir is constructed such that the liquid feed rate from the reservoir to the evaporator varies automatically in response to changes in the ambient temperature. As a result, the cooling rate of the sorption cooling device also varies in response to changes in the ambient temperature. According to this embodiment, the refrigerant liquid is contained in a rigid housing and vapor pressure within the rigid housing drives and controls the liquid feed rate. When the reservoir is exposed to ambient conditions, small changes in the ambient temperature can produce a change in the vapor pressure, leading to a significant change in the liquid feed rate and therefore a change in the cooling rate. As used herein, the term ambient refers to the conditions (e.g., the temperature or pressure) surrounding the cooling device or surrounding the container into which the cooling device is incorporated.

According to this embodiment, a vapor pressure within a rigid housing and isolated from the ambient pressure conditions is used as a driving force for the liquid, as opposed to ambient pressure. Preferably; at least a portion of the reservoir is in thermal communication with the ambient environment so that the vapor pressure within the rigid housing will rise and fall with fluctuations in the ambient temperature. Further, the reservoir should be thermally isolated from the evaporator. To prevent ambient pressure from influencing the feed rate, the reservoir housing is sufficiently rigid to maintain the pressure difference between the interior and exterior of the housing. For example, the liquid can be contained directly within the rigid housing such that it is free to move about the internal cavity of the housing. As the ambient temperature increases, the temperature of the reservoir will increase and the vapor pressure over the liquid will increase, thereby causing the hydrostatic head pressure of the liquid to increase.

Figures 4A, 4B, 4C:
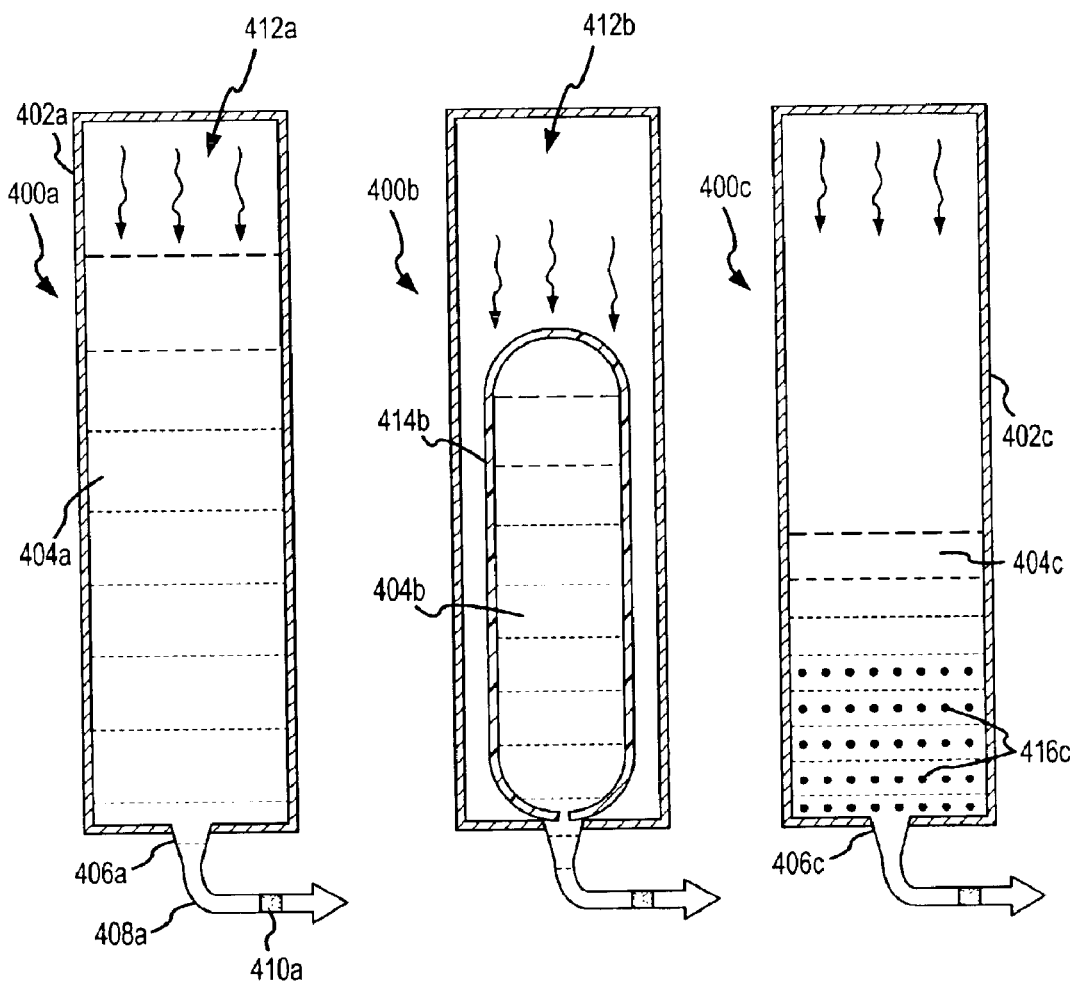
FIGS. 4a–4c illustrate various cross-sectional views of liquid reservoir systems for a sorption cooling device in accordance with an embodiment of the present invention.

FIG. 4a illustrates an example of this embodiment according to the present invention. The liquid supply reservoir 400a includes a rigid housing 402a with a refrigerant liquid 404a disposed within the rigid housing 402a. An outlet 406a connects the liquid reservoir 400a to a liquid conduit 408a which includes a flow restriction device 410a. The refrigerant liquid 404a has a vapor pressure that exerts pressure 412a on the liquid to influence the liquid flow rate out of the reservoir 400a.

Figure 5:
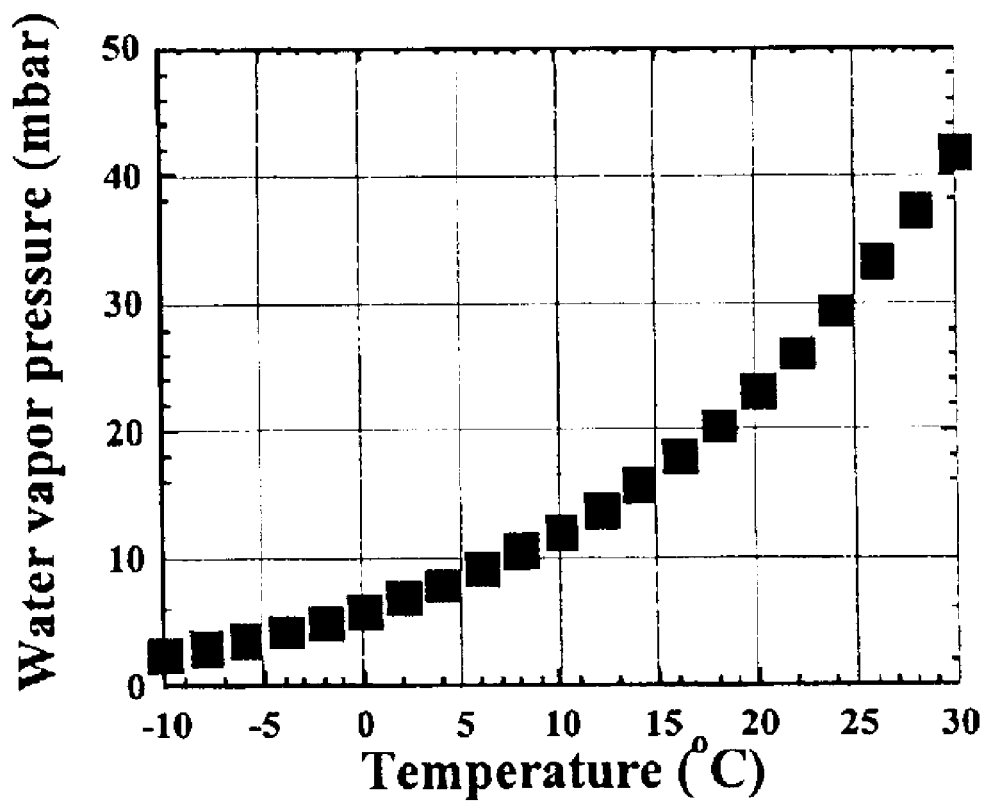
FIG. 5 illustrates the vapor pressure of water as a function of temperature.

The change in vapor pressure associated with a change in the temperature of the reservoir can be quite significant. For example, FIG. 5 illustrates the change in water vapor pressure as a function of temperature up to about 30° C. As is evident from FIG. 5, the water vapor pressure changes significantly (about 800%) with an increase in temperature in the range of 0° C. to 30° C. Therefore, if the rigid housing is exposed to fluctuations in the ambient temperature, the vapor pressure will increase and the feed rate of the liquid will increase, thereby increasing the cooling rate.

However, in a design such as that illustrated by FIG. 4a, it is possible that certain orientations of the reservoir will cause the liquid to become separated from the liquid conduit, temporarily suspending the flow of liquid. To overcome this limitation, the liquid can be contained within a wicking material disposed in the housing that maintains some of the liquid in contact with the outlet irrespective of the orientation of the reservoir. In another embodiment, the liquid is contained in a flexible, liquid impermeable pouch to maintain liquid communication with the liquid conduit.

Referring to FIG. 4b, an embodiment is illustrated wherein a liquid impermeable pouch 414b encloses the refrigerant liquid 404b. The residual vapor pressure 412b acts upon the liquid pouch 414b, which is preferably a flexible pouch to enable the vapor pressure to be transmitted to the liquid contained within the pouch. It will be appreciated that the residual vapor pressure within the rigid housing can be supplied by a substance that is different than the refrigerant liquid 404b, such as a substance having a higher vapor pressure than the refrigerant liquid. FIG. 4c illustrates an embodiment wherein a wicking material 416c is disposed within the rigid housing 402c. The refrigerant liquid 404c is absorbed into the wicking material 416c and as a result maintains contact with the liquid outlet 406c irrespective of the orientation of the reservoir 400c. Examples of a wicking material useful for this purpose include fibrous woven and nonwoven materials such as those comprising natural fibers (e.g. cellulose), polymers, glass (e.g. silica), natural sponges and synthetic sponges.

Figures 6, 7:
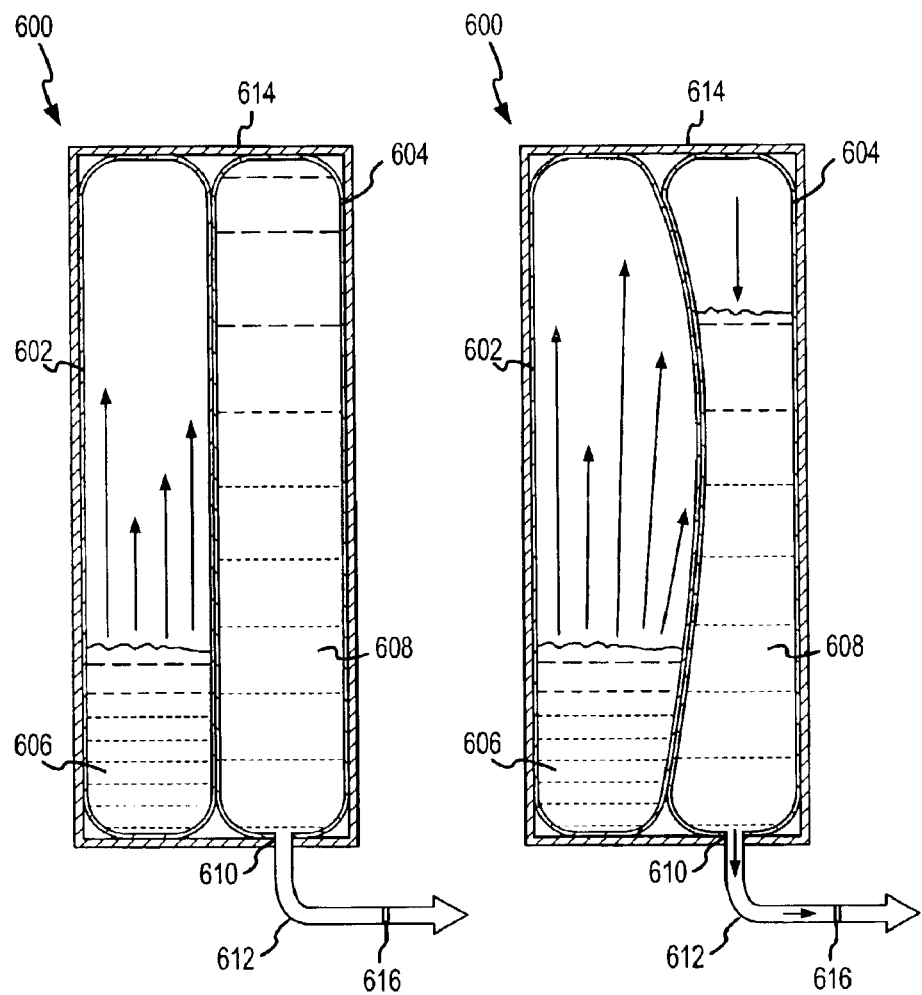
FIGS. 6 and 7 illustrate cross-sectional views of a liquid reservoir system for a sorption cooling device in accordance with an embodiment of the present invention.
Figure 8:
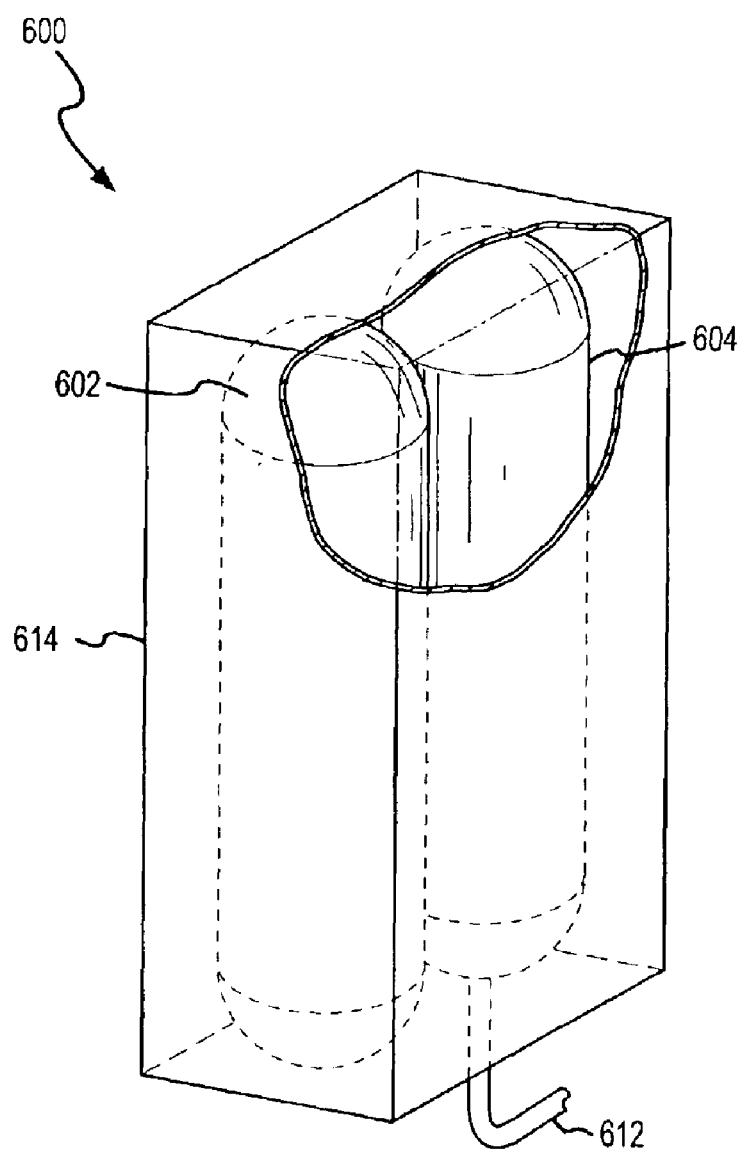
FIG. 8 illustrates a perspective view of a liquid reservoir system for a sorption cooling device in accordance with an embodiment of the present invention.

In one preferred embodiment, the vapor pressure of a separate, high vapor pressure substance is used to drive the feed rate of the liquid to the outlet. In this embodiment, a first flexible pouch containing a high vapor pressure substance is located adjacent to a second flexible pouch containing a liquid. As the ambient temperature increase, the vapor pressure within the first pouch will also increase thereby causing the first pouch to expand. As the first pouch expands, it exerts increased pressure on the second pouch thereby increasing the pressure of the liquid over the liquid outlet. FIGS. 6 and 7 illustrate cross-sectional views of a liquid supply reservoir in accordance with this embodiment of the invention and FIG. 8 illustrates a perspective view of this liquid supply reservoir. Specifically, FIG. 6 illustrates a cross-section of the reservoir prior to activation of the device and FIG. 7 illustrates a cross-section of the reservoir illustrated in FIG. 6, wherein the device has been activated and some liquid has been released from the second pouch.

The liquid supply reservoir 600 includes a first flexible pouch 602 containing a high vapor pressure substance 606, a second flexible pouch 604 containing a supply liquid 608 such as a refrigerant liquid, and a liquid outlet 610 connected to a liquid conduit 612. The first pouch 602 and second pouch 604 are adjacent and generally encased by a rigid housing 614 such that the first pouch 602 may not expand in any direction other than a direction that is substantially toward the second pouch 604. Upon activation, the liquid 608 flows to the liquid outlet 610, at least partially due to the pressure exerted by the first pouch 602. The high vapor pressure substance 606 can advantageously have a higher vapor pressure than that of the liquid 608 at near ambient temperatures (e.g., about 30° C.). As such, as the ambient temperature increases so will the vapor pressure of the high vapor pressure substance 606 thereby causing the first pouch 602 to expand. As the first pouch 602 expands it will cause the second pouch 604 to contract thereby assisting the flow of the liquid 608 from the second pouch to the liquid conduit 612. The flexible pouches can be made from any number of flexible, liquid impermeable materials, including low-cost, heat-sealed films such as polypropylenes, polyesters, nylons or other plastics. A flow restriction device 616, may be incorporated in the liquid conduit 612 to restrict the liquid flow rate to an appropriate level.

Preferably, the pressure in the second pouch 604 immediately prior to activation of the device is greater than the pressure within the rigid housing 614. This will prevent the pressure within the rigid housing 614 from exerting itself on the second pouch upon activation, which would thereby cause the liquid to exit the liquid conduit at an increased rate. For example, the pressure within the second pouch immediately prior to activating the device can be from about 50 mbar (37.5 torr) to about 300 mbar (225 torr) and the pressure within the rigid housing is preferably not greater than about 700 mbar (525 torr), such as not greater than about 100 mbar (75 torr) and not greater than about 10 mbar (7.5 torr).

Moreover, the pressure within the rigid housing should not be greater than the pressure within the first pouch at ambient temperatures and will typically be at the same pressure as the cooling device, i.e., most preferably not greater than about 4 mbar (3 torr). This will allow the first pouch to expand within the rigid housing without being restricted by the influence of surrounding pressure. If the pressure within the rigid housing is greater than the pressure within the first pouch, the first pouch will not be able to expand and exert pressure on the second pouch. As a result, it is preferred that the pressure within the first pouch be greater than the pressure within the rigid housing. More preferably, the pressure within the first pouch is at least about 100 mbar (75 torr), and more preferably is at least about 500 mbar (375 torr) higher than the pressure within the rigid housing.

According to the present invention, the rigid housing is sufficiently rigid and gas impermeable such that the ambient pressure exerted on the housing is not substantially transferred to the liquid in the second pouch. For example, the rigid housing can be fabricated from a metal or a plastic such as polyethylene, polypropylene, polyvinyl chloride, or similar materials. Furthermore, to ensure that changes in the ambient temperature rapidly change the temperature and the vapor pressure within the rigid housing, the rigid housing is at least partially in thermal communication with ambient temperature and preferably has a thermal conductivity of at least about 0.2 W/m·K. The reservoir should also be thermally isolated from the cooling surface of the evaporator so that the evaporator does not influence the temperature of the high vapor pressure substance. One of the walls of the rigid housing adjacent to the first pouch can also be constructed of a higher thermal conductivity material to increase the internal temperature of the first pouch more rapidly. Accordingly, an increase in the ambient temperature will cause the high vapor pressure substance to increase in temperature, increasing the vapor pressure and increasing the flow rate of the liquid to the liquid conduit.

The high vapor pressure substance can be any suitable liquid or gas phase material that experiences a relatively high change in its vapor pressure over a temperature range of from about 20° C. to about 55° C. Preferably, the vapor pressure of the high vapor pressure substance will increase by at least about 600 percent (i.e., 6 times) with a temperature change of from 20° C. to 55° C. Such high vapor pressure substances can include alcohols such as ethanol, methanol and isopropanol, and alkanes such as n-butane, isobutane, n-pentane and n-hexane. Other high vapor pressure compounds such as fluorocarbons, can also be used. Fluorocarbon compounds can include chlorofluorocarbons (CFC) or hydrochlorofluorocarbons (HCFC) such as FREON (E.I. Dupont de Nemours, Wilmington, Del.), a series of fluorocarbon products such as FREON C318, FREON 114, FREON 21, FREON 11, FREON 114B2, FREON 113 and FREON 112. Other useful fluorocarbons liquids include HCFC134a, HCFC-141b and HCFC-245fa. In one preferred embodiment, the high vapor pressure substance comprises a material that is substantially nonflammable, enabling the device to be utilized in shipping containers without restrictions on the mode of transportation. Such high vapor pressure substances include water. The first flexible pouch containing the high vapor pressure substance can be readily recycled after use since there is substantially no loss of the substance out of the pouch during operation of the device.

The sorption cooling device in accordance with the present invention is particularly useful in temperature-controlled shipping containers. To further illustrate this embodiment of the present invention, a model has been developed that shows the change in water feed rate as a function of ambient temperature and compares it to the change in heat load for a container with an internal temperature of 5° C.

The heat load for a container depends on the surface area of the container, the temperature difference between the interior and exterior of the container, and the overall heat transfer coefficient ($U_o$), which depends on the internal and external heat transfer constants as well as the thickness and thermal conductivity of the container insulation. The total heat load ($Q_{heat}$) in watts can be expressed as:

$$Q_{heat}(W) = U_o(W/m^2 K) A(m^2)[T_{ambient} - T_{box}] (K) \tag{1}$$

For a given container, $U_o$ and A are fixed and the heat load is directly proportional to the temperature difference between ambient and the internal cavity. To maintain the internal temperature at a constant value, the water feed rate must be sufficient to provide an equivalent amount of cooling ($Q_{heat} = Q_{cool}$).

The heat of vaporization of water is about 694 w·hr/g at 25° C. Thus, if the mass flow rate in g/min is expressed as m, then the cooling rate is:

$$Q_{cool}(W) = 694 \text{ W·hr/g m (g/min) 60 min/hr} \tag{2}$$

The magnitude of m is directly proportional to the pressure drop between the liquid reservoir and the evaporator.

Figure 9:
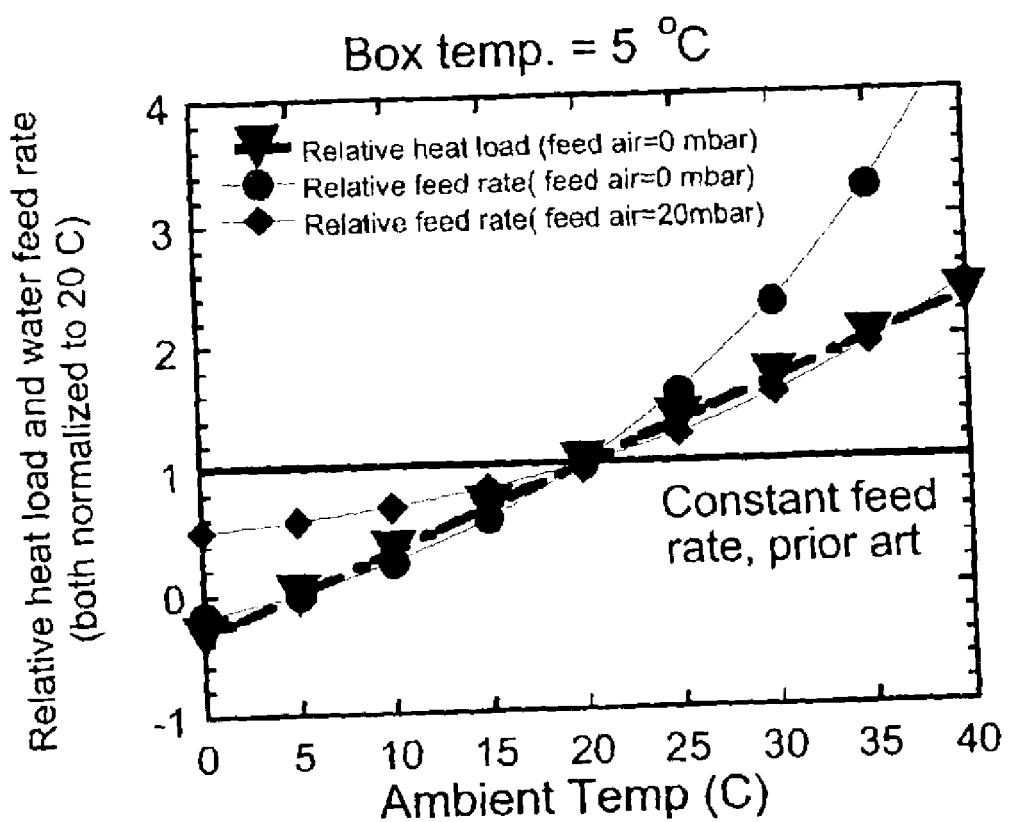
FIG. 9 illustrates the variation in heat load and liquid feed rate as a function of ambient temperature.

FIG. 9 illustrates the variation in $Q_{heat}$ for a container internal cavity temperature of 5° C. that has been normalized to a value of 1 at 20° C. Also illustrated are normalized cooling rates for the variable feed rate embodiment of the present invention and for a liquid feed system that does not change with temperature until freezing occurs, which terminates water flow. As is illustrated by FIG. 9, a dramatic change in feed rate with increased ambient temperature around the container is obtained according to the present invention. If the residual air pressure in both the water feed reservoir and evaporator is zero, the cooling rate is proportional to the vapor pressure difference between ambient temperature and the evaporator temperature. By changing the residual air pressure in the reservoir, the temperature dependence can be changed significantly.

According to another embodiment of the present invention, the flow of liquid can also be controlled using a multi-stage liquid delivery system. In this embodiment, two or more sources of liquid can be activated simultaneously or can be activated separately to provide liquid to the evaporator. This embodiment of the present invention is useful for supplying liquids at different flow rates, supplying liquids at different times and supplying liquids of differing chemical composition.

In one embodiment, a first starter volume of liquid can be initially released at a rapid flow rate to saturate the evaporator while a larger second volume of liquid is released at a reduced flow rate in order to provide prolonged evaporation of the liquid and extend the useful lifetime of the sorption cooling device. The first volume of liquid will disperse throughout the evaporator so that initial cooling can begin quickly across the entire cooling surface of the evaporator.

The second liquid can then be fed to the evaporator at a controlled rate to maintain the required degree of cooling in the evaporator during the useful lifetime of the device. The reservoirs may be entirely separate reservoirs that are activated separately or they may be incorporated into a ingle unit that can be activated by a single actuator.

In the case of separate reservoirs, a starter reservoir can include a volume of liquid that is contained within a liquid impermeable pouch. This pouch can be ruptured either by direct mechanical pressure or by indirect or assisted mechanical pressure by means of a mechanical lever or sharpened actuator which is either affixed to the outside of the pouch or integrated within the pouch. This pouch can be located either directly on the evaporator surface or can be located remotely wherein a liquid conduit directs the flow of liquid to the evaporator. If the pouch is located remotely, the liquid conduit may include a liquid impermeable material that encapsulates the entire liquid pouch and an actuator and is adapted to puncture the pouch and deliver liquid to the evaporator.

Figure 10:
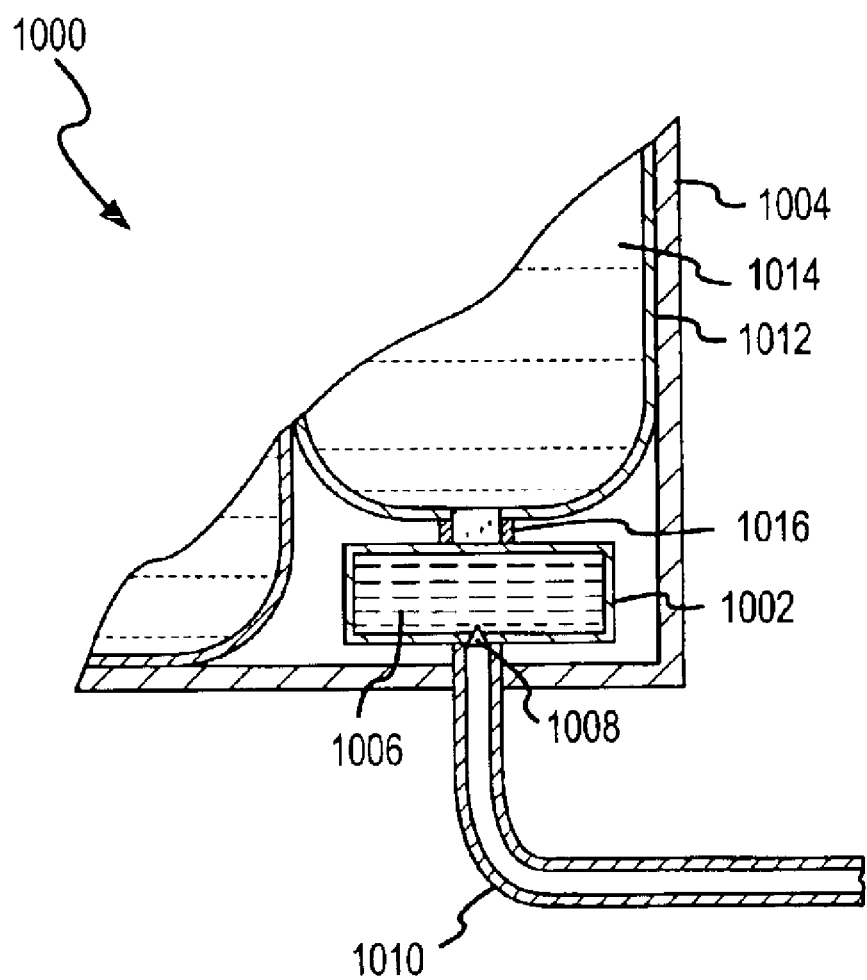
FIG. 10 illustrates a multi-stage liquid delivery system that is useful in a sorption cooling device in accordance with an embodiment of the present invention.

One example of this embodiment of the present invention is illustrated in FIG. 10. A reservoir 1000 includes a first liquid pouch 1002 disposed in a rigid housing 1004. The first liquid pouch 1002 includes a first refrigerant liquid 1006. An actuator 1008 is adapted to puncture the first liquid pouch 1002 and release the first refrigerant liquid 1006. The first refrigerant liquid 1006 can then flow freely to the liquid conduit 1010, and to the evaporator to quickly saturate a wicking material disposed in the evaporator.

A second liquid pouch 1012 is also provided within the rigid housing 1004 and includes a second refrigerant liquid 1014. In one embodiment, the volume of the second refrigerant liquid 1014 is greater than the volume of the first refrigerant liquid 1006. When the actuator 1008 punctures the first liquid pouch 1002, the second refrigerant liquid 1014 is also exposed to a reduced pressure Optionally, a second actuator could be provided to puncture the second liquid pouch 1012 and release the second refrigerant liquid 1014, either simultaneously with the actuator 1008 or at some time after the release of the first refrigerant liquid 1006. In the embodiment illustrated in FIG. 10, the second refrigerant liquid 1014 flows through the first liquid pouch 1002 to the liquid conduit 1010 and a flow restriction device 1016 is disposed between the first liquid pouch 1002 and the second liquid pouch 1012 to reduce the flow rate of the second refrigerant 1014. Accordingly, the second refrigerant liquid 1014 will be fed to the evaporator at a reduced flow rate and over an extended period of time.

Refrigerant liquids for use in accordance with the present invention should have a high vapor pressure at ambient temperature so that a reduction of pressure will produce a high vapor production rate For most applications, the liquid should also have a high heat of vaporization per unit mass or volume, should be non-toxic and nonflammable and should have relatively low cost. Suitable liquids include ammonia, various alcohols such as methyl alcohol or ethyl alcohol, ketones (e.g., acetone) or aldehydes (e.g., acetaldehyde). Other useful liquids can include chlorofluorocarbons (CFC) or hydrochlorofluorocarbons (HCFC) such as FREON (E.I. Dupont de Nemours, Wilmington, Del.), a series of fluorocarbon products such as FREON C318, FREON 114, FREON 21, FREON 11, FREON 114B2, FREON 113 and FREON 112 . Other useful fluorocarbons liquids include HCFC-134a, HCFC-141b and HCFC-245fa.

Preferably, the liquid includes water (i.e., is an aqueous-based liquid) and in one embodiment the liquid consists essentially of water. Water is advantageous due to its high heat of vaporization, low cost and low toxicity. However, it may be desirable to include minor amounts of other components in the liquid in order to control the evaporative properties of the liquid. For example, the liquid can be mixed with a component having a low vapor pressure or with a gas, such as carbon dioxide.

Further, additives to lower the freezing point of the water can be used. Specifically, cooling may occur in the evaporator to such a degree that the liquid may begin to freeze within the evaporator. This can result in many problems, including uneven temperature distribution and uneven distribution of the liquid. If the liquid is fed to the evaporator over a long period of time, freezing may also block the flow of additional liquid to the evaporator. In order to alleviate such problems, it can be advantageous to depress the freezing point of the liquid.

Freezing point depression can be accomplished by mixing a freezing point suppression agent with the liquid to lower the freezing point. As many of these substances will also cause a suppression in vapor pressure above the liquid that is proportional to the quantity added, it is desirable to use only the amount needed to adequately suppress freezing of the liquid. Other high-vapor pressure solvents may be used to depress the freezing point, but these may interfere with the vapor flow from the evaporator to the absorber by producing higher relative pressures between the evaporator and the absorber. Therefore, these should be used in moderation.

Preferred freezing point suppression agents according to the present invention include salts such as metal-chlorides, -bromides, -nitrates, -sulfates and -acetates. Examples of preferred metal salts include those selected from the group consisting of $NaCl$, $CaCl_2$, $BaCl_2$, $MgCl_2$, $FeCl_3$, $Mg(NO_3)_2$, $NaBr$, $ZnCl_2$ and mixtures thereof. Other useful freezing point suppression agents include organic solvents such as EtOH, MeOH, IPA, ethylene glycol, propylene glycol and glycerol.

In cases where the liquid is fed to the evaporator over a long period of time, mixing these freezing point suppression agents with the bulk liquid can cause an accumulation of these compounds in the evaporator. As the liquid evaporates, the compound will remain in the evaporator while additional amounts of the compound are introduced with the in-flowing liquid.

In order to minimize this problem, the proper volumes of the freezing point suppression agent may be introduced to the evaporator through pre-impregnation of the evaporator. In this way, when new refrigerant liquid is fed into the evaporator, it will mix with the agent in the correct proportion to reduce freezing in the evaporator. For example, a wicking material, disposed in the evaporator (discussed below) can be impregnated with a controlled amount of a freezing point suppression agent. This problem can also be minimized by adding the agent to the starter liquid only, as is discussed above. In this regard, the starter liquid can include a quantity (e.g., up to about 30 wt. %) of a salt, such as $NaCl$ or $CaCl_2$, or an organic compound such as ethylene glycol.

According to one embodiment of the present invention, the flow rate of the refrigerant liquid (e.g., water) from the reservoir to the evaporator is carefully controlled to regulate the overall cooling rate of the sorption cooling device. For applications such as temperature-controlled shipping containers, relatively low cooling power is required, but the cooling must continue for long periods of time, often in excess of 48 or 72 hours. In order to provide an extended period of cooling according to the present invention, a controlled liquid flow rate is maintained into the evaporator to maintain a steady level of cooling over a long time period. Absent proper control, substantially all of the liquid in the reservoir would immediately flow to the evaporator upon release from the reservoir. According to the present invention, a liquid flow restriction can be used to restrict the liquid flow rate to an appropriate level.

Figure 11:
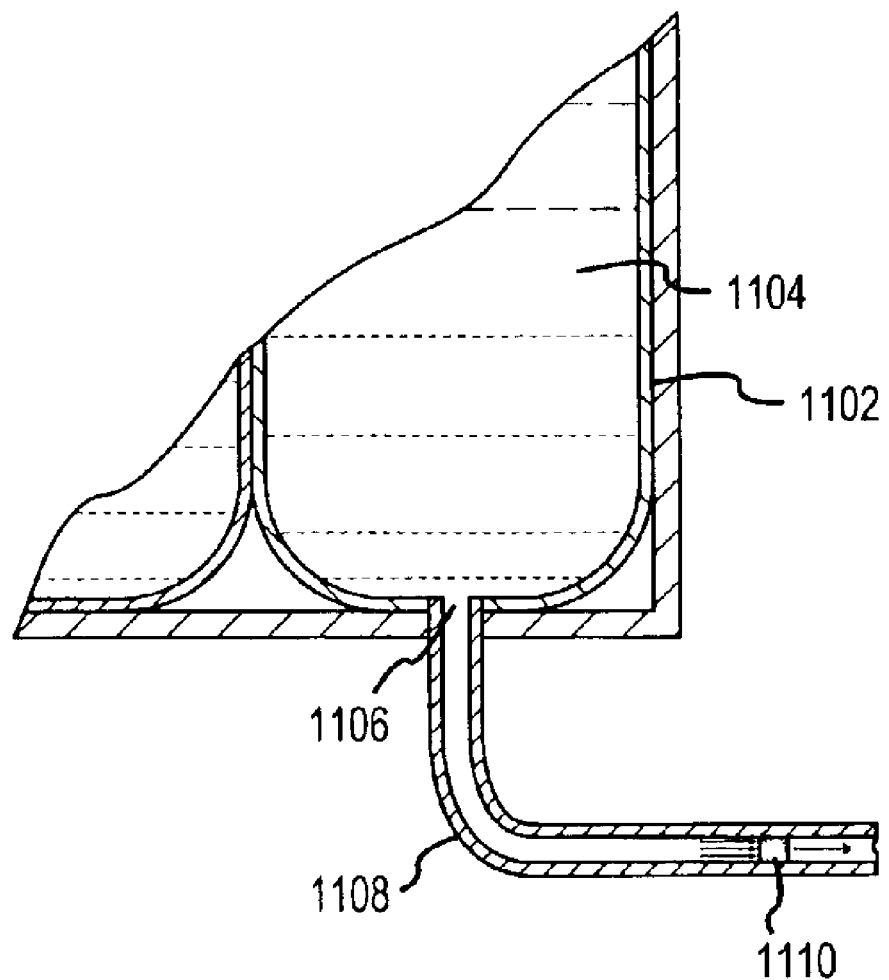
FIG. 11 illustrates a flow restriction device that is useful in a sorption cooling device in accordance with an embodiment of the present invention.

Referring now to FIG. 11, a cross-sectional view of a flow restriction device that is useful in accordance with the present invention is illustrated. Supply reservoir 1102 includes a supply liquid 1104 and a liquid outlet 1106. The liquid outlet 1106 is connected to a liquid conduit 1108 that includes a flow restriction device 1110 adapted to restrict the flow of the supply liquid 1104 exiting the reservoir. The flow restriction device 1110 can be any type of partial barrier that permits liquid to flow to the evaporator but causes the flow rate of the liquid to be reduced. One useful flow restriction method is to seal one or more lengths of capillary tubing of a pre-selected diameter into the liquid conduit 1108 in such a way as to force the liquid to flow through the capillary tube. The liquid flow rates for water at 1 bar of pressure and the estimated cooling rate for different samples of capillary tubing having a 1 cm length and a diameter ranging from 20 $\mu$m to 100 $\mu$m as are listed in Table 1.

TABLE 1

Capillary Tube Properties

| Diameter ($\mu$m) | Water Feed Rate (ml/hr) | Cooling Rate (W) |
|---|---|---|
| 20 | 0.17 | 0.11 |
| 40 | 2.7 | 1.7 |
| 60 | 13.7 | 8.6 |
| 100 | 106 | 66.8 |

As is evident from Table 1, the flow rate and the cooling rate can be controlled through proper selection of the capillary tubing. The capillary tubing can have a range of from about 1 $\mu$m diameter up to about 1000 $\mu$m diameter.

Another means for restricting the flow rate is to increase the viscosity of the liquid. This can be accomplished by the addition of gelling agents such as silicas, polymers and starches to the liquid. Another means for flow restriction is to use the viscosity of the liquid to reduce the flow rate as it passes through one or more restrictions in order to maintain the proper flow rate. For example, the liquid can be forced to flow through one or more small apertures or pores. The flow rate is thereby controlled by one or more of the liquid viscosity, the diameter and length of the apertures and the pressure drop between both sides of the device. Accordingly, a porous membrane or plug having a preselected pore volume and pore size can be incorporated into the liquid conduit. The selected pore characteristics such as pore size will depend upon the plug length, the driving pressure, the hydrophocity/hydrophilicity characteristics, and the like.

Figure 12:
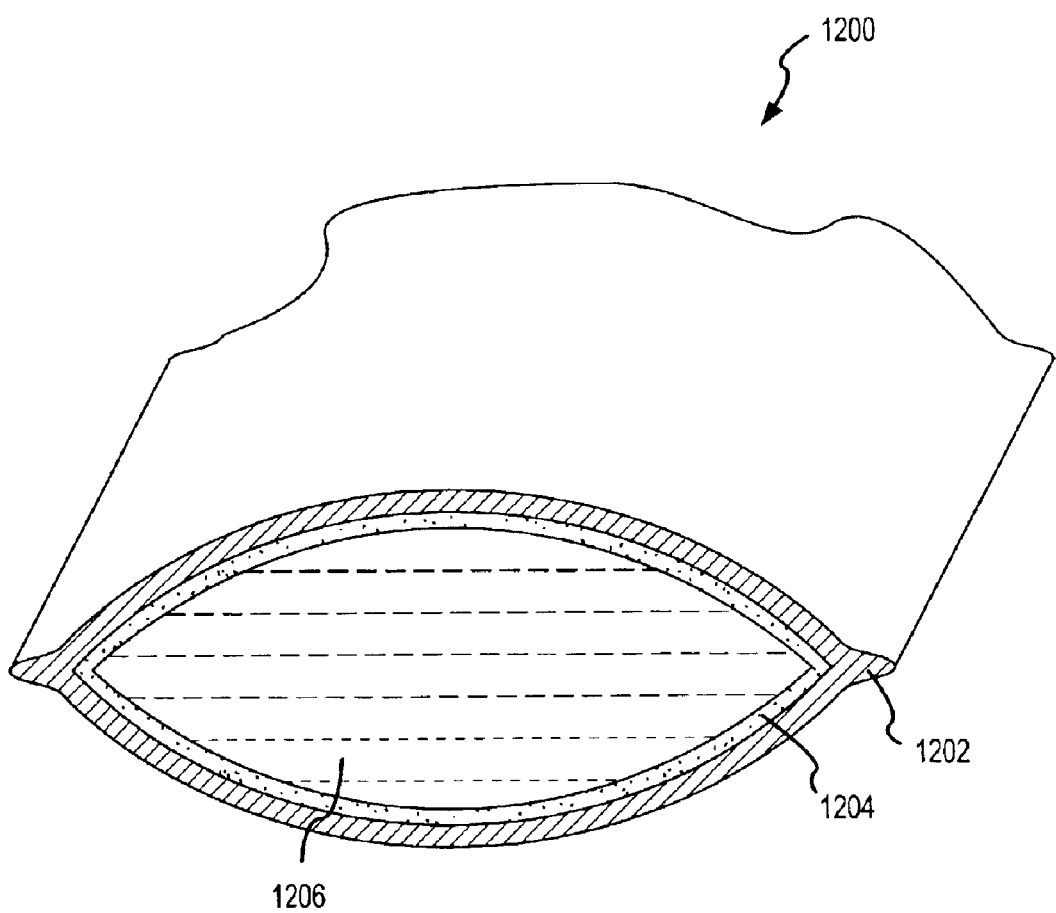
FIG. 12 illustrates a flow restriction device that is useful in a sorption cooling device in accordance with an embodiment of the present invention.

Alternatively, a porous membrane can be incorporated into the liquid pouch. Upon actuation, the liquid will then flow through the porous membrane in order to exit the liquid pouch. The pore size and thickness of the membrane can be selected to provide the desired liquid flow rate based upon the cooling rate that is required for the application. According to one embodiment, the membrane has an average pore size of from about 0.05 $\mu$m to about 20 $\mu$m. An example of this embodiment of the present invention is illustrated in FIG. 12. The liquid pouch 1200 includes a liquid impermeable outer casing 1202. The interior of the casing 1202 includes a porous membrane 1204 disposed such that the liquid 1206 must pass through the membrane 1204 before exiting the casing 1202. The liquid pouch 1200 can be activated to release liquid by puncturing the casing 1202 in an outward direction. For example, an actuator having a sharpened end (not illustrated) can be disposed between the casing 1202 and the membrane 1204 such that the sharpened end punctures the casing 1202 without puncturing the membrane 1204. It will be appreciated that the membrane can also be disposed on the exterior of the casing. In this case, the sharpened end of the actuator would point inwardly to puncture the casing without puncturing the membrane.

Another method for controlling the liquid flow rate is to create one or several extremely small apertures in an interior pouch that is disposed within an exterior pouch having an outlet to restrict the flow of liquid from the interior pouch to the evaporator. Such apertures can be formed in the interior pouch by using a laser or particle beam, for example. Still another method is to mold or otherwise incorporate small channels of appropriate size and length into a piece of material such as plastic that is then sealed into the pouch which contains the liquid. Yet another method is to incorporate a valve in the liquid passageway between the evaporator and liquid reservoir.

Referring back to FIGS. 1–3, refrigerant liquid 116 that is not immediately vaporized can collect in the interstices of a wicking material disposed in the evaporator 108. The wicking material is configured to draw and maintain a desired amount of liquid for vaporization. Thus, the wicking material should have a pore size that is sufficiently large to permit capillary action to draw the liquid into the pores. Further, the wicking material should be configured to absorb any vaporized liquid that recondenses. Preferred wicking materials include hydrophilic materials such as microporous metals, porous plastics such as polyethylene and polypropylene, cellulose products (e.g. tissue paper) and other hydroscopic materials.

With the liquid to gas phase change, the liquid removes heat from its surroundings via a cooling surface 120 that is equal to the latent heat of vaporization of the liquid. It will be appreciated that the cooling surface 120 can include fins or a similar structure to increase surface area and enhance the cooling efficiency of the device.

The vaporized liquid then passes through the vapor passageway 104 to be absorbed in the absorber 102. An optional vapor permeable membrane 106 can be provided to prevent liquid from migrating to the absorber 102. Examples of suitable vapor permeable membrane materials include various porous films such as TYVEK polyethylene films (E.I. duPont deNemours Corporation, Wilmington, Del., GORE-TEX films (W. L. Gore and Associates, Newark, Del.), hydrophilic dense polyurethane films and porous hydrophobic polyurethane films such as those supplied by Porvair (Porvair pic., Norfolk, United Kingdom). The membrane can also have a hydrophilic coating such as SCOTCH-GUARD (3M Company).

To ensure that the sorption cooling device operates for a suitable period of time, it is important to control the rate of evaporation in the evaporator. If the liquid evaporates too quickly, the device will lose its ability to cool over an extended period of time. One way of controlling the rate of evaporation is to restrict the flow of vapor through the vapor passageway. For example, the vapor passageway could be provided with microchannels adapted to restrict the flow of vapor through the vapor passageway. Further, a vapor-permeable membrane having a specified pore size or permeability, as is discussed above, can be provided in the vapor passageway.

In one embodiment of the present invention, the vapor passageway includes a thermally insulating material which is either porous or has apertures formed in the material to allow vapor flow from the evaporator to the absorber while reducing the heat flux from the absorber back to the evaporator. The vacuum conditions under which the sorption cooling device is packaged advantageously enhances the high efficiency of the thermal insulation due to the Knudsen effect. That is, there is a reduction in thermal conductivity that occurs when the mean free path of a gas is equal to or greater than the pore size of the insulation. The thermally insulating material preferably has a thermal resistance at a pressure of about 4 mbar (3 torr) of at least about 2.8 $K \cdot m^2/W$, more preferably at least about 4 $K \cdot m^2/W$ and even more preferably at least about 6.5 $K \cdot m^2/W$. Further, the thermally insulating material preferably has a vapor transport rate of at least about 50 $g/m^2 \cdot hr$ at one atmosphere of pressure. Due to the high insulative value of the thermally insulating material defining the vapor passageway, the evaporator and the absorber can be disposed in close proximity, separated only by the vapor passageway, to give short vapor transfer distances.

Figure 13:
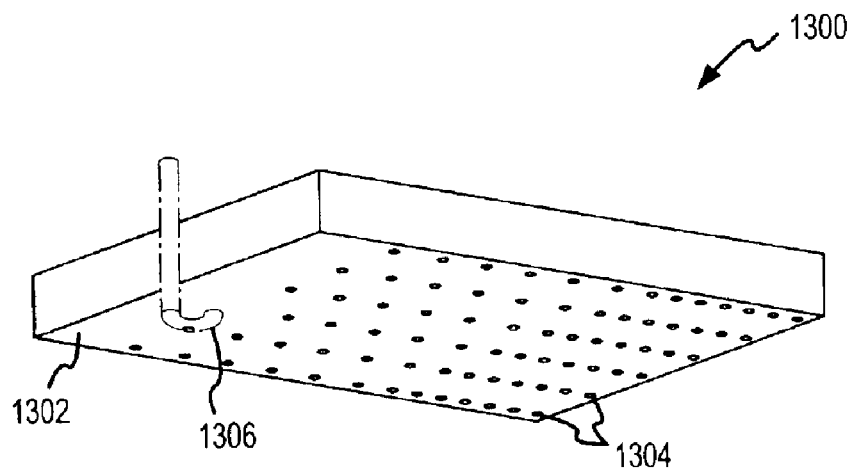
FIG. 13 illustrates a perspective view of a vapor passageway element that is useful in a sorption cooling device in accordance with an embodiment of the present invention.
Figure 14:
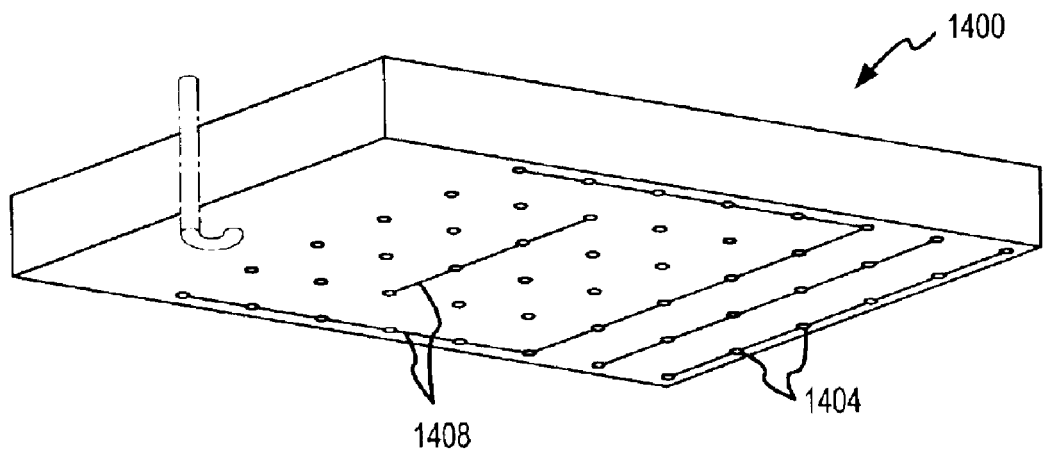
FIG. 14 illustrates a perspective view of a vapor passageway element that is useful in a sorption cooling device in accordance with an embodiment of the present invention.

An example of a vapor passageway that is useful in accordance with the present invention and corresponds to the vapor passageway 104 (FIGS. 1–3) is illustrated in FIGS. 13 and 14. The vapor passageway 1300 is fabricated from thermally insulative material 1302 that includes apertures 1304 extending through the thermally insulative material 1302. The apertures 1304 provide the means by which vapor from an evaporator can pass through to an absorber. The apertures 1304 can be formed in the thermally insulative material by any common technique including drilling or punching, such as by punching with an array of heated nails.

As is illustrated in FIG. 3, the evaporator includes a liquid inlet, which is the point where the liquid exits the liquid conduit and enters the evaporator. It has been found that the region adjacent to the liquid inlet is susceptible to freezing thereby preventing further liquid flow between the evaporator and liquid reservoir. This is particularly true if the liquid inlet is located too close to any apertures 1304 in the thermally insulating material 1302. This is because the apertures 1304 are the means by which the evaporated liquid passes to the absorber and are thus more likely to experience a decrease in temperature than the rest of the vapor passageway 1300. As a result, the liquid inlet 1306 is preferably located near the perimeter (outer edge) of the evaporator (not illustrated) and the vapor passageway, as is illustrated in FIG. 13. This eliminates the need to pass the liquid conduit along the surface of the evaporator and vapor passageway which would increase the likelihood of freezing occurring in the liquid conduit. In the event that the liquid conduit passes over the surface of the evaporator, it is preferred that the liquid conduit be thermally isolated from the cooling surface, such as with a layer of non-woven glass fiber or a similar insulative material.

Preferably, the concentration and/or size of apertures 1304 in the thermally insulative material increases as the distance from the liquid inlet 1306 increases. This is to promote the movement of the vapor in a direction away from the liquid inlet 1306. Thus, the concentration of apertures 1304 in the thermally insulative material 1302 need not be uniform across the surface of the vapor passageway. It is also important that no apertures 1304 are placed immediately adjacent to the liquid inlet, as noted above.

Another example of an embodiment of the vapor passageway is illustrated in FIG. 14. In this embodiment, the vapor passageway 1400 includes, apertures 1404 incorporated in the thermally insulative material and vapor flow channels 1408 connecting individual apertures 1404 for the purpose of directing the evaporated liquid towards the apertures 1404. This enables the vapor to exit the evaporator more efficiently and increases the efficiency of the evaporator. While the channels 1408 are depicted as being connected to the apertures 1404 in a direction perpendicular or parallel to the edges of the vapor passageway 1400, it will be appreciated that the channels 1408 may be connected to the apertures 1404 in any direction so long as the channels promote the movement of vapor to the apertures 1404. Moreover, the channels 1408 may be any depth or shape just so long as their depth and shape promote the movement of the vapor. As with the previous embodiment, the channels 1408 are preferably not located immediately adjacent to the liquid inlet.

Thermally insulating materials that are useful for the vapor passageway according to this present invention include open-cell foams, such as polyurethanes, polystyrenes, or other foams as well porous insulation including fiberglass or porous silica. Open-cell materials are preferred to prevent outgassing when the cooling device is evacuated, as might occur with a closed cell material. As is discussed above, microchannels can also be formed into the material to restrict or regulate the flow of vapor from the evaporator to the absorber. In addition to the vapor passageway element described with respect to FIGS. 13 and 14 and a vapor impermeable membrane, the vapor passageway can include other layers such as a layer of non-woven glass fiber, e.g., a layer of MANNIGLAS (Lydall, Inc., Manchester, Conn.) to enhance the vapor distribution.

The thickness of the vapor passageway is also an important factor that influences properties of the sorpton cooling device. If the vapor passageway is too thick it will unnecessarily add to the cost, size and weight of the device. However, if the vapor passageway is too thin, it will not serve the function of preventing thermal communication between the absorber and the evaporator. Therefore, it is preferred that the thickness of the vapor passageway be sufficient to substantially prevent thermal communication between the evaporator and absorber. The thickness of the vapor passageway will depend on the properties of the thermally insulative material used in the device. It has been found that a thickness of between about 0.5 cm and 5.0 cm is preferred, such as from about 2.5 cm to 5.0 cm when using a material such as an extruded open-celled polystyrene foam (e.g., INSTILL available from Dow Chemical Company, Midland, Mich.).

The diameter of the apertures in the thermally insulative material is another important factor for the sorption cooling device. Apertures that are too small will not allow the vapor to exit the evaporator at a sufficient rate. Apertures that are too big will increase the thermal communication between the absorber and evaporator thereby decreasing the thermal efficiency of the cooling unit. Therefore, it is preferred that the diameter of the apertures be such that it allows the vapor to flow from the evaporator to the absorber at a sufficiently high rate while allowing minimal thermal communication between the absorber and evaporator. The preferred diameter of the apertures will depend on the type of thermally insulating material used, however it has been found that a preferred diameter is from about 0.8 mm (1/32 of an inch) to about 6.4 mm (1/4 of an inch), such as from about 1.6 mm (1/16 of an inch) to about 4.8 mm (3/16 of an inch) when using a material such as INSTILL and water as the refrigerant liquid. Preferably, the ratio of aperture length to aperture diameter is from about 50:1 to about 4:1, more preferably from about 25:1 to 4:1 particularly when using INSTILL as the thermally insulative material and water as the refrigerant liquid. Optionally, the average diameter of the apertures may increase as the distance from the liquid inlet increases. It is also preferred that the open area (i.e., area occupied by the apertures) is at least about 1 percent, such as from about 5 percent to about 15 percent of the total surface area of the thermally insulative material.

Other means for restricting vapor flow through the vapor passageway may be used, such as a bimetallic strip that is responsive to temperature changes. It will be appreciated that other means for restricting vapor flow through the vapor passageway can be utilized.

The absorber includes an absorptive material that is adapted to absorb and retain vapor from the refrigerant liquid. That is, the absorptive material must be capable of absorbing and/or adsorbing the vapor that is formed from the liquid. The absorptive material can be contained, for example, in a vapor permeable pouch. The mechanism by which the absorptive material functions can be a combination of adsorption and absorption and as used herein, the terms absorb, absorptive, absorption and the like refer to the retention of liquid, regardless of the actual mechanism by which the liquid is retained. The absorptive material is preferably of such a nature and quantity as to absorb all of the vaporized liquid.

When the refrigerant liquid includes water, the absorptive material can include a desiccant. To enhance absorption rates, the desiccant can be activated prior to introduction into the absorber. Activation methods can include techniques such as heating the desiccant to remove moisture and/or any non-condensable gases. When the liquid is water, the desiccant preferably absorbs at least about 20 percent of its weight in liquid at a water pressure of 10 mbar (3.8 torr), more preferably at least about 50 percent by weight at a pressure of 10 mbar and even more preferably at least about 75 percent by weight at pressure of 10 mbar.

The preferred desiccant will also absorb at least about 20 percent of its weight in water at 10 percent relative humidity, and at least 40 percent of its weight in water at 50 percent relative humidity and ambient temperature. More preferably, the desiccant will absorb at least 40 percent of its weight at 10 percent relative humidity and 60 percent of its weight at 50 percent relative humidity. Even more preferably, the desiccant will absorb at least about 50 percent of its weight at 10 relative percent humidity and at least about 80 percent of its weight at 50 relative percent humidity.

Suitable desiccants include zeolites, barium oxide, activated alumina, silica gel, glycerine, magnesium perchlorate, calcium sulfate, calcium oxide, activated carbon, calcium chloride, alumina gel, calcium hydride, phosphoric anhydride, phosphoric acid, potassium hydroxide, sodium sulfate and bentonite clay.

A particularly preferred desiccant in accordance with the present invention is a surface modified porous material. The porous material can be a material such as activated carbon or silica. Preferably, the porous material has a pore volume of at least about 0.8 cc/g and average pore size of from about 1 nm to about 100 nm. The surface modification can include impregnating the porous material with one or more absorbents such as a metal salt selected from the group consisting of calcium chloride, lithium chloride, lithium bromide, magnesium chloride, calcium nitrate, potassium fluoride and the like. Preferably, the metal salt is an environmentally benign salt, such as calcium chloride ($CaCl_2$). The porous support material is preferably loaded with from about 20 to about 80 weight percent of the metal salt and more preferably from about 40 to about 60 weight percent of the metal salt and preferably is in pelletized form to provide vapor passageways among the desiccant particles. Such desiccant compositions are described in detail in U.S. patent application Ser. No. 09/691,371, which is commonly-owned with the present application and which is incorporated herein by reference in its entirety.

Figure 15:
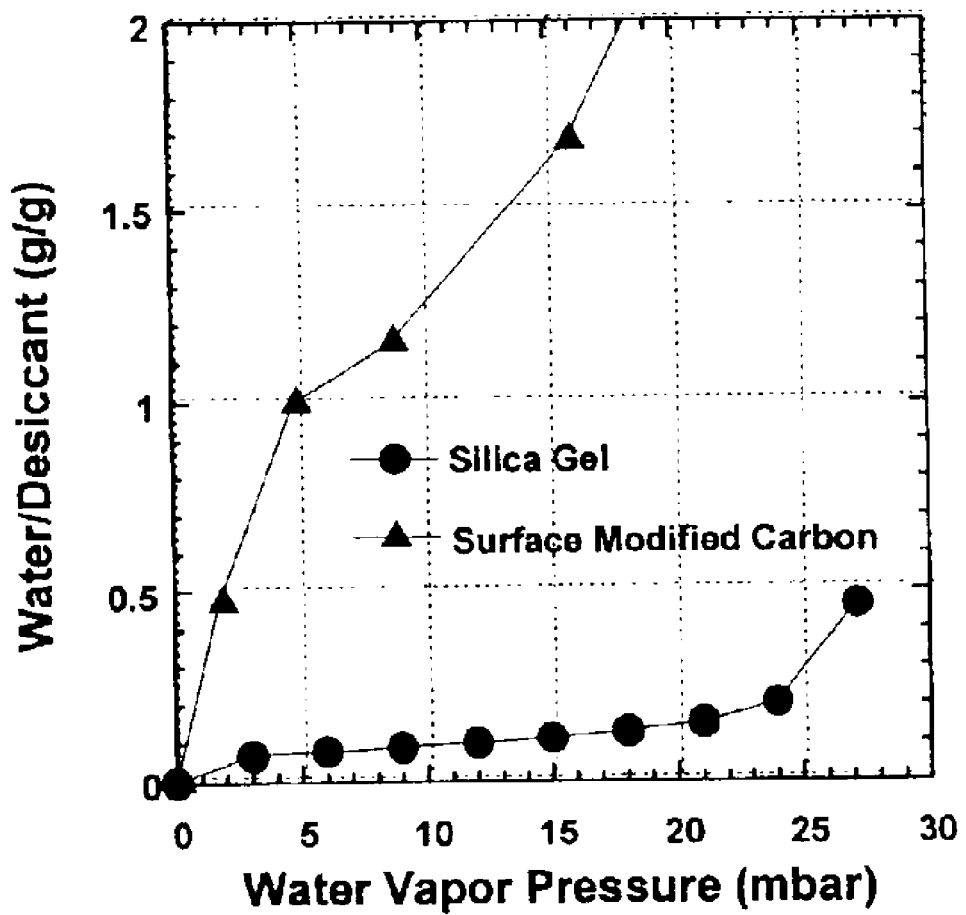
FIG. 15 illustrates the absorption capacity of two different desiccants that are useful in accordance with the present invention.

FIG. 15 illustrates the capacity of a preferred desiccant according to the present invention to absorb water at 24° C. compared to silica gel at various vapor pressures. The surface modified desiccant illustrated in FIG. 15 is a surface modified carbon. The desiccant is formed from activated carbon having lithium chloride impregnated on the activated carbon in a 1:1 mass ratio (i.e., 50 weight percent lithium chloride). To fabricate the desiccant, lithium chloride salt is dissolved in water and dried activated carbon is added to the solution. The solution is adsorbed into the activated carbon and is then dried, leaving the activated carbon impregnated with the lithium chloride. The process can be repeated to increase the loading of lithium chloride, if necessary.

It can be seen that this desiccant has substantially higher water absorption ability as compared to the silica gel. The use of desiccant compositions having such high absorption capabilities enables the sorption cooling device to provide high cooling densities, thereby reducing the cost of shipping associated with the container as compared to gel packs and similarly cooled containers.

The absorber can also include a monolith or a structure for the provision of vapor pathways among the desiccant particles. For example, larger inert particles having a size that is at least 5 times to 10 times the size of the desiccant particles can be dispersed among the desiccant to provide such vapor pathways. Grid-like structures can also be disposed in the absorber to provide vapor pathways, such as metal screen, glass fiber mesh, (e.g., MANNIGLAS, from Lydall, Inc., Manchester, Conn.) or a plastic grid. The provision of vapor pathways in the absorber can increase the absorption rate of the desiccant.

Another embodiment that is useful in accordance with the present invention is the use of high thermal conductivity material dispersed within the absorber. While the use of a desiccant is preferred for the function of absorbing vapor from the evaporator, generally such desiccants also have a relatively low thermal conductivity. As a result, the desiccant dissipates the generated heat at a rate that is lower than that of a higher thermal conductivity material. In order to decrease the rate of heat dissipation in the absorber, a high thermal conductivity material, can be added to the absorber. This will increase the thermal dissipation efficiency of the absorber and therefore the efficiency of the sorption cooling device.

According to this embodiment, the high thermal conductivity material can be dispersed throughout the absorber in a manner such that it maximizes its surface area contact with the desiccant while simultaneously allowing vapor to reach the desiccant. As a result, preferred high thermal conductivity materials include particulate materials or fibrous materials, such as metal wools. The volumetric ratio of desiccant to high thermal conductivity material is also an important consideration and it has been found that between about 95 vol. % to 65 vol. % of the absorber (desiccant plus high thermal conductivity material) should be occupied by the desiccant and between about 5 vol. % to 35 vol. % of the absorber volume should be occupied by the high thermal conductivity material. One preferred volumetric ratio of desiccant to high thermal conductivity material is from about 100:1 to about 10:1.

Figure 16:
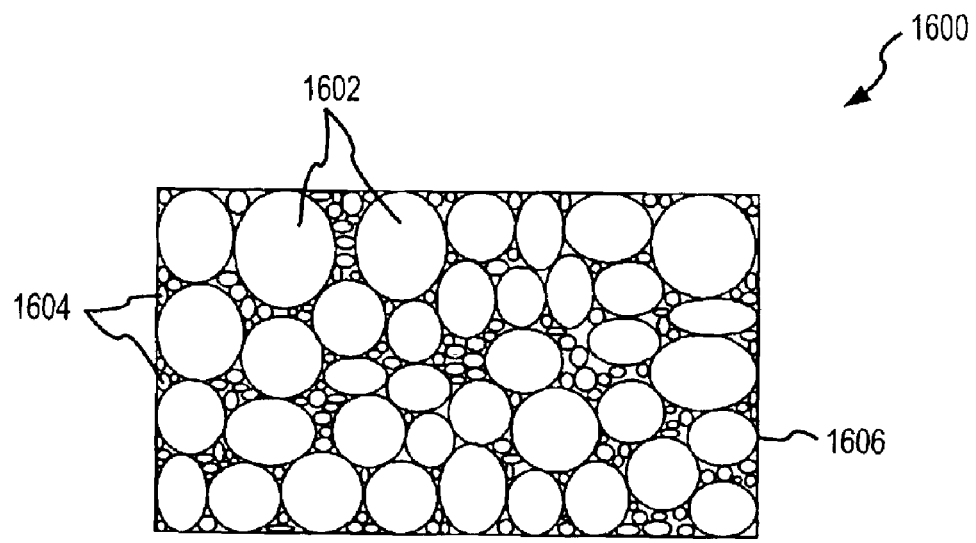
FIG. 16 illustrates a cross-sectional view of an absorber including a desiccant and a high thermal conductivity material according to an embodiment of the present invention.

FIG. 16 illustrates a cross-section of one embodiment of an absorber that is useful in accordance with the present invention. The absorber 1600 contains a desiccant 1602 and a high thermal conductivity particulate material 1604, sealed in a vapor permeable bag 1606. Vapor entering the absorber 1600 through the vapor permeable bag 1606 will be absorbed by the desiccant 1602 thereby generating heat. The generated heat will be passed via thermal conduction to the particulate material 1604 which, in turn, transfers the heat to the exterior of the absorber 1600 thereby increasing the thermal efficiency of the absorber.

Figure 17:
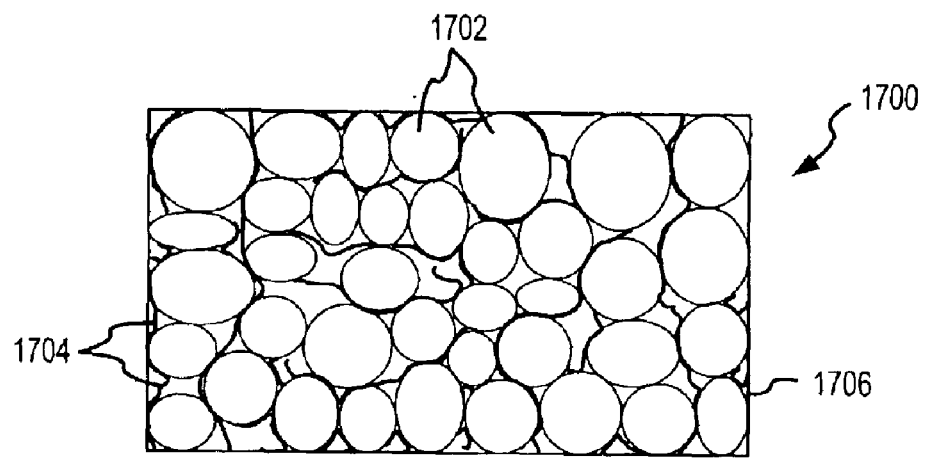
FIG. 17 illustrates a cross-sectional view of an absorber including a desiccant and a high thermal conductivity material according to an embodiment of the present invention.

FIG. 17 illustrates a cross-section of another embodiment of the absorber that is useful in accordance with the present invention. The absorber 1700 contains a desiccant 1702 and a fibrous material such as metal wool 1704 enclosed in a vapor permeable bag 1706. Vapor entering the absorber 1700 from the vapor permeable bag 1706 will be absorbed by the desiccant 1702, thereby generating heat. The generated heat will be passed via thermal conduction to the metal wool 1704 which, in turn, passes the heat to the exterior of the absorber 1700 thereby increasing the thermal efficiency of the absorber. This structure can be formed by stretching the metal wool and pouring desiccant into the wool.

Preferably, the high thermal conductivity material will have a thermal conductivity of at least about 1 W/m·k, and can be 20 W/m·k or higher. Particulate materials that are useful as high thermal conductivity materials in accordance with this embodiment of the present invention include graphite, fibrous carbon, boron nitride (BN), alumina ($Al_2O_3$), copper, aluminum and mixtures thereof. Metal wools that are useful in accordance with the current embodiment include those fabricated from copper, low-carbon steel, stainless steel, bronze, brass, aluminum, and alloys thereof and mixtures thereof.

It will also be appreciated that the absorber can be provided with heat dissipating fins or similar structure on the top surface of the absorber to enhance the dissipation of heat from the absorber.

According to one embodiment of the present invention, a multiple stage sorption cooling device is provided to provide enhanced cooling capacity. A multiple stage sorption cooling device is particularly useful when used in a container that must be maintained at very low temperatures, such as not greater than 0° C.

When liquid water is evaporated, there is an equilibrium vapor pressure of the water that is a function of the temperature of the water. For different applications of a shipping container, different liquid temperatures are needed to maintain the desired temperature within the container. For example, water temperatures of less than 10° C. are desired for the 2° C. to 8° C. container and less than 0° C. for a frozen product. The equilibrium water vapor pressure for these different temperatures is illustrated in FIG. 5. As the temperature increases, the equilibrium vapor pressure also increases.

Figure 18:
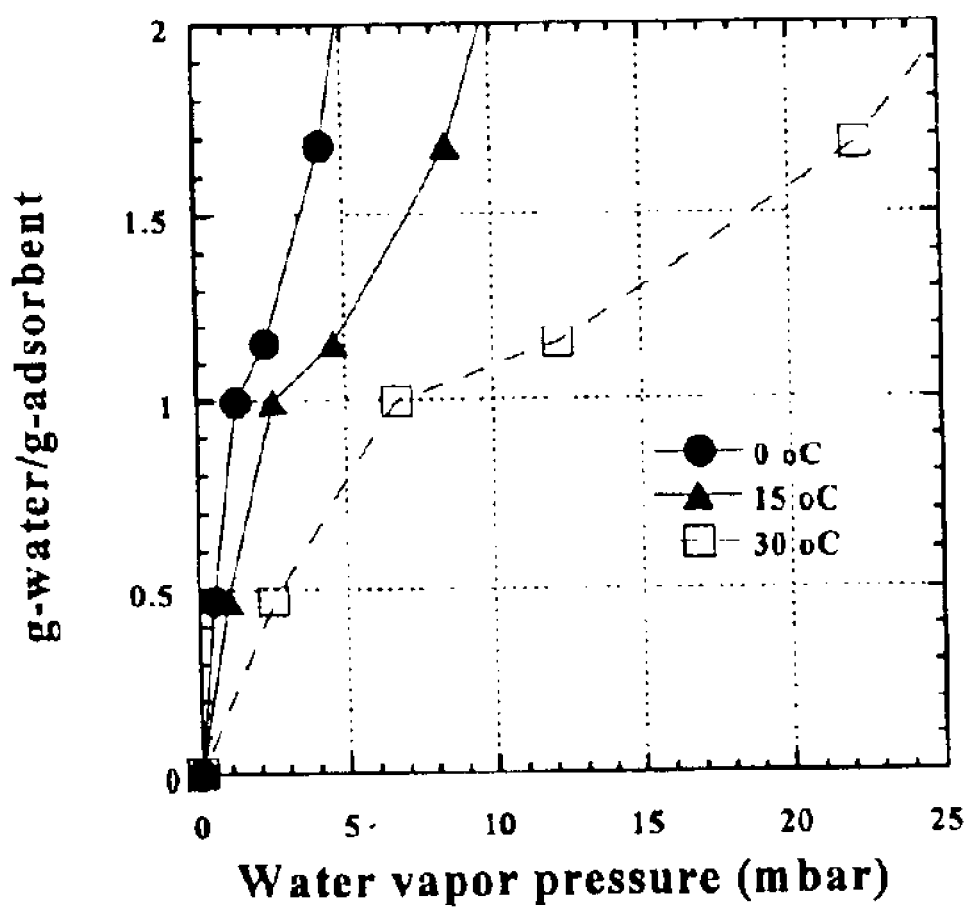
FIG. 18 illustrates the absorption capacity of a desiccant as a function of vapor pressure at three different temperatures.

The capacity of a desiccant also depends upon the water vapor pressure. Specifically, as the vapor pressure increases (e.g., with increasing temperature), the capacity of the desiccant to absorb water also increases. Thus, the capacity of the desiccant is also dependent upon the temperature of the water. This is illustrated by FIG. 18 for three different temperatures. The practical result is that if a large temperature difference is needed between the evaporator and the desiccant (e.g, a very low evaporator temperature is needed), the absorption capacity of the desiccant will be relatively low.

According to one embodiment of the present invention, a multiple stage sorption cooling device is utilized to address this problem. In a multiple stage sorption cooling device, two evaporators are used wherein the first evaporator cools the product cavity and the second evaporator cools the desiccant bed that is associated with the first evaporator. Thus, the temperature difference between the first evaporator and the hottest desiccant bed is effectively doubled.

Figure 19:
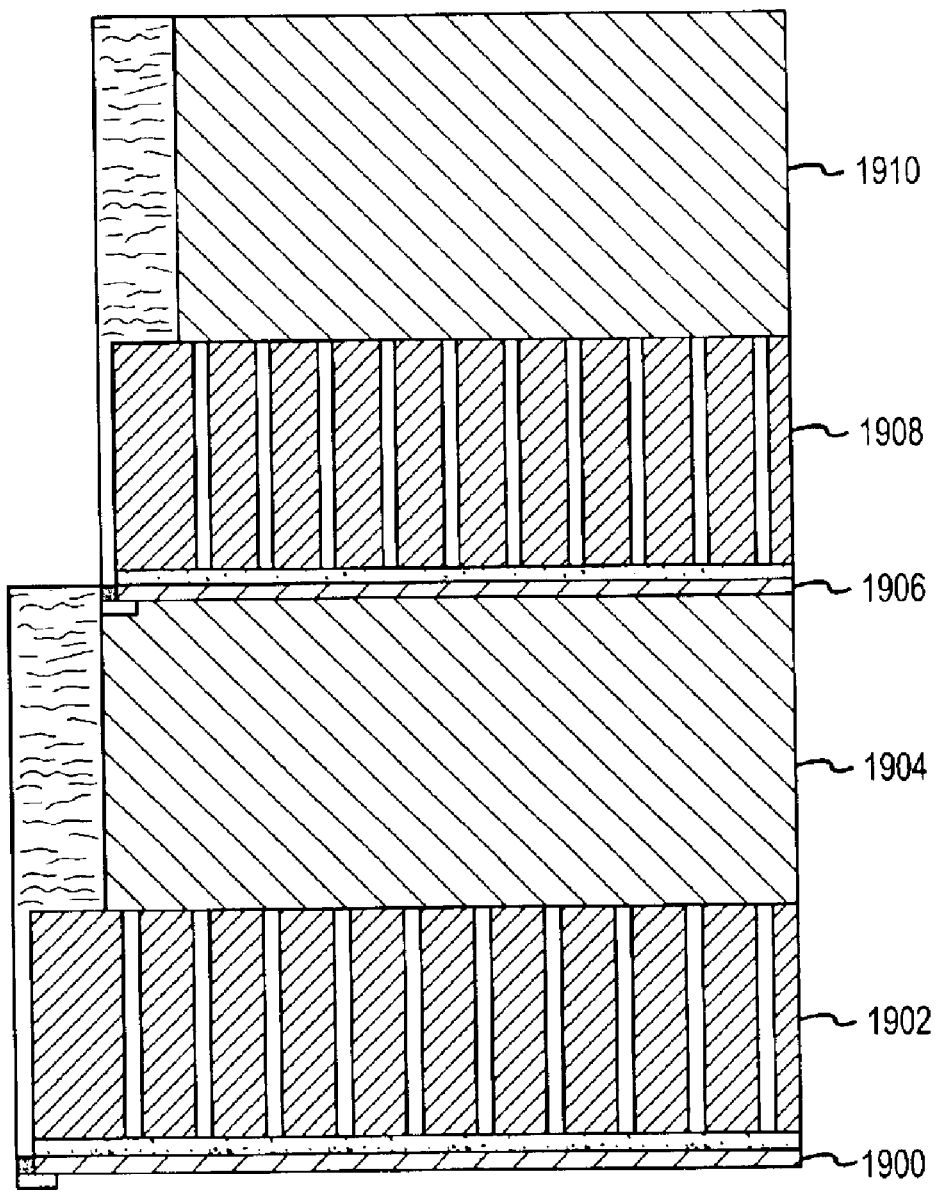
FIG. 19 illustrates a cross-sectional view of a multiple-stage sorption cooling device according to an embodiment of the present invention.

A schematic illustration of a multiple stage sorption cooling device in accordance with the present invention is illustrated in FIG. 19. A first evaporator 1900 is utilized to provide cooling through a cooling surface. A vapor passageway 1902 provides the vapor to a first absorber 1904 that includes a desiccant. As the first absorber 1904 generates heat due to the absorption of vapor, a second cooling device including a evaporator 1906 is activated to cool the desiccant in the first absorber 1904. This enables the first absorber 1904 to capture more vapor from the first evaporator 1900. A second vapor passageway 1908 connects the second evaporator 1906 to a second absorber 1910.

To illustrate the increased efficiency of a multiple-stage cooling device, consider that 1 kg of water provides approximately 630 W·hr of cooling. If the desiccant absorbs 1 kg of water per kg of desiccant and has a heat of adsorption that is 120% of the heat of vaporization, a single stage sorption cooler that is designed for 10 W of cooling would provide cooling for 63 hours, would weigh 2 kg and would need to reject 12 W of heat. For a two-stage cooler with the same cooler capacity but running at twice the temperature difference between the hot and cold sides, a total of 2.2 kg of water and 2.2 kg of desiccant would be required and the cooler would need to reject 14.4 W of heat. Thus, an acceptably small increase in the mass of liquid and desiccant can provide greatly increased cooling capacity and will be useful for maintaining very low temperatures (e.g., below 0° C.) for extended periods of time.

It will be appreciated that the extension of the two-stage cooler illustrated in FIG. 19 to three or more stages is straightforward. With each extra stage, the amount of heat generated for a given amount of cooling decreases and the mass and volume of both refrigerant and adsorbent increases.

The present invention is also directed to the incorporation of a sorption cooling device into a shipping container to form a temperature-controlled shipping container. The foregoing description illustrates certain preferred designs for the sorption cooling device, although the shipping containers of the present invention are not limited thereto. The following description illustrates various examples of temperature-controlled shipping containers according to the present invention. It will be appreciated that, although the present invention is described with reference to these exemplary embodiments, the present invention is not limited to these particular embodiments.

Generally, the cooled shipping containers according to the present invention include a product cavity and a sorption cooling device, wherein the evaporator of the sorption cooling device is adapted to cool the product cavity. Preferably, the heat generated in the absorber is dissipated outside of the product cavity to maximize the cooling time available.

Figure 20:
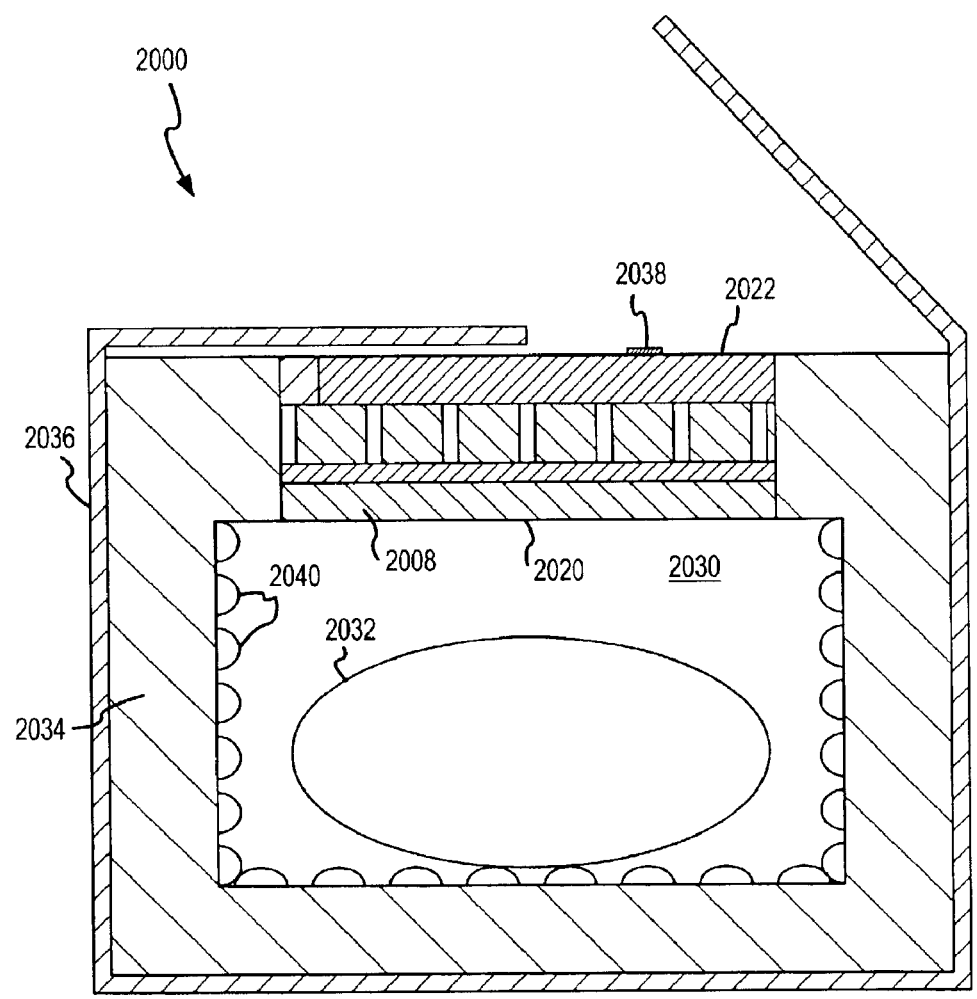
FIG. 20 illustrates a cross-sectional view of a temperature-controlled shipping container in accordance with an embodiment of the present invention.

For example, a sorption cooling device incorporated into a shipping container in accordance with the present invention is illustrated in FIG. 20. Although illustrated as a substantially rectangular-shaped box, it will be appreciated that other container configurations can also be utilized such as cylindrical containers and the like. The temperature-controlled shipping container 2000 illustrated in FIG. 20 includes a sorption cooling device substantially as described with respect to FIGS. 1 and 2. The cooling surface 2020 of the evaporator 2008 is in thermal communication with the product cavity 2030. The product 2032 is disposed within the cavity 2030 that is defined by the top, bottom and side walls of an insulative insert 2034. In a preferred embodiment, the insulated walls defining the product cavity preferably have a thermal resistance of at least about 1 $K \cdot m^2/W$ and more preferably at least about 2 $K \cdot m^2/W$. However, it will be appreciated that such highly insulative walls may not be necessary for all applications of the present invention.

If desired, the insulative insert 2034 can be placed in an external container 2036, such as a corrugated cardboard box. The absorber 2022, which generates heat as liquid is absorbed, can be disposed in thermal communication with the exterior of the external container 2036 such that heat is dissipated to the external environment. Alternatively, the absorber could be located outside of the insulative insert 2034 and within the external container 2036. If the absorber 2022 is disposed within the external container 2036, venting means such as slots or perforations can be provided in the external container 2036 to assist in the dissipation of heat. Further, it is preferred that the absorber 2022 is not in direct contact with the top of the external container 2036, as this would restrict heat dissipation from the absorber. The external container can be provided with only two top flaps (as opposed to four flaps) on the side adjacent to the absorber to decrease the thickness and enhance heat dissipation. In any event, it is preferred that the heat generated at the absorber 2022 is thermally isolated from the product cavity 2030 so that the product cavity 2030 is able to maintain a sufficiently cool temperature for a sufficient length of time. Channels or other protrusions 2040 can also be provided within the product cavity to enhance circulation of the cooled air.

A mechanism can also be provided to indicate to the user that the activated cooling device is operational. For example, a strip of thermochromic ink 2038 can be disposed on the absorber or the evaporator whereby the ink changes color in response to a temperature change. Further, a rigid plate (e.g., a fiberglass, plastic, cardboard, chipboard or metal plate) can be disposed over the absorber to prevent accidental puncturing of the cooling device before or during use of the shipping container.

The preferred material for the insulated walls will depend upon the application of the shipping container, such as the relative value of the products being shipped and the cooling requirements associated with the product. In one embodiment, the insulated wall material has a thermal conductivity of not greater than about 0.05 W/m·k, such as not greater than about 0.04 W/m·k. Table 2 summarizes the properties of four available materials: corrugated cardboard; expanded polystyrene (EPS); polyurethane; and vacuum insulated panels (VIPs).

TABLE 2

Examples of Insulative Materials

| Material | Thermal Conductivity (W/m · K) | Recyclability | Formability | Relative Cost |
|---|---|---|---|---|
| Corrugated Cardboard | ~0.05 | High | Yes | Low |
| EPS | 0.035 | Moderate | Yes | Low |
| Polyurethane | 0.025 | Difficult | Yes | Medium |
| VIPs | <0.006 | Varies | No | Very High |

For example, the insulated container and/or insert 2034 can include EPS as the sidewall material where the product 2032 is a relatively low-value commodity that is sensitive to increased costs. EPS has the advantage that it has a low-cost and is easily formed into a variety of shapes. However, to ensure sufficient insulation, a relatively thick amount of EPS is typically used. Further, there are environmental concerns with respect to the use of EPS.

VIPs have a very low thermal conductivity and therefore can be utilized in thinner sections than, for example, EPS. However, VIPs have a relatively high cost and would typically be used for high value commodities such as pharmaceuticals and medical specimens. In addition, other insulative materials can be used including expanded polyethylene, expanded polypropylene, fiberboard and non-corrugated cardboard. Gas filled insulative materials can also be used wherein a gas impermeable pouch is filled with an inert gas to provide thermal insulation and to isolate the product. Examples of such gas filled insulative materials are described in U.S. Pat. No. 6,341,475 by Weder, U.S. Pat. No. 6,250,467 by Weder and U.S. Pat. No. 5,272,856 by Pharo, each of which are incorporated herein by reference in its entirety.

Figure 21:
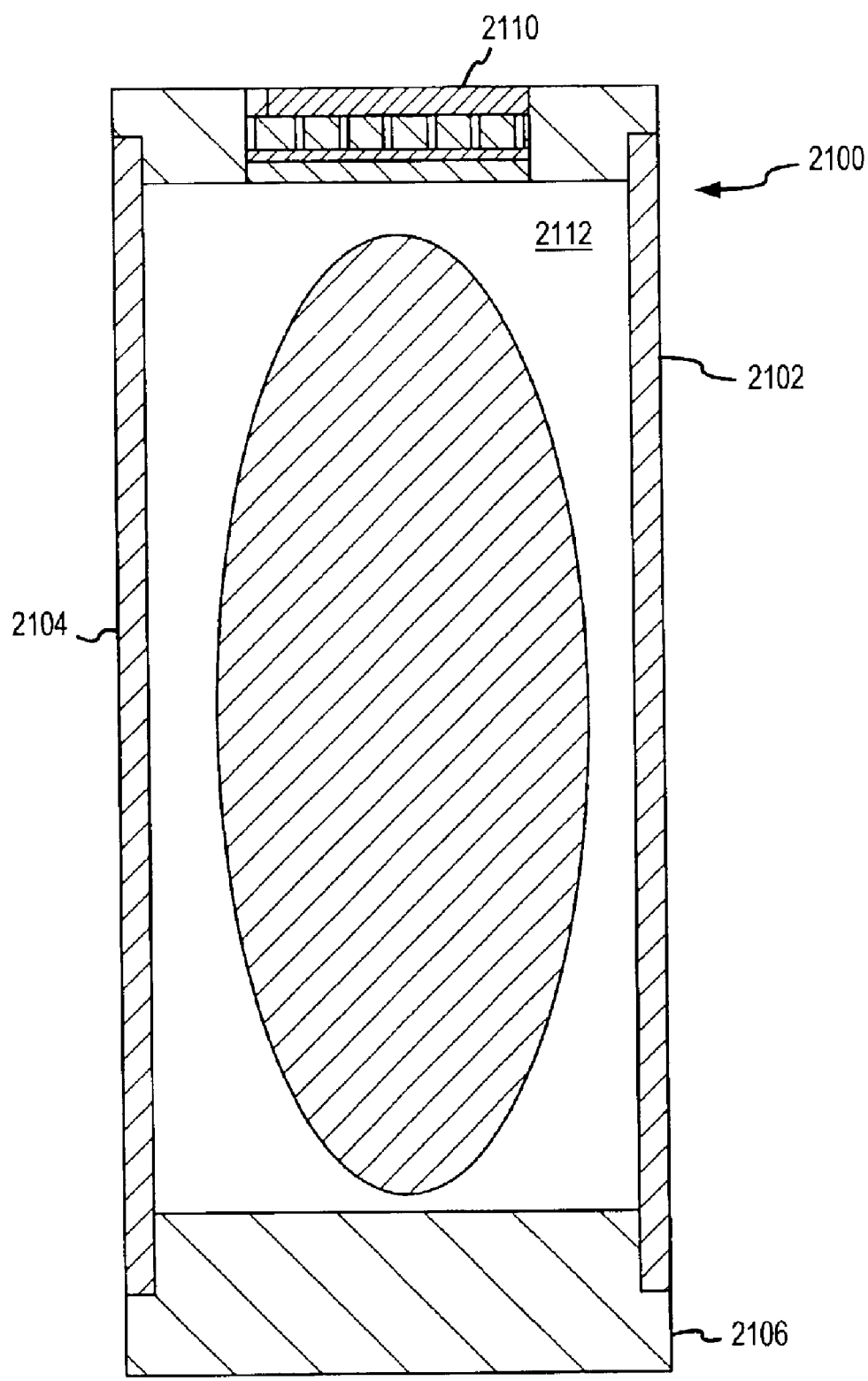
FIG. 21 illustrates a cross-sectional view of a temperature-controlled shipping container in accordance with an embodiment of the present invention.

It will be appreciated that combinations of two or more insulated materials can also be utilized. For example, VIPs could be utilized in the thin areas of the cargo area with EPS at the opposite sides. FIG. 21 illustrates a cross-sectional view of an insulated shipping container insert in accordance with an embodiment of the present of the present invention. The insulated shipping container insert 2100 includes vacuum insulation panels 2102 and 2104 on the opposite sides of the insert, thereby maximizing the volume of space in the product cavity 2112. The bottom insulator 2106 is fabricated from expanded polystyrene. The top insulator 2108 is also fabricated from expanded polystyrene and includes a sorption cooling device 2110 to maintain a reduced temperature within the product cavity 2112.

According to one embodiment of the present invention, the sorption cooling device is disposable. That is, the sorption cooling device can be adapted to be used and then thrown away. Alternatively, the sorption cooling device can be partially or wholly recyclable. In order to recycle the sorption cooling device, the desiccant in the absorber must be regenerated or replaced. Regeneration of the desiccant entails removing liquid from the desiccant by either heating the desiccant, subjecting the desiccant to a vacuum or both. Further, additional refrigerant liquid must be provided to the sorption cooling device for subsequent use.

The desiccant can be regenerated either by removing the desiccant from the device or by regenerating the desiccant in-situ. For example, the entire sorption cooling device can be returned to the manufacturer where it is dismantled and the desiccant is removed and regenerated for use in new cooling devices. Alternatively, the absorber can be designed as a removable piece of the sorption device. This piece would then be returned and the desiccant removed and regenerated as described above. Regenerated desiccant can then be placed in new desiccant packs which can be packaged and placed into existing devices. According to yet a further embodiment, the absorber can be packaged, such as in a rigid container, and can be regenerated in-situ by opening a valve in the absorber and placing the entire absorber in either an oven or a vacuum. Also, an integral heating unit could be provided with the absorber whereby the heating unit can be activated to regenerate the desiccant in-situ.

Figure 22:
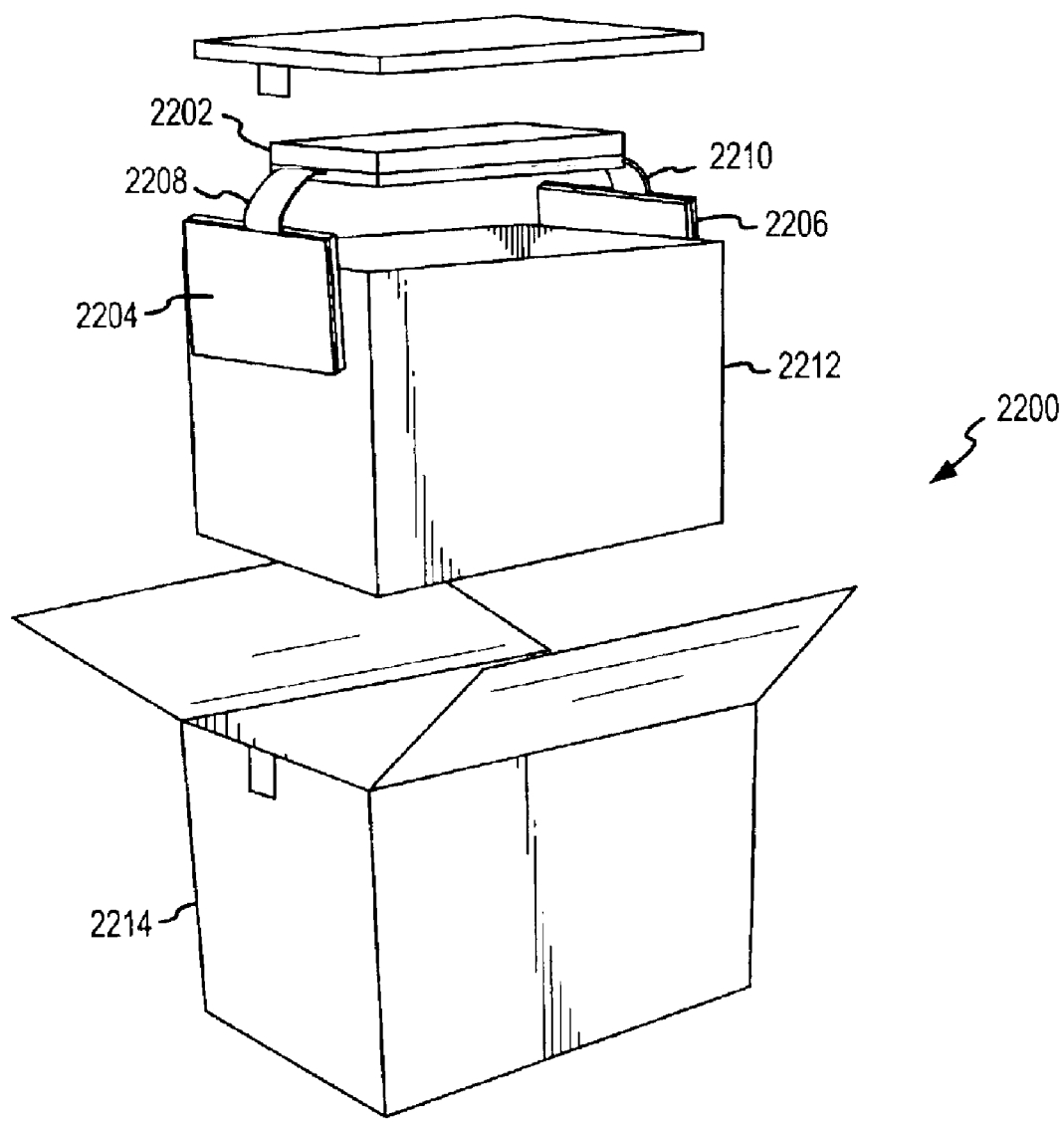
FIG. 22 illustrates a perspective view of a temperature-controlled shipping container in accordance with an embodiment of the present invention.

FIG. 22 illustrates yet another embodiment of the present invention wherein the cooling capacity of the cooling device is enhanced by utilizing two absorbers. Specifically, FIG. 22 illustrates a shipping container 2200 which includes a sorption cooling device including an evaporator 2202 and absorbers 2204 and 2206. The absorbers 2204 and 2206 are connected to the evaporator 2202 by vapor passageways 2208 and 2210.

The evaporator is placed within a cavity defined by an insulated insert 2212. The absorbers 2204 and 2206 are placed on the external portion of the insulated insert 2212. The entire insert can optionally be placed in an external container 2214 for shipment, such as a corrugated cardboard box. As is discussed above, the external box can be provided with venting means to assist in the dissipation of heat from the absorbers 2204 and 2206.

Figure 23:
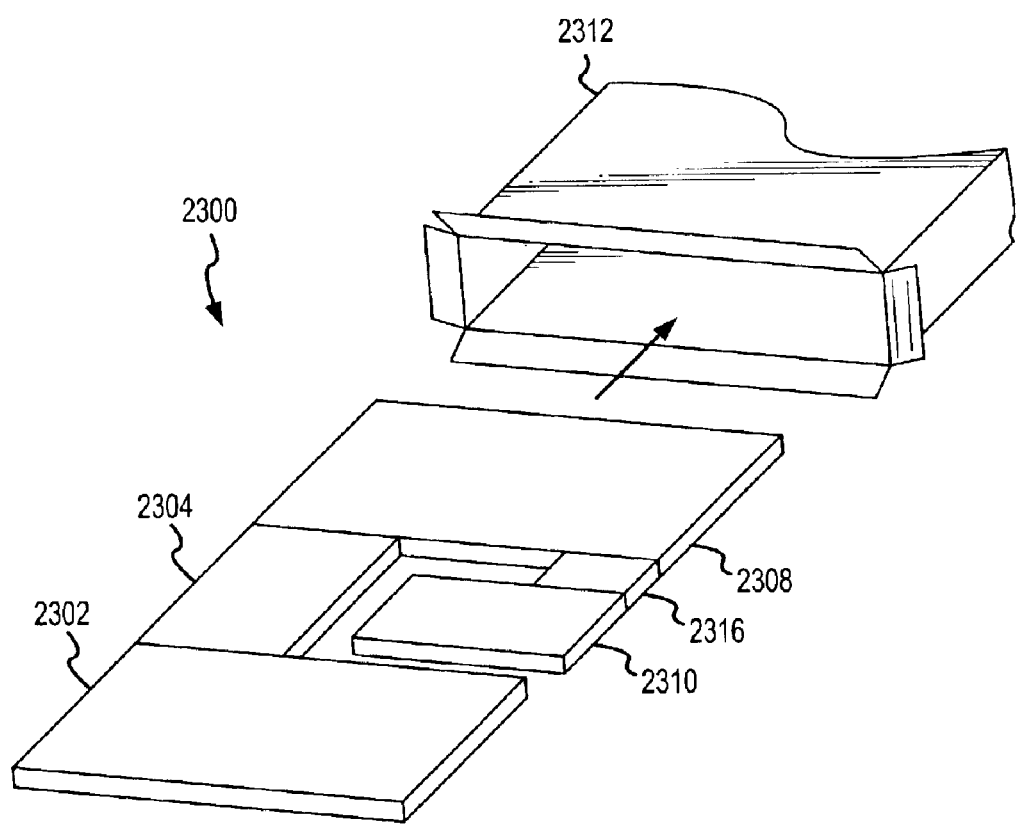
FIG. 23 illustrates a perspective view of a sorption cooling device in accordance with an embodiment of the present invention.

FIG. 23 illustrates yet another embodiment of a sorption cooling device and shipping container according to the present invention. The sorption cooling device 2300 is a flat design useful for cooling small packages having a high aspect ratio. The liquid reservoir 2310 provides water through a liquid conduit 2316 to an evaporator 2308. The water vapor then passes through vapor passageway 2304 to the absorber 2302. The entire assembly can be sealed in a vapor impermeable film, such as a metallized polyester film. In use, the absorber 2302 is thermally isolated from the evaporator 2308 and the item to be cooled is positioned adjacent to the large cooling surface of the evaporator 2308. The opposite surface of the evaporator 2308 can be insulated to maximize the cooling affect. The cooling device 2300 is then placed into a shipping container 2312 with the product adjacent to the evaporator 2308 and thermally isolated from absorber 2302, such as with a piece of insulation (not illustrated).

Figure 24:
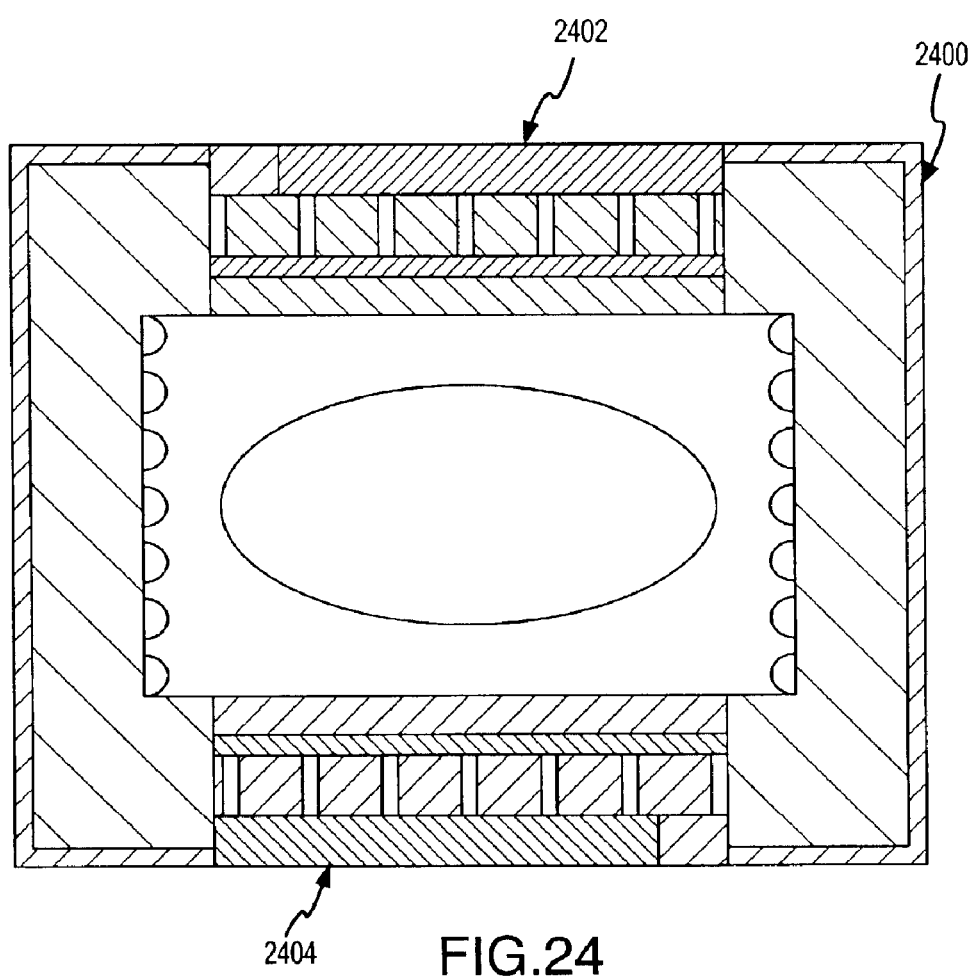
FIG. 24 illustrates a cross-sectional view of a temperature-controlled shipping container in accordance with an embodiment of the present invention utilizing multiple cooling devices.

FIG. 24 illustrates a temperature-controlled shipping container 2400 that is similar to the container illustrated in FIG. 20, wherein two sorption cooling devices 2402 and 2404 are utilized to increase the total cooling capacity. Multiple cooling devices can be utilized to further decrease the temperature within the product cavity and/or can be used to increase the time over which cooling can be provided to the product cavity. The cooling devices can be activated simultaneously to decrease the temperature in the cavity or the devices can be activated sequentially to increase the cooling time.

Figure 25:
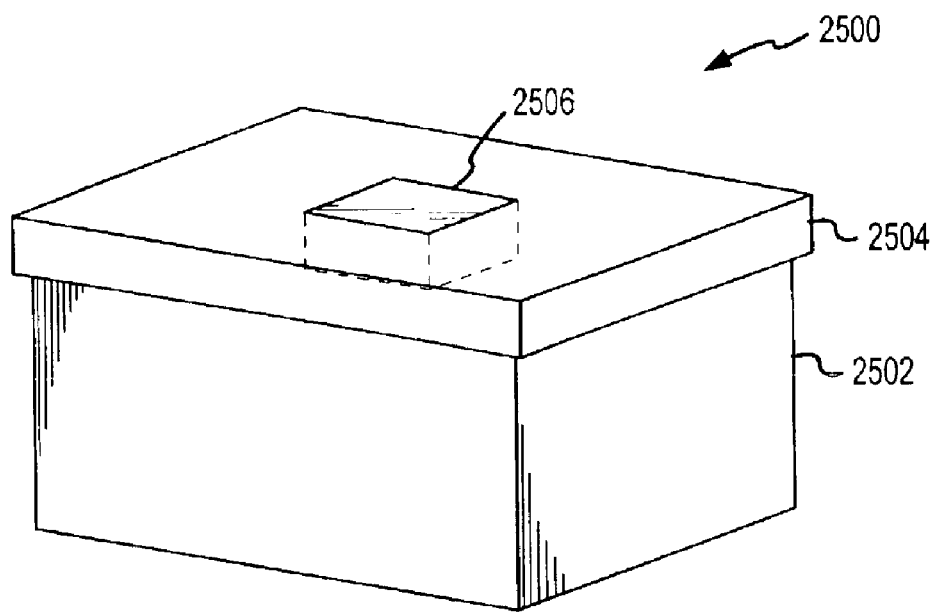
FIG. 25 illustrates a perspective view of a temperature-controlled shipping container in accordance with an embodiment of the present invention.

FIG. 25 illustrates a perspective view of yet another embodiment of the present invention wherein the shipping container 2500 includes a bottom container portion 2502 that defines a cavity and is adapted to contain a product within the cavity. The container includes a top portion 2504 that combines with the bottom portion 2502 and forms the top wall of the container 2500. The top portion can be freely removable from the bottom portion 2502 or can be hinged on the bottom portion 2502. A sorption cooling device 2506 is disposed in the top portion 2504 and is adapted to provide cooling to the interior of the container. 2500 Preferably, the sorption cooling device 2506 is disposed such that the absorber portion is substantially planar with the top surface of the top portion 2504. The sorption cooling device 2506 can be provided to the user separate from the container wherein the cooling device is inserted into the container just prior to use.

Figure 26:
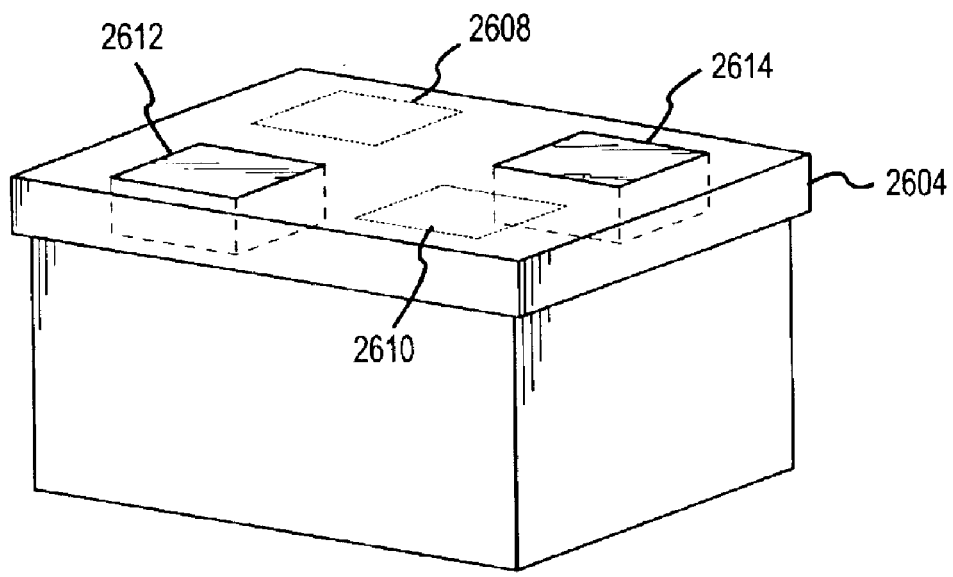
FIG. 26 illustrates a perspective view of a temperature-controlled shipping container in accordance with an embodiment of the present invention utilizing multiple cooling devices.

A similar embodiment is illustrated in FIG. 26. In this embodiment, the top portion 2604 includes a plurality of perforated cut-outs, e.g., cut-outs 2608 and 2610. The cut-outs are adapted to receive and support a sorption cooling device, such as cooling devices 2612 and 2614 in the top portion of the container. In this way, any number of cooling devices (e.g., from 1 to 4) can be selected depending on the anticipated cooling demand for the container, without the added costs associated with containers having different configurations. A user can simply calculate the cooling demand and select the number of cooling devices accordingly.

Figure 27:
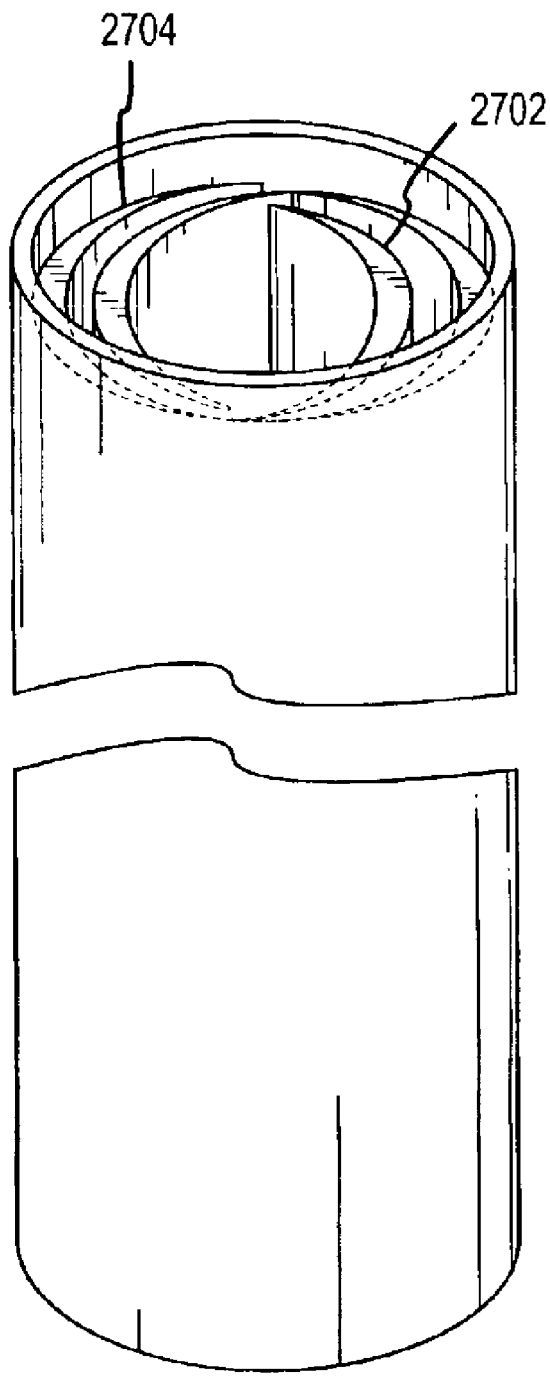
FIG. 27 illustrates a perspective view of a sorption cooling device in accordance with an embodiment of the present invention disposed in a cylindrical shipping container.

FIG. 27 illustrates an embodiment of the present invention wherein a flat and flexible cooling device is disposed in a cylindrical shipping container having one continuous sidewall. The cooling device includes an absorber portion 2704 that is disposed to face the exterior of the container and an evaporative portion 2702 (i.e., a cooling surface) that is disposed adjacent to the central portion of the container to cool a product disposed therein.

It will also be appreciated that the sorption cooling devices according to the present invention can also be disposed in other containers, such as in flat mailing envelopes. For example, a sorption cooling device can be disposed in an envelope that is adapted to carry a temperature sensitive product. The product can then be shipped to a consumer or the consumer can purchase the product and take the product home in the temperature controlled envelope.

Table 3 illustrates the cooling performance of a sorption cooling device in accordance with the present invention as compared to the prior art.

TABLE 3

| Cooling Mechanism | Cooling Options | | |
|---|---|---|---|
| | Nominal Temperature (° C.) | Energy/Mass (W · hr/kg) | Energy/Volume (kW · hr/m$^3$) |
| Ice/Gel Packs* | 0 | 92 | 92 |
| Dry Ice* | −78 | 208 | 175 |
| Liquid Nitrogen* | −196 | 55 | 44 |
| Phase Change Materials* | Variable | 30–70 | 30–60 |
| Sorption Cooling | −20 to +20 | 180–315 | 145–250 |

*Prior Art

For optimal cooling performance while maintaining reasonable mass and the volume for reduced shipping costs, is desirable that the energy density values (energy/mass and energy/volume) be as high as possible. As is illustrated in Table 3, although ice/gel packs have a relatively low cost, the energy density values are relatively low. Therefore, a large mass and volume of the ice/gel packs is required to cool the shipping container.

Likewise, liquid nitrogen and phase change materials also have very low energy densities. Although dry ice has a higher energy density, dry ice is considered hazardous and is not an acceptable material for air freight.

Absorption cooling in accordance with the present invention provides a useful range of cooling, from −20° C. to +20° C., and has a high energy density. The energy density values listed for the sorption cooler are based upon a desiccant absorption capacity of 50 weight percent to 200 weight percent and a total mass or volume based on the sum of the liquid and the desiccant. The actual value will depend on the desiccant capacity and the packaging configuration. Preferably, the mass energy density is at least about 100 W·hr/kg, more preferably at least about 180 W·hr/kg. Further, the volume energy density is at least about 80 kW·hr/m$^3$ and more preferably is at least about 150 kW·hr/m$^3$. In some instances, it may be desirable to cool the cooling device, e.g., in a refrigerator before utilization to provide increased cooling capacity.

The temperature controlled shipping containers in accordance with the present invention can be utilized to transport a number of products while maintaining the temperature of the products below or within a specified temperature range. Products that can advantageously be transported in accordance with the present invention include, but are not limited to heat-sensitive products such as: pharmaceuticals such as protein-based pharmaceuticals, vaccines and insulin; food and beverage products such as confectionary products; floral products; biological samples such as blood, tissue, organs, eggs and semen; semiconductor chemicals; paints; electronics; photographic film; adhesives; and cosmetics.

The temperature-controlled shipping containers of the present invention can maintain a reduced temperature within the product cavity for an extended period of time. In one embodiment, the product cavity can be maintained at a temperature of not greater than about 8° C. for at least about 24 hours, more preferably at least about 48 hours and even more preferably at least about 72 hours. Shipping containers can be fabricated to meet virtually any cooling demand for a period of time of up to 100 hours or longer, if necessary.

EXAMPLES

Shipping Containers

Prototype temperature-controlled shipping containers according to the invention were fabricated. While the temperature-controlled shipping containers of the present invention are not considered to be restricted by size, two different size sorption cooling devices were tested. "Size A" had dimensions of 7"×8"×1.5" (178 mm×203 mm×38 mm) and "Size B" had dimensions of 5"×6"×1.25" (127 mm×152 mm×32 mm).

The sorption cooling devices include layers of different materials stacked on each other. These layers will be described in order from the exterior face of the cooling device (i.e., the absorber) to the interior face (i.e., the cooling surface of the evaporator)that faces the internal cavity of the container.

A. Absorber

To form the absorber, a dessicant is contained by a porous bag sealed by an ACCU-SEAL 50 (Accu-Seal Corporation, San Diego, Calif.). The porous bag is constructed of a spun bonded polyethylene material (ReeMay, Old Hickory, Tenn.). The finished desiccant bag dimensions are about 7"×8" (178 mm×203 mm) for a Size A cooler and 5"6" (127 mm×152 mm) for a Size B cooler, as measured from the inside of one seal to the inside of the opposite seal. The dessicant is uniformly distributed within the bag when the bag is laying flat. Size A utilized 80 grams of dessicant while Size B utilized 25 grams of desiccant. The desiccant was a surface modified desiccant consisting of lithium chloride (LiCl) dispersed on an activated carbon support in a 1:1 mass ratio. To fabricate the desiccant, lithium chloride salt was dissolved in water and dried activated carbon was added to the solution. The solution was dried, leaving a composite desiccant of activated carbon impregnated with 50 wt. % lithium chloride.

B. Thermally Insulating Material (Vapor Passageway)

The vapor passageway of the sorption cooling device included three separate layers: a 1" (25.4 mm) thick piece of INSTILL (an extruded open-cell polystyrene material available from Dow Chemical Company, Midland, Mich.) sandwiched between two layers of MANNIGLASS 60 (a nonwoven fiberglass available from Lydall, Inc. Manchester, Conn.). For a Size A cooler, the first MANNIGLASS layer and the INSTILL layer are cut to a size of 7"×8" (178 mm×203 mm) and the second layer of MANNIGLASS is cut to a size of 5"×6" (127 mm×152 mm). The INSTILL is drilled with a ⅛" (3.2 mm) drill bit in a 5"×6" (127 mm×152 mm) area centered in the middle of the INSTILL layer, with a hole density of about 7 holes per square inch (about 1 hole per square centimeter). For a Size B cooler, all three insulating pieces are cut to a size of 5"×6" (127 mm×152 mm). The INSTILL piece is drilled with a ⅛" (3.2 mm) drill bit over the entire 5"×6" area so that it has a hole density of about 7 holes per square inch (about 1 hole per square centimeter).

C. Evaporator

A composite material consisting of an expanded tetrafluoroethylene (ETFE) fluorocarbon polymer (TEFLON, E.I. duPont deNemours and Company, Wilmington Del.) laminated onto a spun bonded polyethylene material was obtained from Tetratex, Feasterville, Pa. The composite material had an average pore size of 1 $\mu$m and was in the form of a bag. For a Size A cooling device, the width of the bag is 8" (203 mm) and the length is at least 16" (406 mm). For a Size B cooling device, the width of the bag is 5" (127 mm) and the length is 6" (152 mm). The bag is sealed using an ACCU-SEAL 50 with the interior of the bag containing the wicking material. The wicking material is a KIMWIPE EX-L (Kimberly-Clark Corporation, Roswell, Ga.), a paper tissue manufactured from 100 percent virgin wood fiber. The dimensions of the paper tissue is 7"×8" (178 mm×203 mm) for a Size A device and 5"×6" (127 mm×152 mm) for a Size B device.

D. Water Reservoir System

For a Size B device, the water reservoir system included a small water reservoir taped to the center of the wicking material. For a Size A device, the water reservoir system included a small starter water reservoir in a first pouch and a large water reservoir in a larger second pouch These will be described separately.

1. Large Water Reservoir and Pouch a. Water Reservoir

The water reservoir bag was fabricated from a plastic material cut and sealed in the shape of a rectangle having a size of 4"×3" (102 mm×76 mm). The plastic is a polyester-polyethylene material available from Rollprint Packaging Products, Addison, Ill. The plastic bag is sealed on all four sides with little or no air in the sealed bag. A graduated syringe with an 18 gauge needle is used to fill the bag. A corner of the bag is punctured with the needle through one side of the plastic and the bag is filled with the water from the syringe. The Size A bag is filled with 40 milliliters of water. The plunger of the emptied syringe, with the needle still in the bag, is slowly pulled to extract any trapped air in the bag. With the needle still in the bag, the puncture in the bag is placed on the ACCU-SEAL 50 so that the machine seals the bag closed. The needle is not removed from the bag until the machine is in the process of sealing the bag so that no water leaks out of the puncture. Once the full bag is sealed, it is very flexibleand the bag must be resealed repeatedly to form a progressively smaller bag until the full bag cannot be sealed to a smaller size. Any excess edges formed from the sealing are trimmed with a ¼" (6.4 mm) edge remaining and these edges are taped flat to the tightened bag. A 1"×¾" (25.4 mm×19.1 mm) puncturing device (described below) is taped to one face of the full reservoir ensuring that the tape does not cover the point of the puncturing device. This device is described more fully below.

b. Large Pouch with Filter

The large water reservoir was contained within a large triangular pouch having a 1 cm×1 cm filter at one end. The filter was cut from a larger piece of a 0.1 $\mu$m filter material (Micron Separations Inc., Westboro, Mass.). The triangular pouch has dimensions of 7" (178 mm) across the base and two equal 6" (152 mm) sides. The filter was sealed with an ACCU-SEAL 50 into one side of the narrow point of the triangular pouch. The large water reservoir was placed in the pouch near the base. To create channels to carry water from the punctured reservoir to the filter, a plastic cord was used that is approximately 8" (203 mm) in length. To create the channels, the cord was doubled and one end of the cord is placed under the filter. The doubled cord reaches the reservoir and is in contact with the point of the puncturing device. Finally, the large pouch was completed by sealing with the ACCU-SEAL 50 across the base.

2. Starter Water Reservoir and Pouch a. Starter Water Reservoir

The starter bag was constructed of the same plastic material and in an identical manner as the large reservoir described above. However, the initial dimensions of the plastic bag are 1½×2" (38 mm×51 mm). This starter bag contains 5 milliliters of a solution containing 10 wt. % NaCl and 90 wt. % water. As described earlier, the bag was sealed so that it is tight. A puncturing device was attached to one face of the reservoir with tape.

b. Starter Water Reservoir Pouch

The starter water reservoir pouch was constructed of the same plastic material as the reservoirs and pouches described above. However, the shape of the starter pouch is roughly T-shaped. The upper bar of the T-shape is approximately 2" (51 mm) in width and 4" (102 mm) in length while the leg of the T-shape is approximately ½" (13 mm) in width and 8" (203 mm) in length. The starter pouch has a 1 mm hole punctured through one side of the plastic about ¼" (6.4 mm) from the bottom of the T-shape. A 14" (356 mm) long cord was doubled and one end placed so that it surrounds the hole at the bottom of the pouch. The doubled cord reaches the starter reservoir and is in contact with the point of the puncturing device.

3. Puncturing Device

A puncturing device is made from a 0.034" (0.86 mm) thick aluminum sheet. It is cut in a teardrop shape approximately 1"×¾" (25.4 mm×19.1 mm) for the large water reservoir and approximately ½"×¼" (12.7 mm×6.4 mm) for the small water reservoir. The point of the teardrop is sharp and is slightly bent so that when the device is taped to the reservoir, the point presses into the reservoir.

4. Attaching Water Reservoir System to Evaporator (Size A only)

The starter pouch is attached so that the end with a hole punctured in it is centered on the wicking material. The starter pouch is attached with a minimum of tape. The filter end of the larger pouch is attached to the 8" (203 mm) side of the wicking material approximately ½" (12.7 mm) from the edge. Both the starter pouch and the larger pouch extend in the same direction over the same edge of the wicking material. The pouches and attached wick are placed inside the ETFE composite bag. The wick lies flat in the composite ETFE bag and any wrinkles are removed. Once the pouches and the wicking material are placed in the composite ETFE bag, the bag is sealed.

E. Assembly of Cooling Device

1. Size B Cooling Device

From bottom to top, the cooling device is fabricated by stacking the MANNIGLASS on top of the desiccant bag, followed by the INSTILL layer and the remaining layer of MANNIGLASS.

The composite ETFE bag is laid on top with the water reservoir facing out. The stacked components are placed into a plastic bag made of the polyester-polyethylene laminate material described above. This bag has a sufficient size to contain the entire component stack. The bag is then evacuated to a pressure of 1.73 torr (2.3 mbar).

2. Size A Cooling Device

From bottom to top, the cooling device is formed with the desiccant bag first. Next, a layer of MANNIGLASS is laid on top of the desiccant bag, followed by the INSTILL, followed by the remaining layer of MANNIGLASS.

The composite ETFE bag is laid on top of that with the water reservoirs facing outwardly and the composite ETFE bag is arranged on top of the insulation so that the wicking material inside the composite ETFE bag is directly over the insulation. The composite ETFE bag should extend over one end of the insulation.

The stacked components are placed into a plastic bag made of the polyester-polyethylene laminate material described above. This bag is of sufficient size to contain the stacked components. The bag is then evacuated to a pressure of 1.73 torr (2.3 mbar).

F. Shipping Containers

The containers were constructed of pieces of an insulating material taped together to form four sides and a bottom. The cooling device to be tested is placed on the top of the container, thereby enclosing the shipping cavity.

1. VIP Container

For illustrative purposes, a container was constructed of 1" thick vacuum insulation panels (VIPs), the dimensions of the five pieces were: two pieces at 6"×6" (152 mm×152 mm), two pieces at 7"×6" (178 mm×152 mm), and one piece at 7"×8" (178 mm×203 mm). U.S. Pat. No. 5,877,100 by Smith et al. provides details on how to assemble an individual VIP and this patent is incorporated herein by reference in its entirety.

The four sides of the container consist of the two 6"×6" and the two 7"×6" pieces with the 7"×8" piece forming the bottom of the box. The pieces are fitted together so that the four sides are perpendicular the bottom and the sides do not hang over the edges of the bottom. Tape is used to secure all pieces to each other and to cover any joints between pieces. The inside cavity of the finished container is 5" wide×6" long×6" deep (127 mm×152 mm×152 mm).

2. EPS Container

A container constructed of 1" thick EPS (expanded polystyrene) material was assembled in a similar manner as the VIP container, except the dimensions of the pieces are as follows: two 6"×6" (152 mm×152 mm), two 7"×6" (178 mm×152 mm), two 9"×10" (229 mm×254 mm), two 8"×6" (203 mm×152 mm) and two 9"×6" (229 mm×152 mm). Before assembling the container, all cut sides of the EPS are taped so that the foam edges do not crumble. The EPS container is double-walled on the sides and the bottom. The two 9"×10" pieces are stacked to form the bottom of the box and the inner wall consists of the two 6"×6" and the two 7"×6" pieces fitted together. The outer walls of the box consist of the two 8"×6" and the two 9"×6" pieces that are fitted together around the inner walls. Tape is used to secure all pieces to each other and to cover any joints between pieces. The inside cavity of the finished box is 5" wide×6" long×6" deep (127 mm×152 mm×152 mm).

To begin cooling, the water reservoir(s) is punctured and the cooling device is quickly placed onto the top of the containers. The Size A cooling device is placed onto the open top of the container with the desiccant facing outwardly. The Size B cooling device is pushed into the container cavity until the desiccant is flush with the top of the sides of the container. For both sizes, the cooling device is secured to the container so that all joints between cooling device and the container are covered with tape.

The performance of the cooling devices was tested by monitoring the temperature as a function of time for the internal cavity of the container near the evaporator, the external surface of the desiccant and the room. Prior to every experiment, Omega Type K thermocouples (Omega Engineering, Stamford, Conn.) were attached to the external surface of the desiccant and to the inside of the container so that the temperature of the center of the internal cavity within the container is measured. The third thermocouple recorded the ambient temperature of the room in which the experiment was being conducted. Data measurements were recorded every 30 seconds for Size B cooling devices and every 5 minutes for Size A cooling devices, beginning about 10 seconds before the water reservoir(s) was punctured. Measurement continued until the internal box temperature and the desiccant temperature were approximately equal.

EXAMPLE 1

Cooling Device with Extended Cooling Time

Example 1 was a Size A cooling device with 400 grams of desiccant and 200 milliliters of water in the slow feed water reservoir. This cooling device also had two layers of wicking material, instead of one. The cooling device was tested in a VIP container and the results are illustrated in FIG. 28, which shows the ambient temperature, desiccant temperature and internal base temperature as a function of time.

Figure 28:
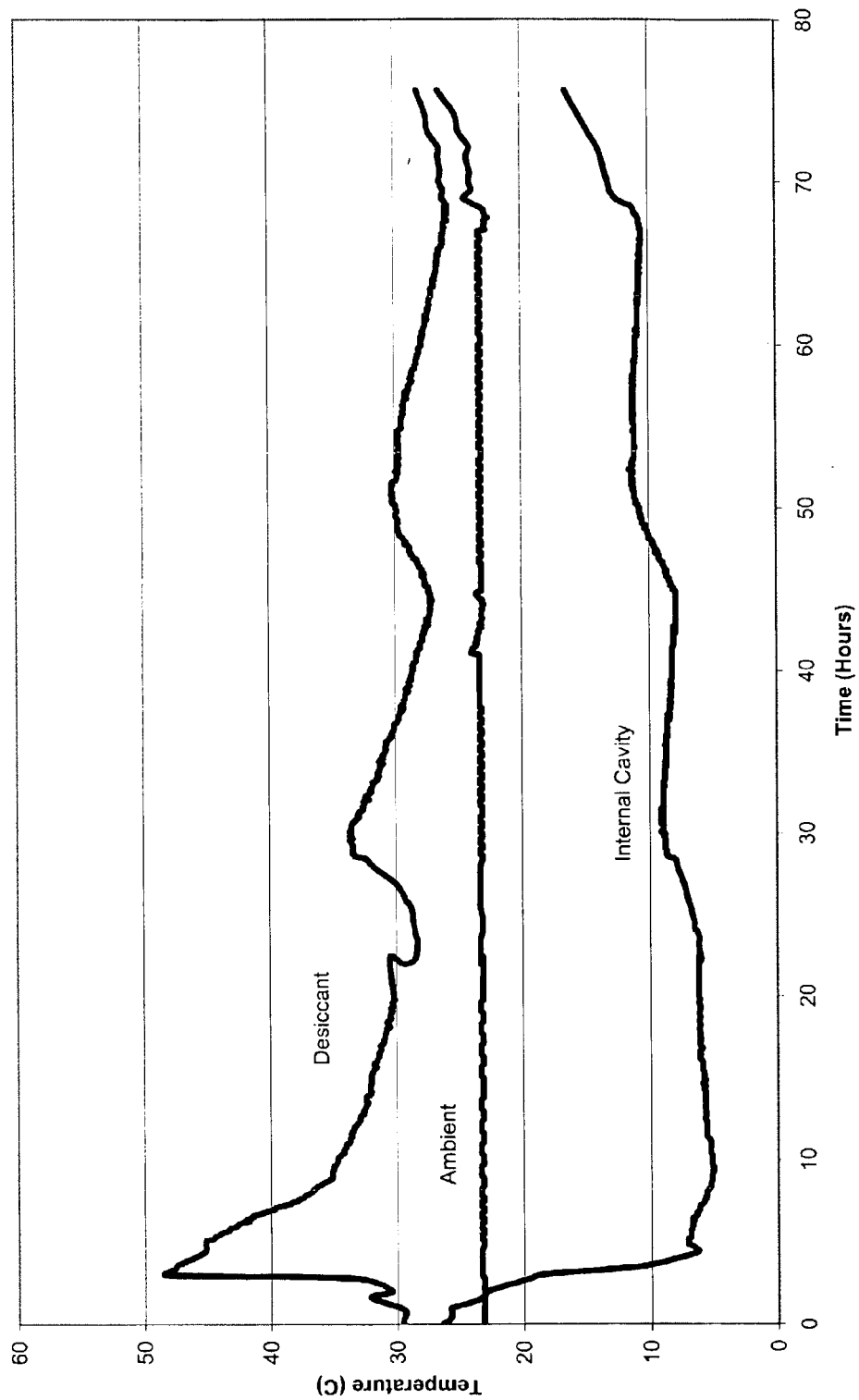
FIG. 28 illustrates the temperature of the desiccant and internal cavity of a temperature-controlled shipping container as a function of time in accordance with an embodiment of the present invention.

As is illustrated in FIG. 28, the temperature of the cavity dropped from about 26° C. to about 6° C. and the temperature did not rise above 10° C. for at least 48 hours.

EXAMPLE 2

Effect of Starter Reservoir on Performance

Figure 29:
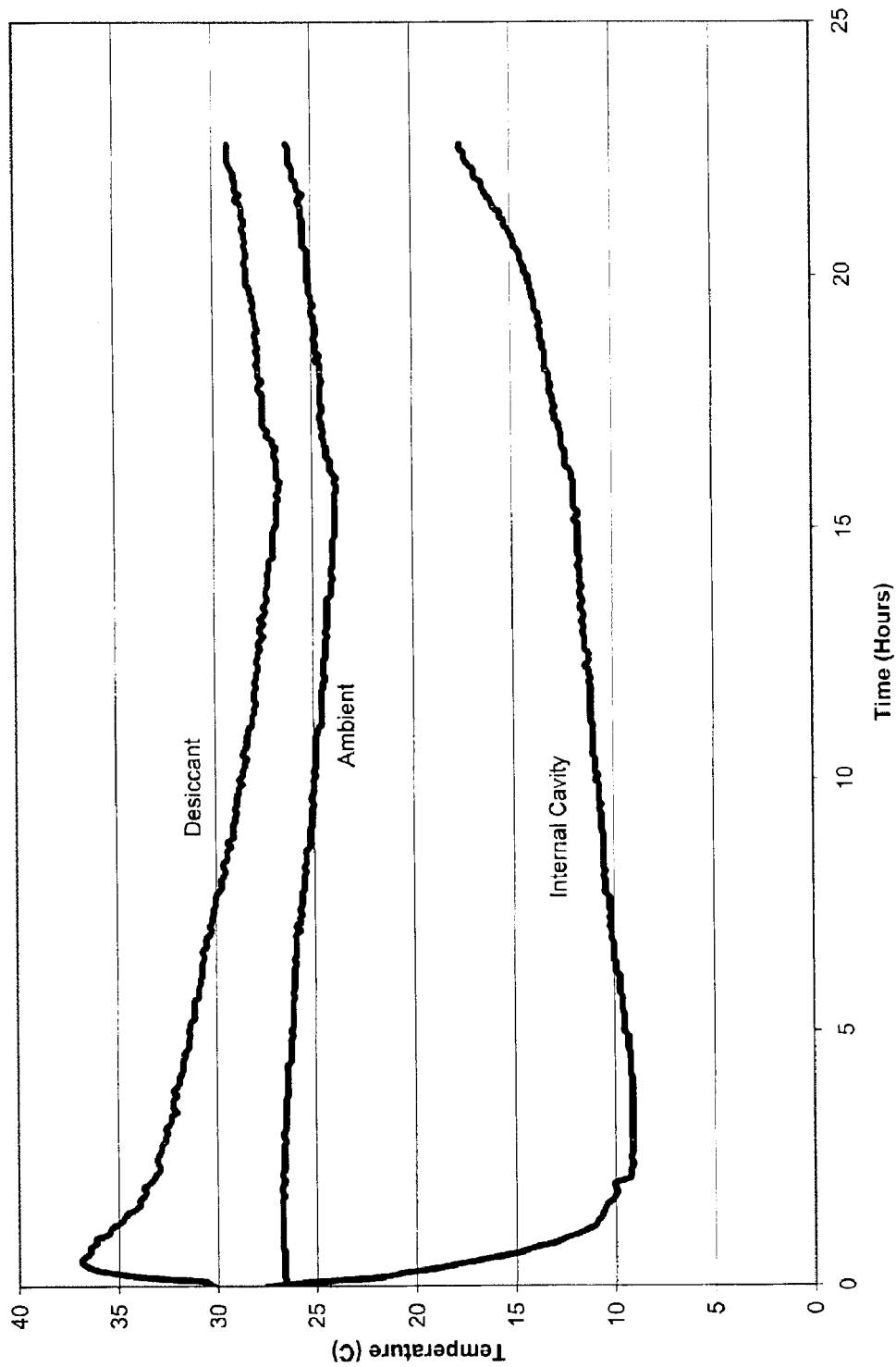
FIG. 29 illustrates the temperature of the desiccant and internal cavity of a temperature-controlled shipping container as a function of time in accordance with an embodiment of the present invention.
Figure 30:
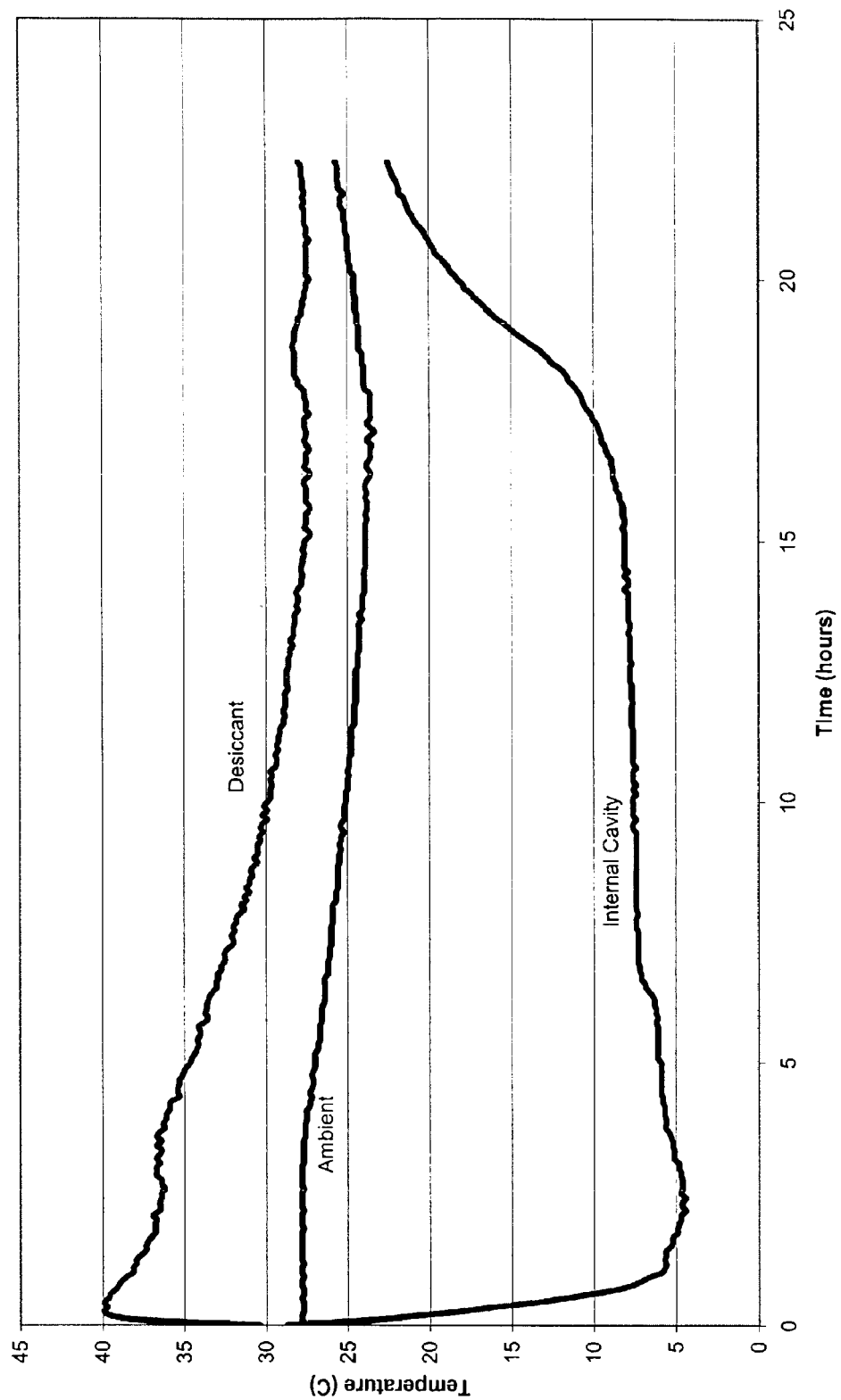
FIG. 30 illustrates the temperature of the desiccant and internal cavity of a temperature-controlled shipping container as a function of time in accordance with an embodiment of the present invention.

Two Size A cooling devices (Examples 2A and 2B) were assembled so that they were identical to each other except that Example 2A did not have a starter liquid reservoir and Example 2B utilized a starter reservoir. Both were tested in VIP containers. The results for Example 2A are illustrated in FIG. 29 and the results for Example 2B are illustrated in FIG. 30. It can be seen that the internal cavity of Example 2B exhibited a rapid drop to less than 5° C., whereas the internal cavity of Example 2A dropped to slightly less than 10° C., demonstrating the effectiveness of utilizing a starter liquid reservoir.

EXAMPLE 3

EPS Container vs. VIP Container

Figure 31:
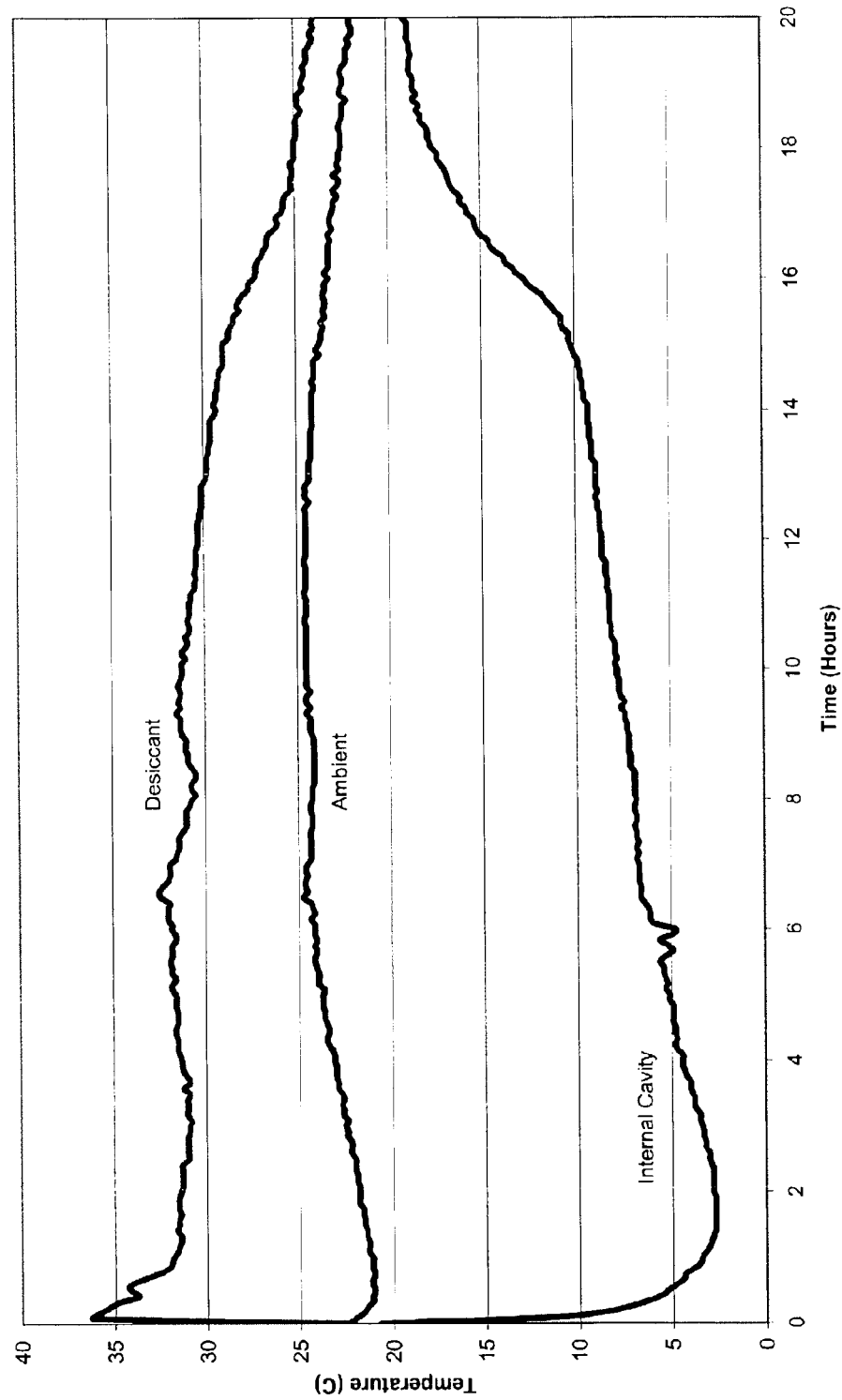
FIG. 31 illustrates the temperature of the desiccant and internal cavity of a temperature-controlled shipping container as a function of time in accordance with an embodiment of the present invention.
Figure 32:
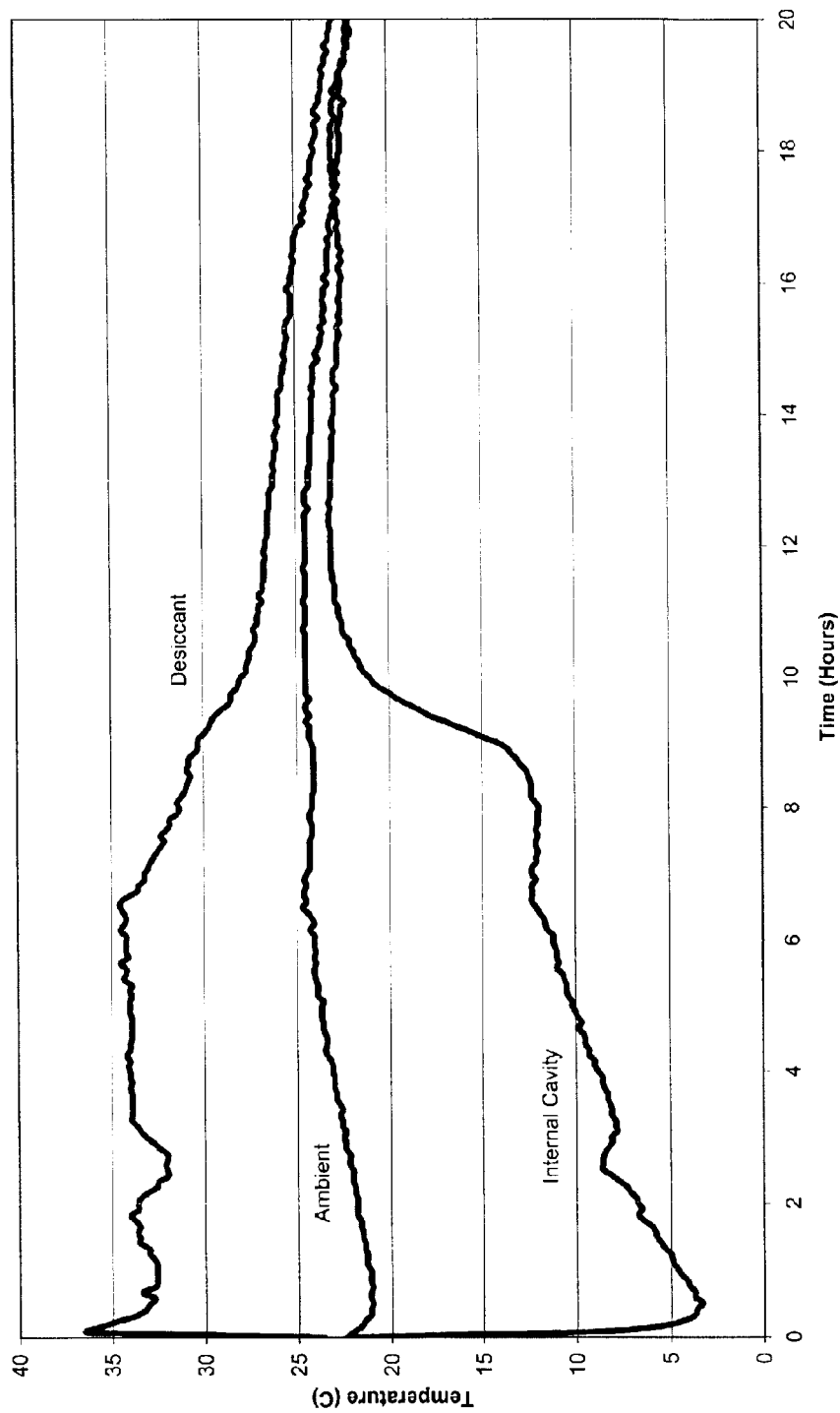
FIG. 32 illustrates the temperature of the desiccant and internal cavity of a temperature-controlled shipping container as a function of time in accordance with an embodiment of the present invention.

Two identical Size A cooling devices were assembled. One (Example 3A) was tested in an EPS container and the other (Example 3B) was tested in a VIP container. The results for Example 3B are illustrated in FIG. 31 and the results for Example 3A are illustrated in FIG. 32.

As expected, the VIP container yielded a reduced internal cavity temperature over a longer period of time due to the improved thermal insulation properties of the VIPs.

EXAMPLE 4

Effect of Different Size Containers

Two identical Size B cooling devices were assembled, however one was tested in a VIP container as described above (Example 4A) with dimensions of 5"×6"×6" (127 mm×152 mm×152 mm) and the other cooling device was tested in smaller sized VIP container (Example 4B). The smaller VIP container had dimensions of 1" deep×5" wide× 6" long (25.4 mm×127 mm×152 mm) and was constructed using VIP panels ¼ (6.4 mm)thick.

Figure 33:
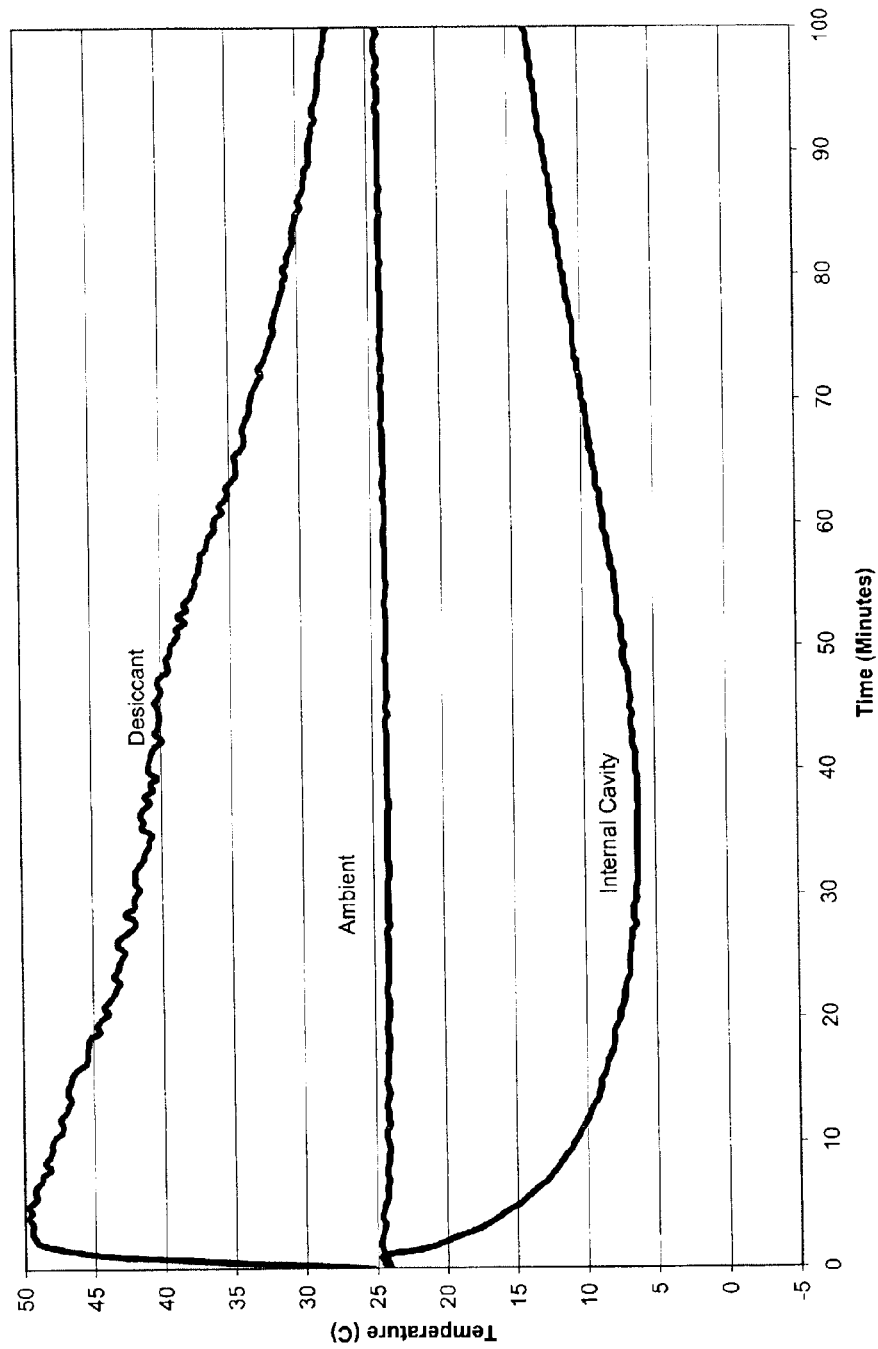
FIG. 33 illustrates the temperature of the desiccant and internal cavity of a temperature-controlled shipping container as a function of time in accordance with an embodiment of the present invention.
Figure 34:
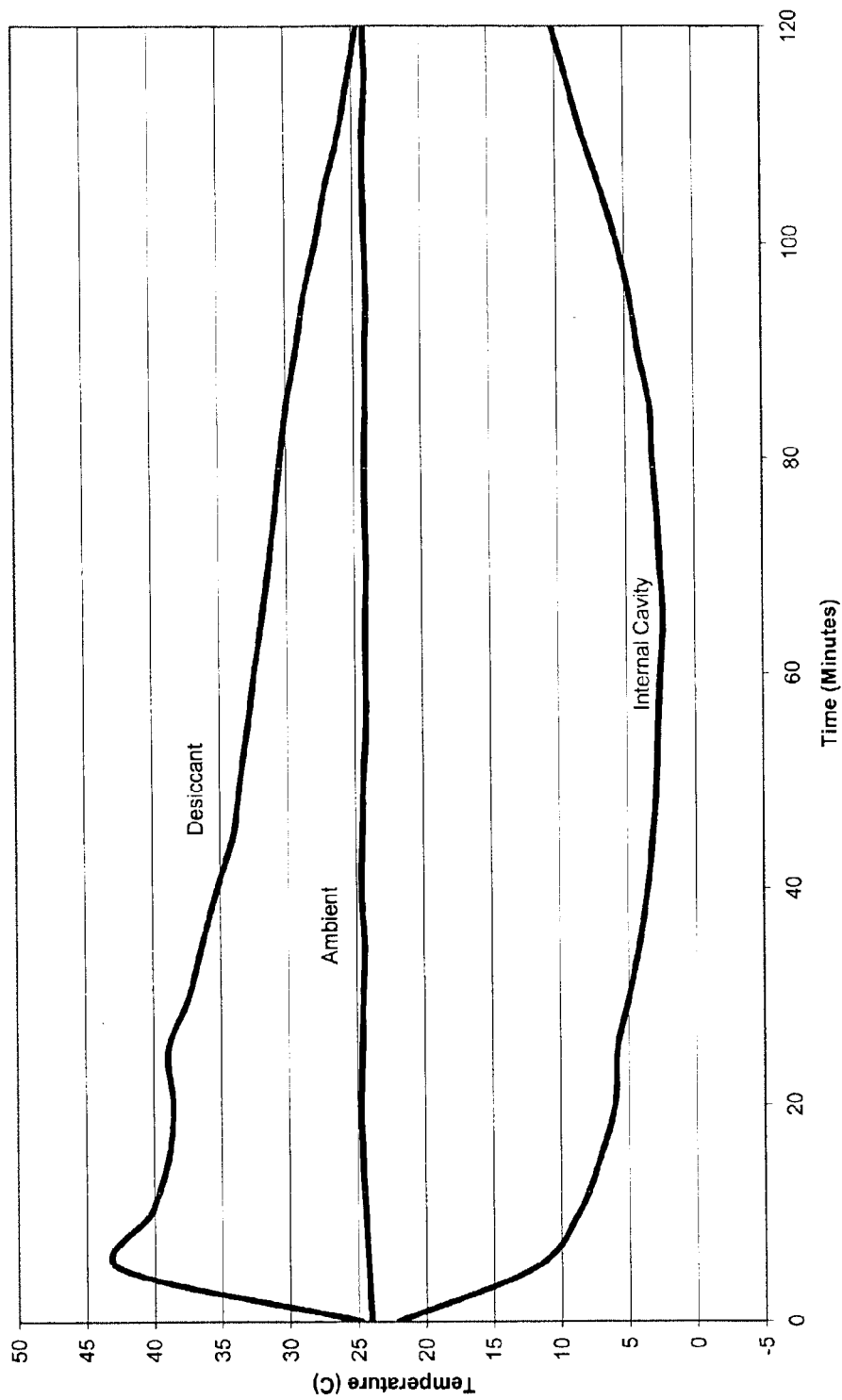
FIG. 34 illustrates the temperature of the desiccant and internal cavity of a temperature-controlled shipping container as a function of time in accordance with an embodiment of the present invention.

The results for Example 4A are illustrated in FIG. 33 and the results for Example 4B are illustrated in FIG. 34. The container having a reduced aspect ratio (Example 4B) maintained a reduced temperature for a longer period of time.

EXAMPLE 5

Different Types of Desiccant

Figure 35:
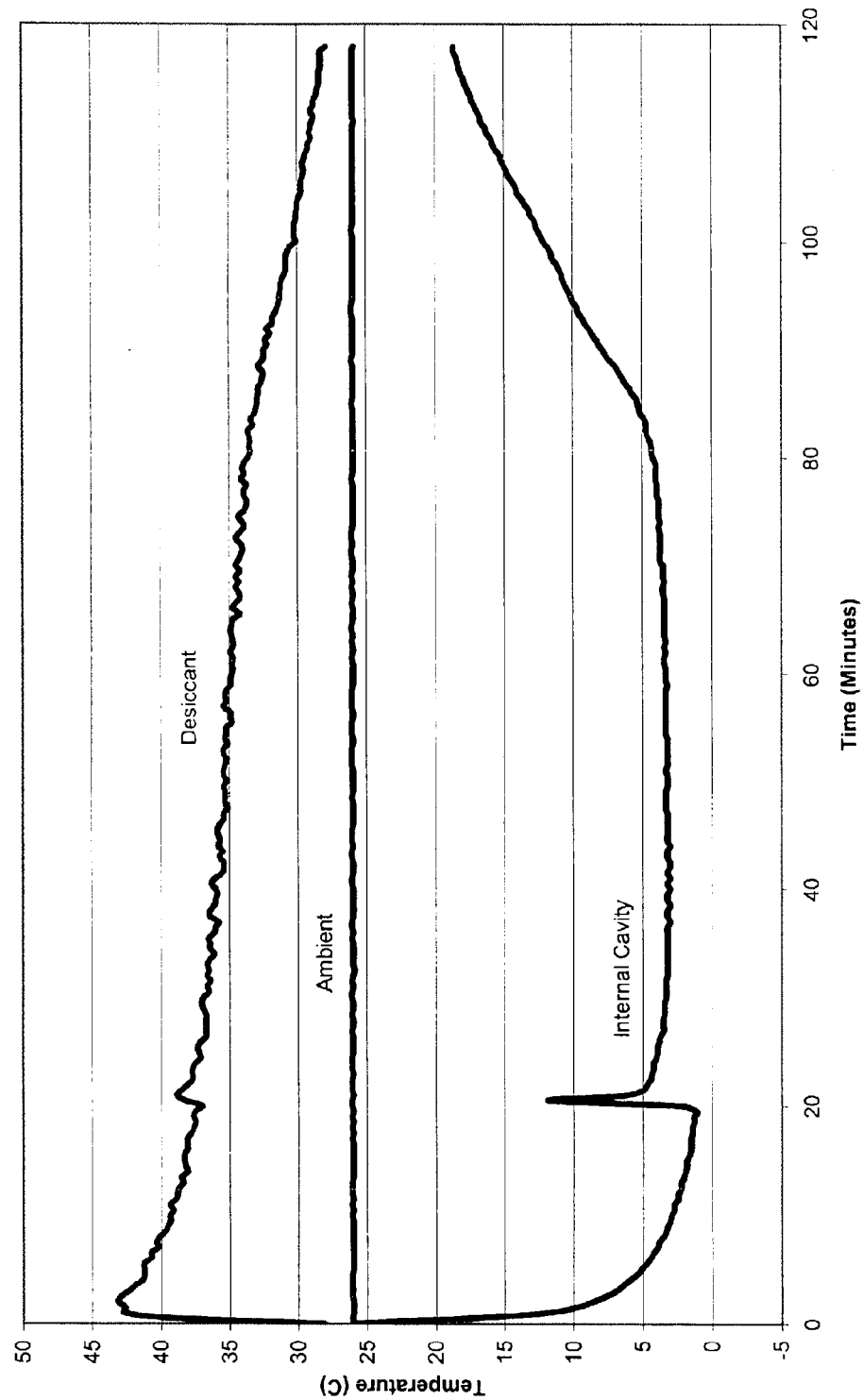
FIG. 35 illustrates the temperature of the desiccant and internal cavity of a temperature-controlled shipping container as a function of time in accordance with an embodiment of the present invention.

Two identical Size B cooling devices were assembled, but Example 5A contained 25 grams of ¹⁄₁₆" 13× Molecular Sieve (EM Science Company, Gibbstown, N.J.) and Example 5B (same as Example 4B) included the composite desiccant as described above. The results for Example 5A are illustrated in FIG. 35 and the results for Example 5B are illustrated in FIG. 34. The composite desiccant maintained a reduced temperature for a longer period of time.

EXAMPLE 6

Effect of Desiccant Type on Cooling Device Performance

Figure 36:
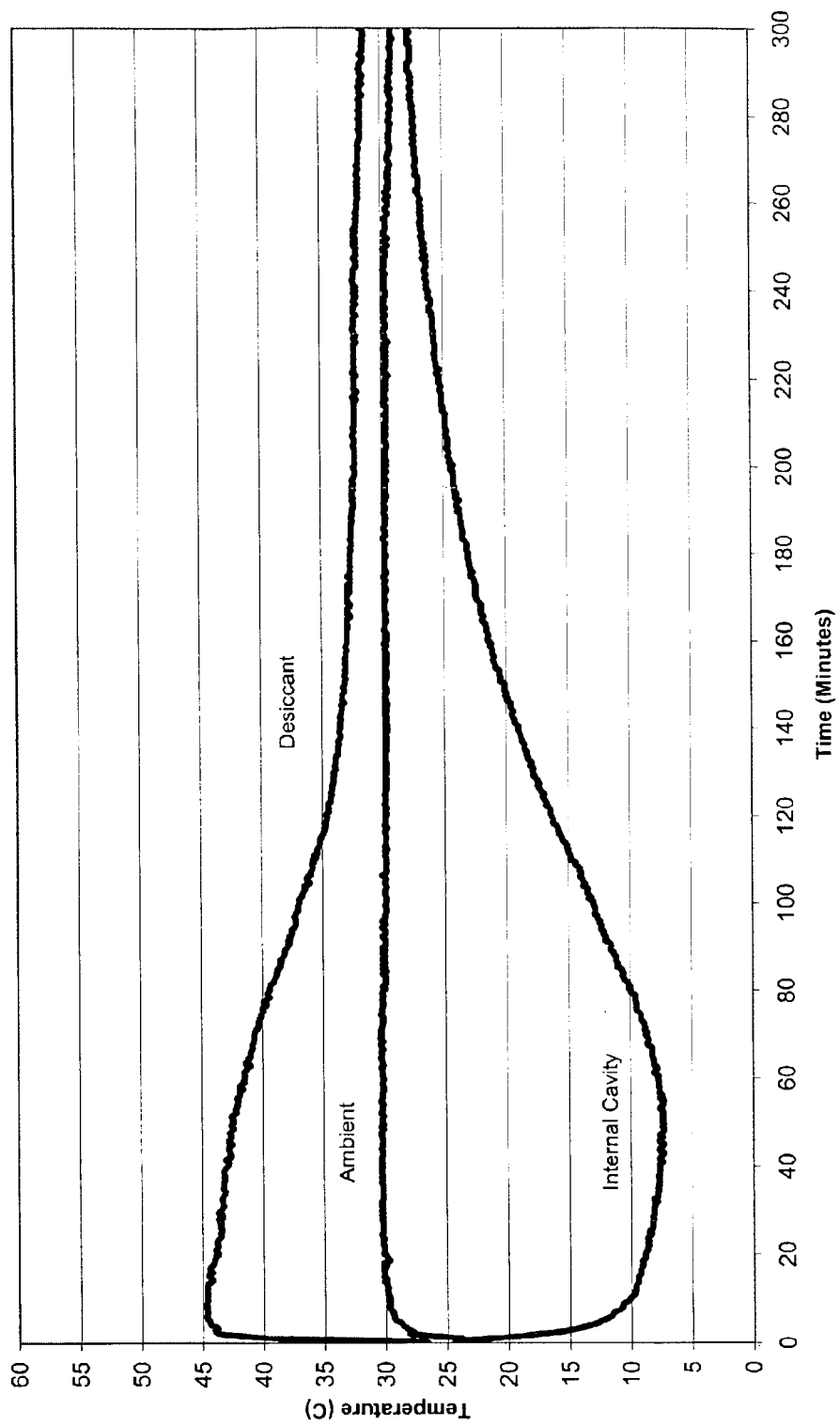
FIG. 36 illustrates the temperature of the desiccant and internal cavity of a temperature-controlled shipping container as a function of time in accordance with an embodiment of the present invention.
Figure 37:
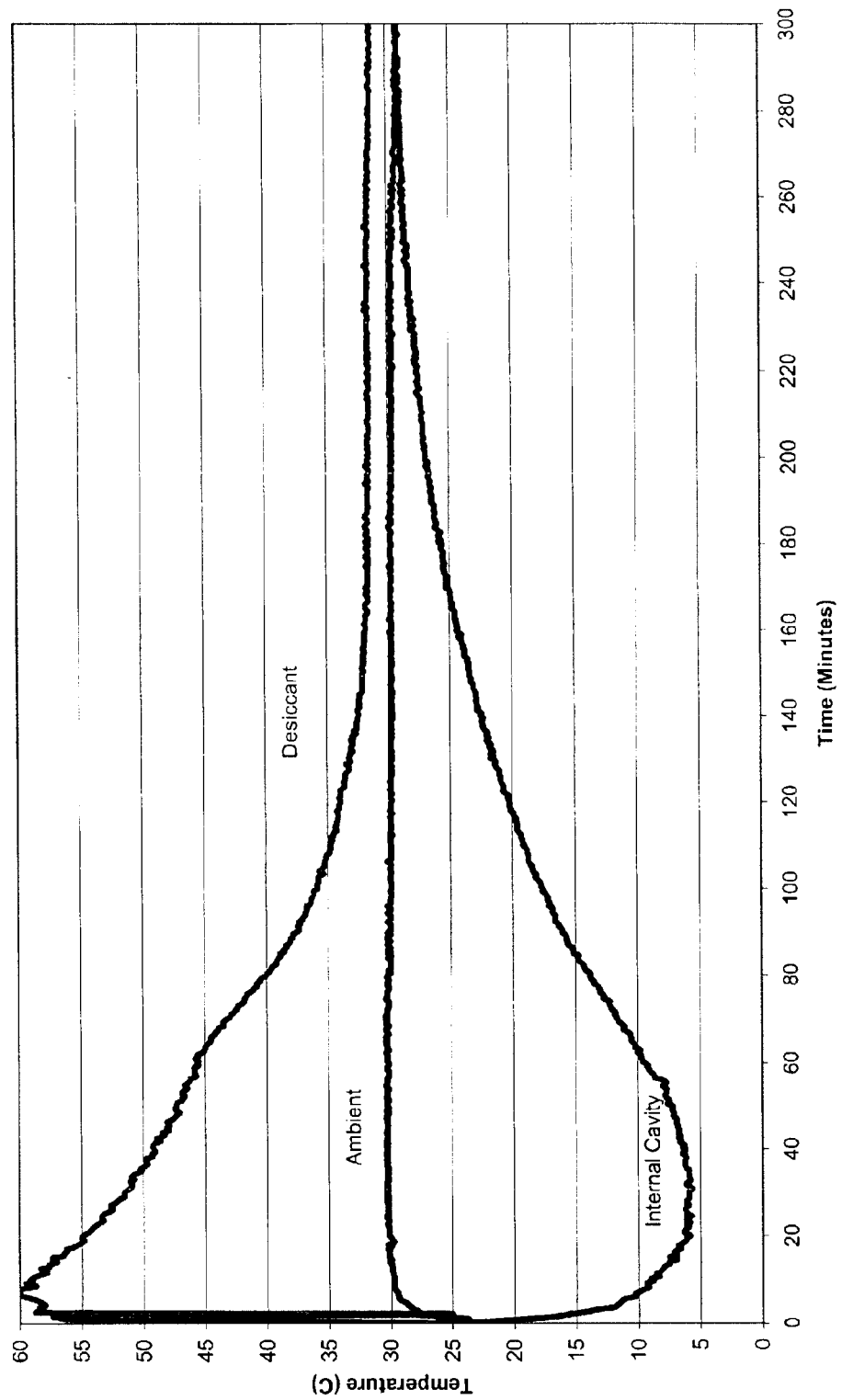
FIG. 37 illustrates the temperature of the desiccant and internal cavity of a temperature-controlled shipping container as a function of time in accordance with an embodiment of the present invention.

Two substantially identical temperature-controlled shipping containers were assembled, but Example 6A contained a zeolite desiccant (Aldrich, Molecular Sieve 13×) and Example 6B contained a composite desiccant as described above. The results are illustrated in FIG. 36 (Example 6B) and FIG. 37 (Example 6A). While both desiccant materials provided adequate cooling, the composite desiccant provided somewhat better results.

EXAMPLE 7

Varying Internal Pressure of Cooling Devices

Figure 38:
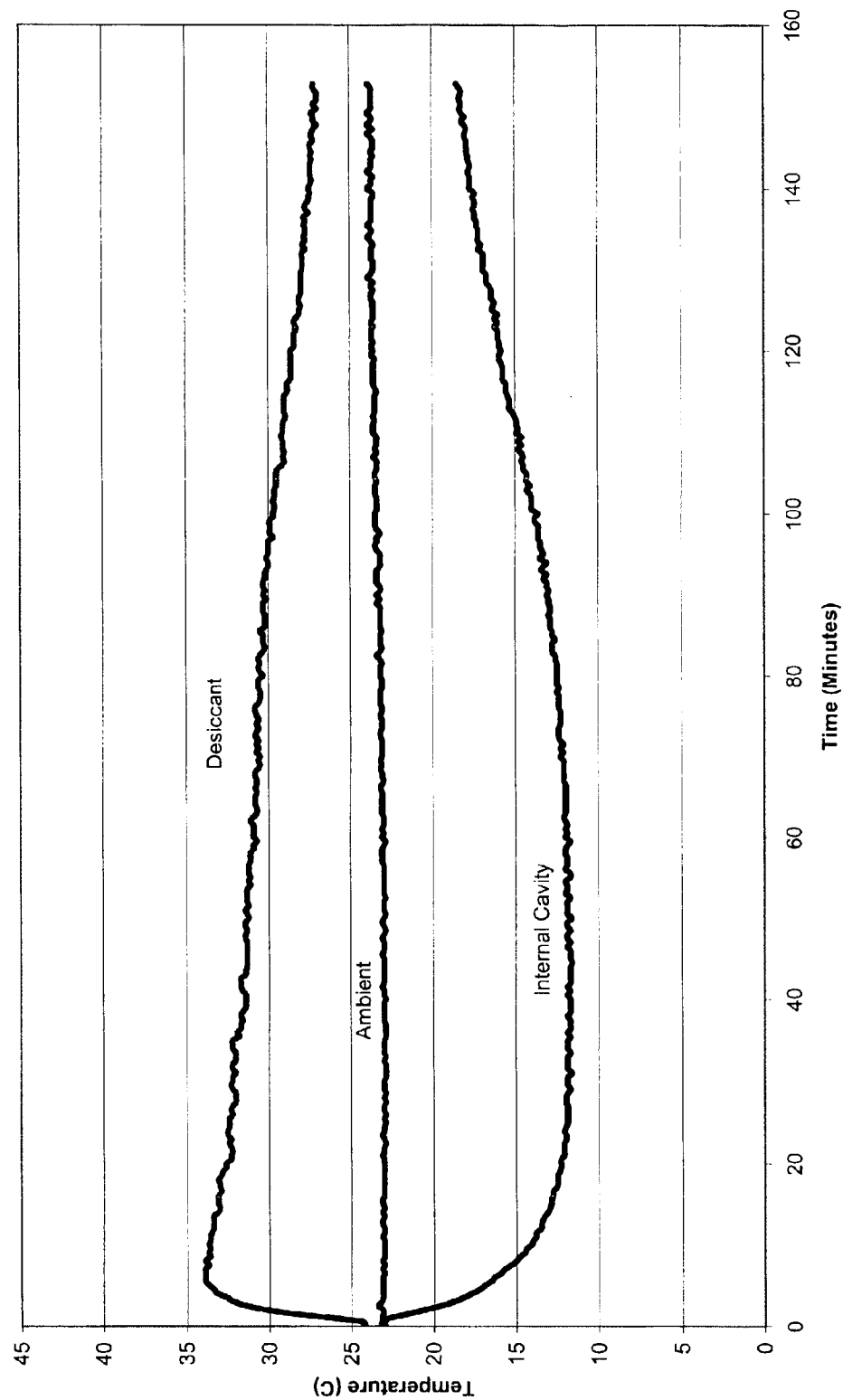
FIG. 38 illustrates the temperature of the desiccant and internal cavity of a temperature-controlled shipping container as a function of time in accordance with an embodiment of the present invention.
Figure 39:
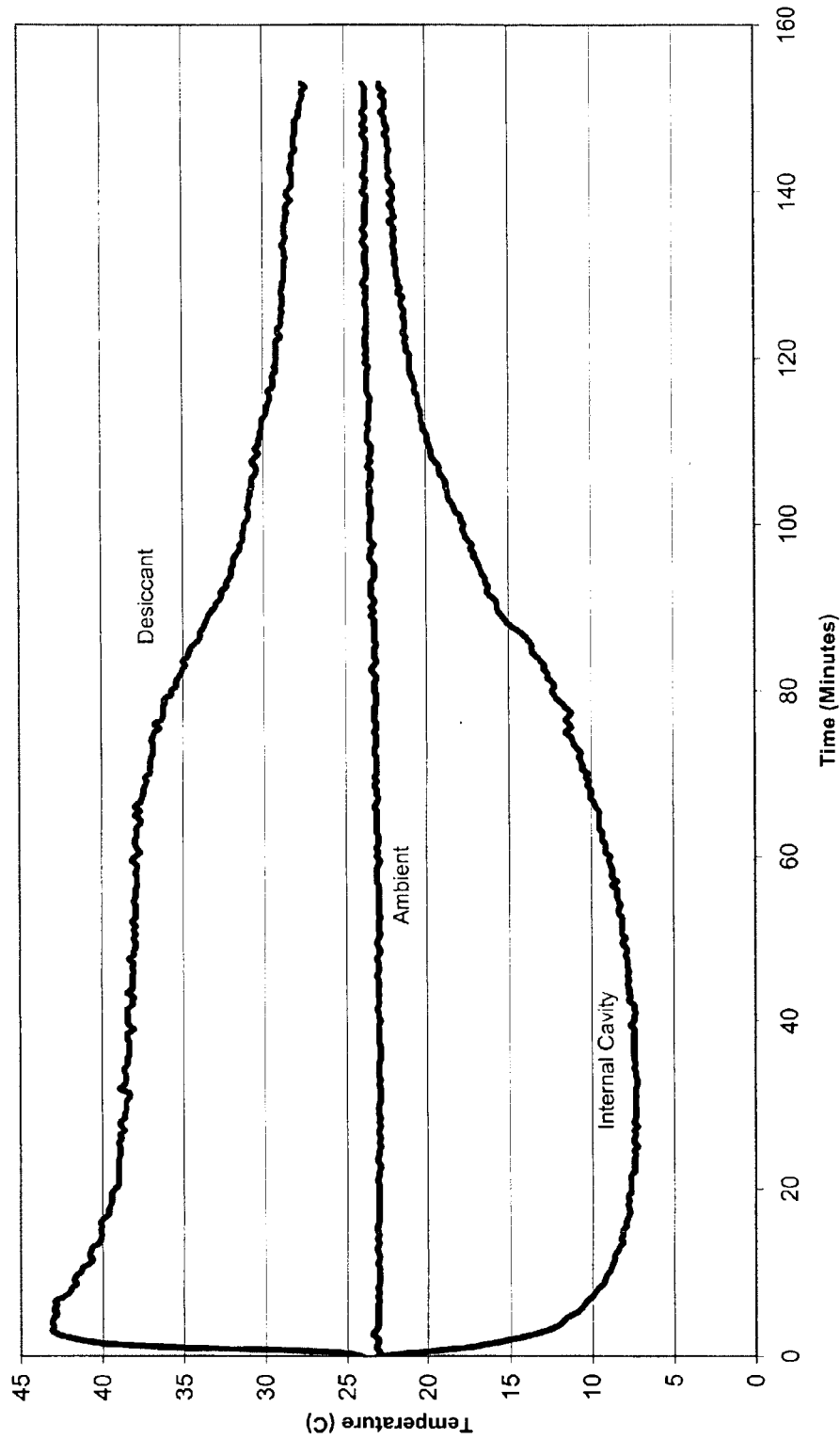
FIG. 39 illustrates the temperature of the desiccant and internal cavity of a temperature-controlled shipping container as a function of time in accordance with an embodiment of the present invention.
Figure 40:
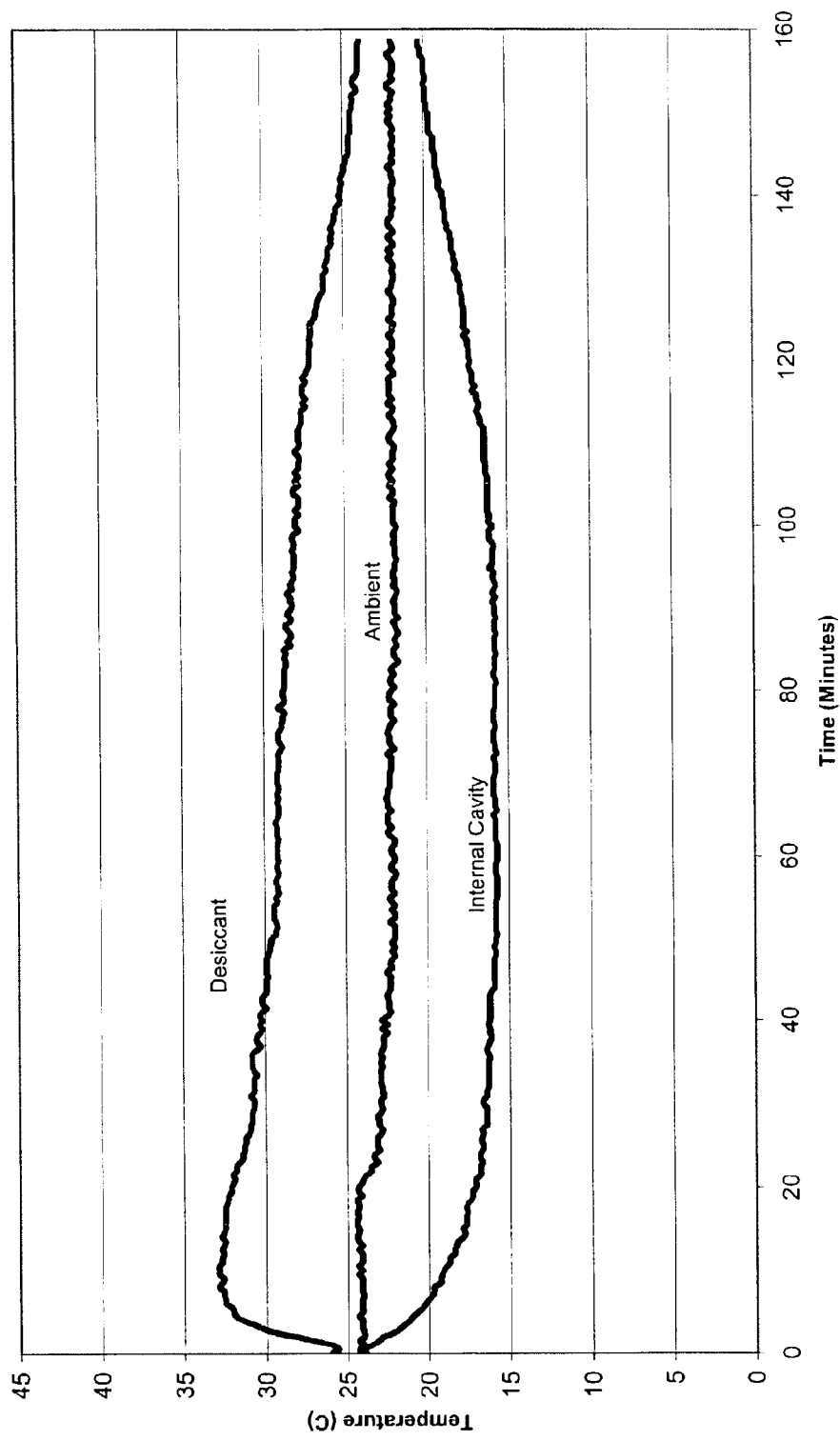
FIG. 40 illustrates the temperature of the desiccant and internal cavity of a temperature-controlled shipping container as a function of time in accordance with an embodiment of the present invention.

In a further set of Examples, three substantially identical cooling devices were assembled, except that each cooling device was evacuated to a different internal pressure, namely 1.7 torr, 10 torr and 40 torr. All three cooling devices were assembled substantially in accordance with the foregoing description and were placed in substantially identical shipping containers. The results are illustrated in FIG. 38 (1.7 torr), FIG. 39 (10 torr) and FIG. 40 (40 torr). The best results over an extended period of time were obtained at the lowest pressures.

EXAMPLE 8

Varying Desiccant Particle Size

Figure 41:
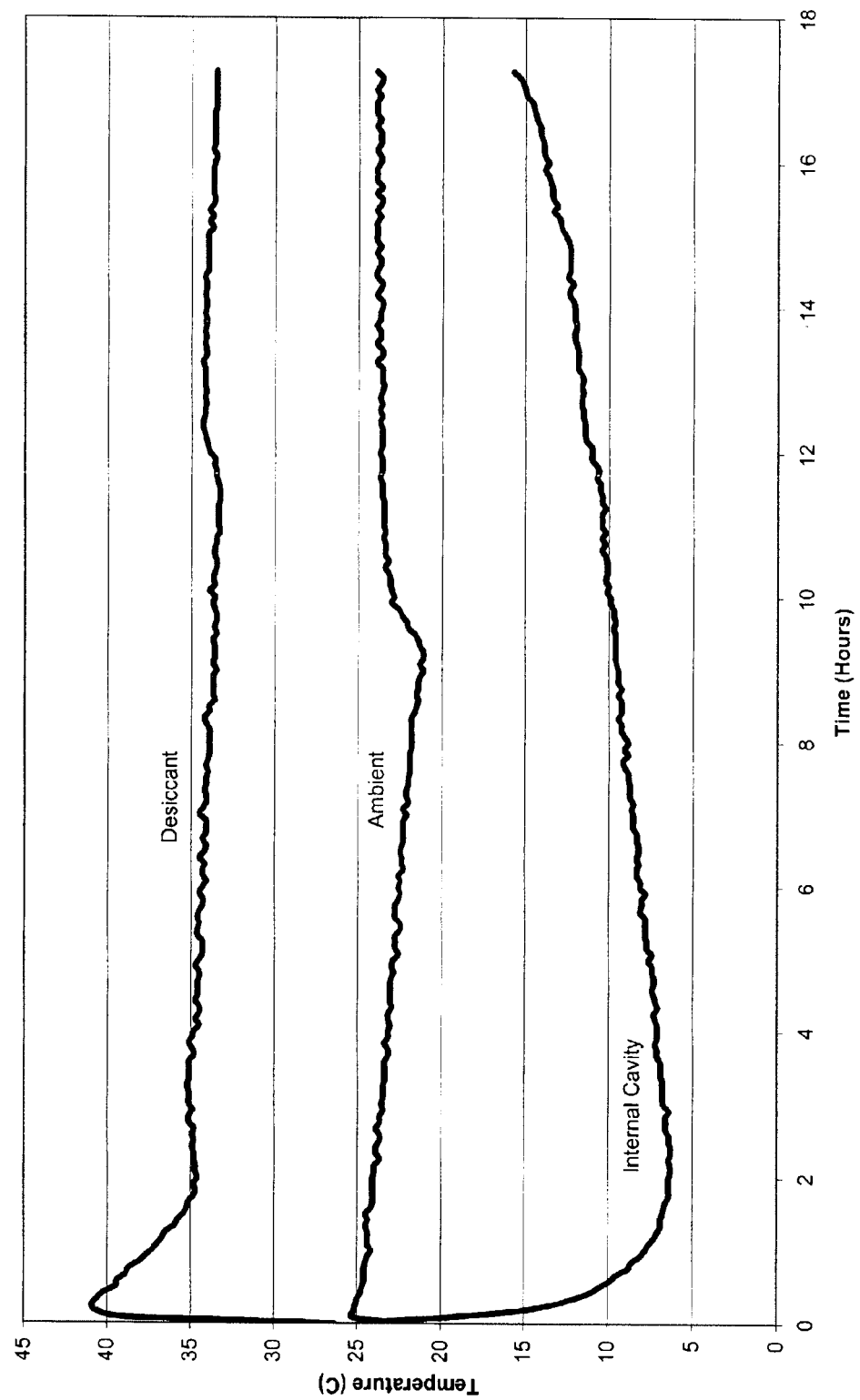
FIG. 41 illustrates the temperature of the desiccant and internal cavity of a temperature-controlled shipping container as a function of time in accordance with an embodiment of the present invention.
Figure 42:
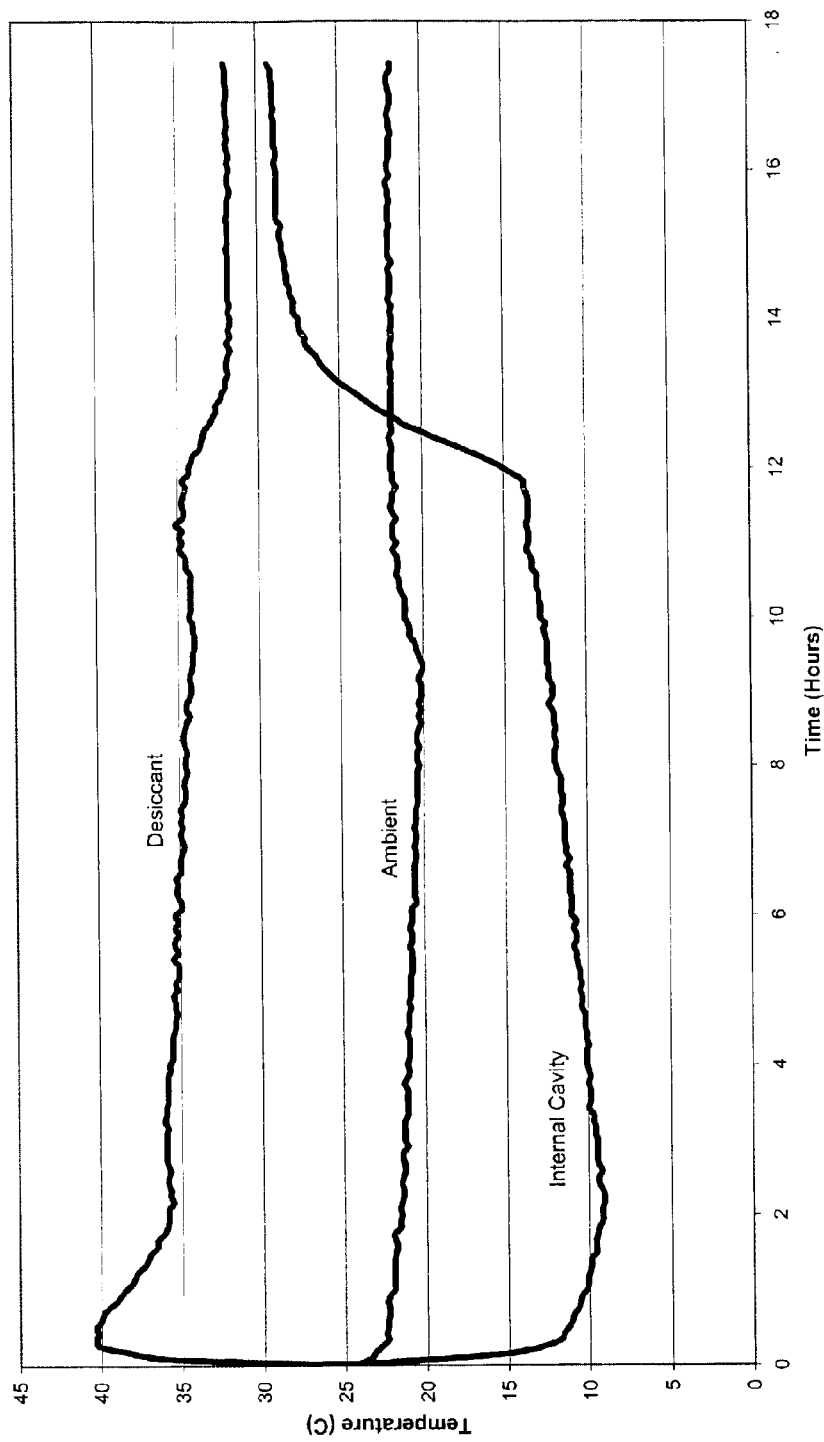
FIG. 42 illustrates the temperature of the desiccant and internal cavity of a temperature-controlled shipping container as a function of time in accordance with an embodiment of the present invention.

Two substantially identical temperature-controlled shipping containers were assembled, but the cooling device of Example 8A included 5×10 mesh pellets of a desiccant formed from LiCl on carbon (MeadWestvaco NUCHAR BAX 1500) and Example 8B included a desiccant made from 10×25 mesh pellets of a desiccant formed from LiCl on carbon (MeadWestvaco NUCHAR WVA 1500) ground to a particle size of 150 μm to 850 μm. The results are illustrated in FIG. 41 (Example 8A) and FIG. 42 (Example 8B). The best results were obtained with the desiccant having a larger particle size.

EXAMPLE 9

Increasing Metal Salt in Desiccant

Figure 43:
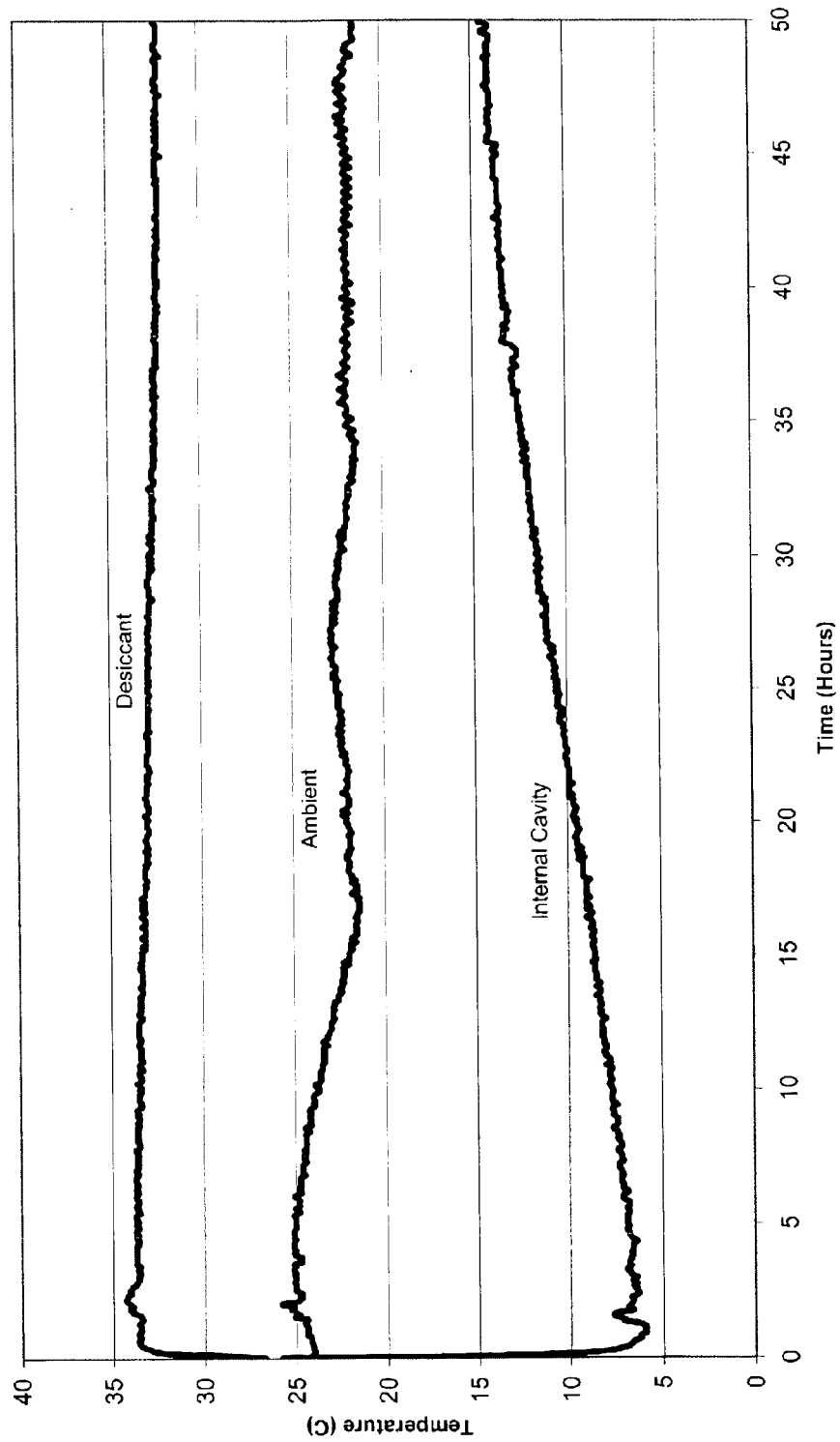
FIG. 43 illustrates the temperature of the desiccant and internal cavity of a temperature-controlled shipping container as a function of time in accordance with an embodiment of the present invention.
Figure 44:
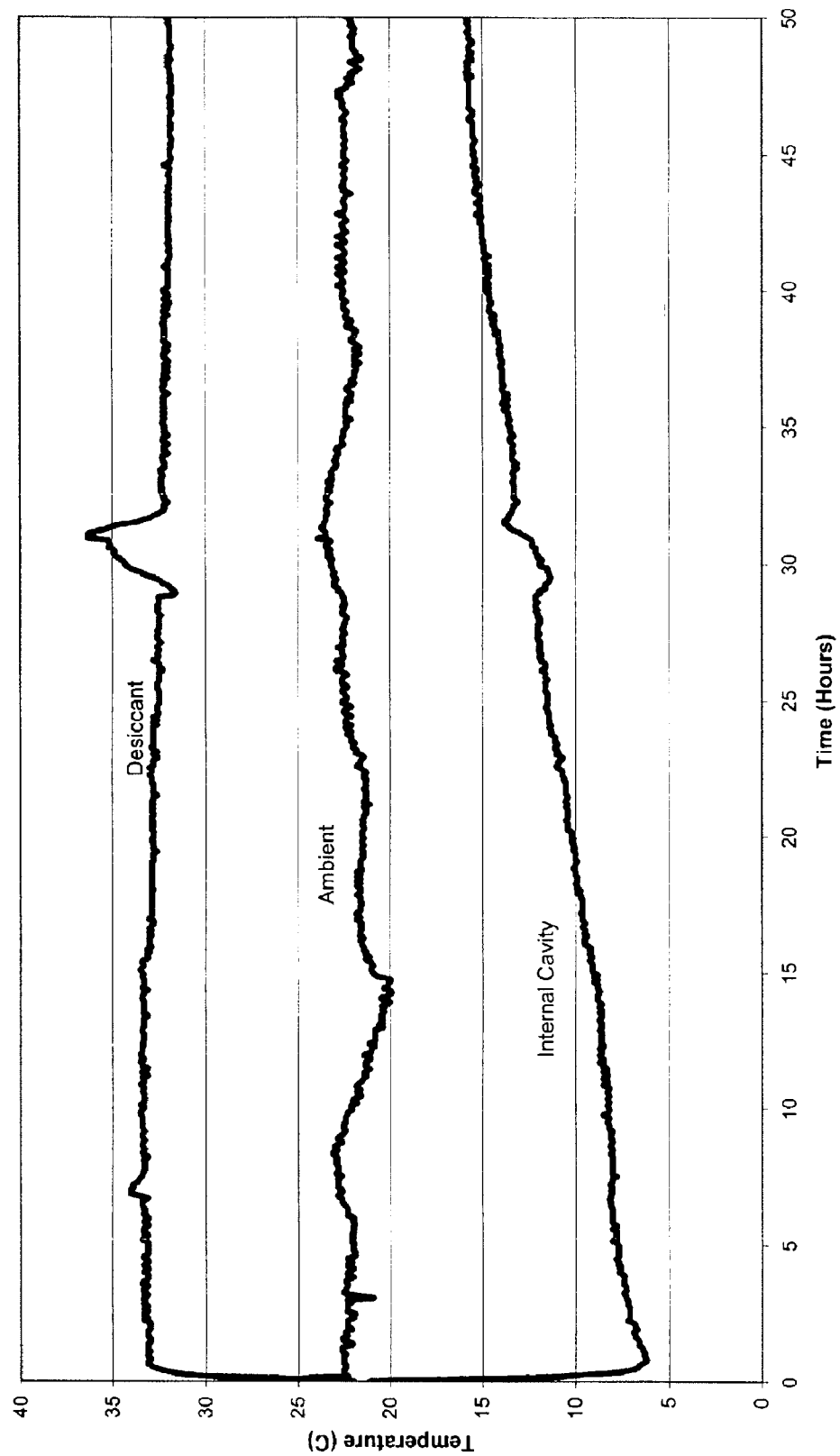
FIG. 44 illustrates the temperature of the desiccant and internal cavity of a temperature-controlled shipping container as a function of time in accordance with an embodiment of the present invention.

Two substantially identical temperature-controlled shipping containers were assembled, but Example 9A comprised an absorber with a composite desiccant including 60 vol. % LiCl and Example 9B comprised an absorber with a composite desiccant including 50 vol. % LiCl. The containers were tested and the results are illustrated in FIG. 43 (Example 9A) and FIG. 44 (Example 9B). It can be seen that the temperature-controlled shipping container with the 60 vol. % LiCl desiccant (Example 9A) remained below 15° C. for at least 50 hours, while the temperature-controlled shipping container remained below 15° C. for about 42 hours. Increasing the amount of LiCl increased the longevity of the shipping container.

EXAMPLE 10

Addition of Graphite to Desiccant

Figure 45:
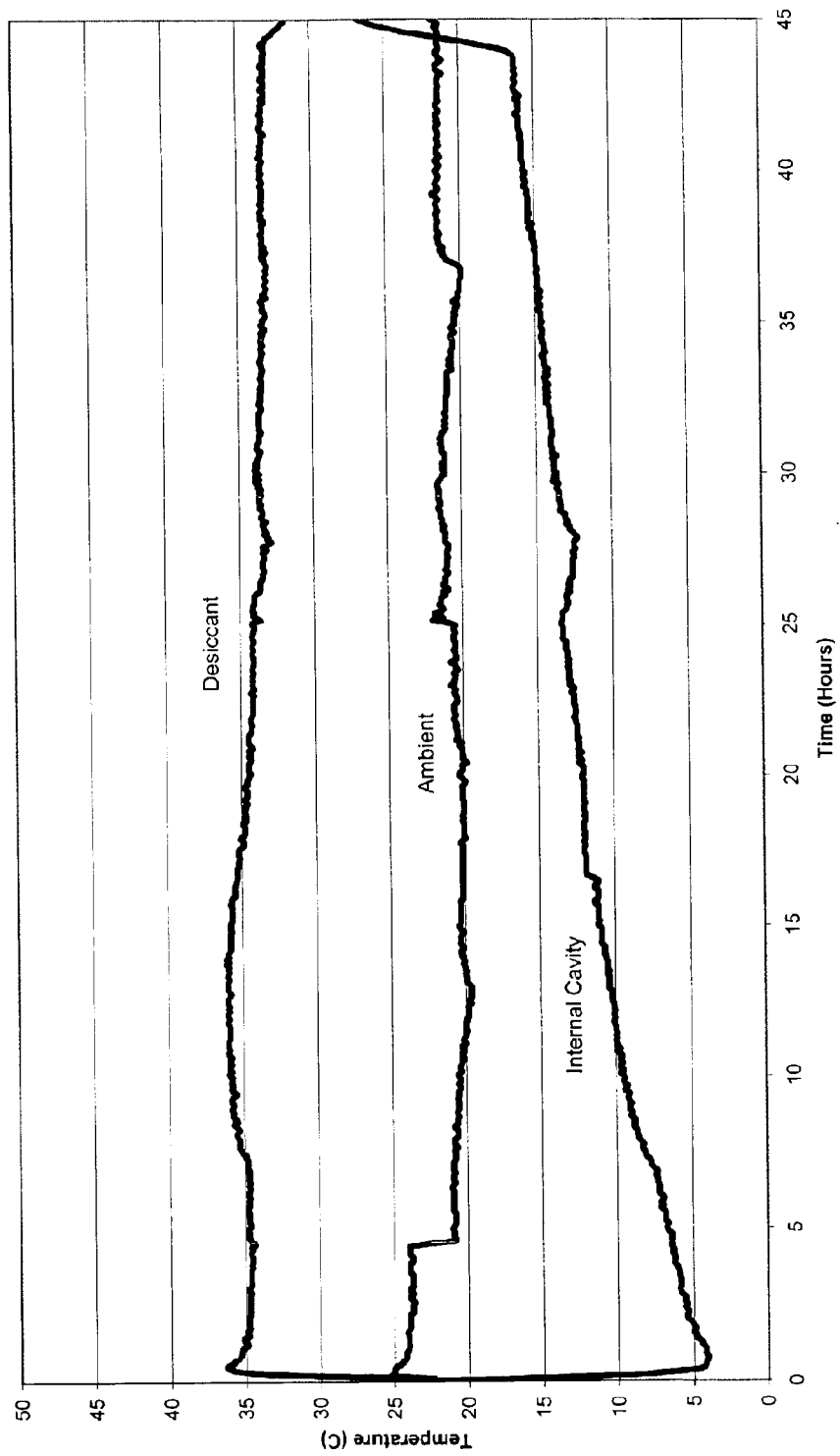
FIG. 45 illustrates the temperature of the desiccant and internal cavity of a temperature-controlled shipping container as a function of time in accordance with an embodiment of the present invention.
Figure 46:
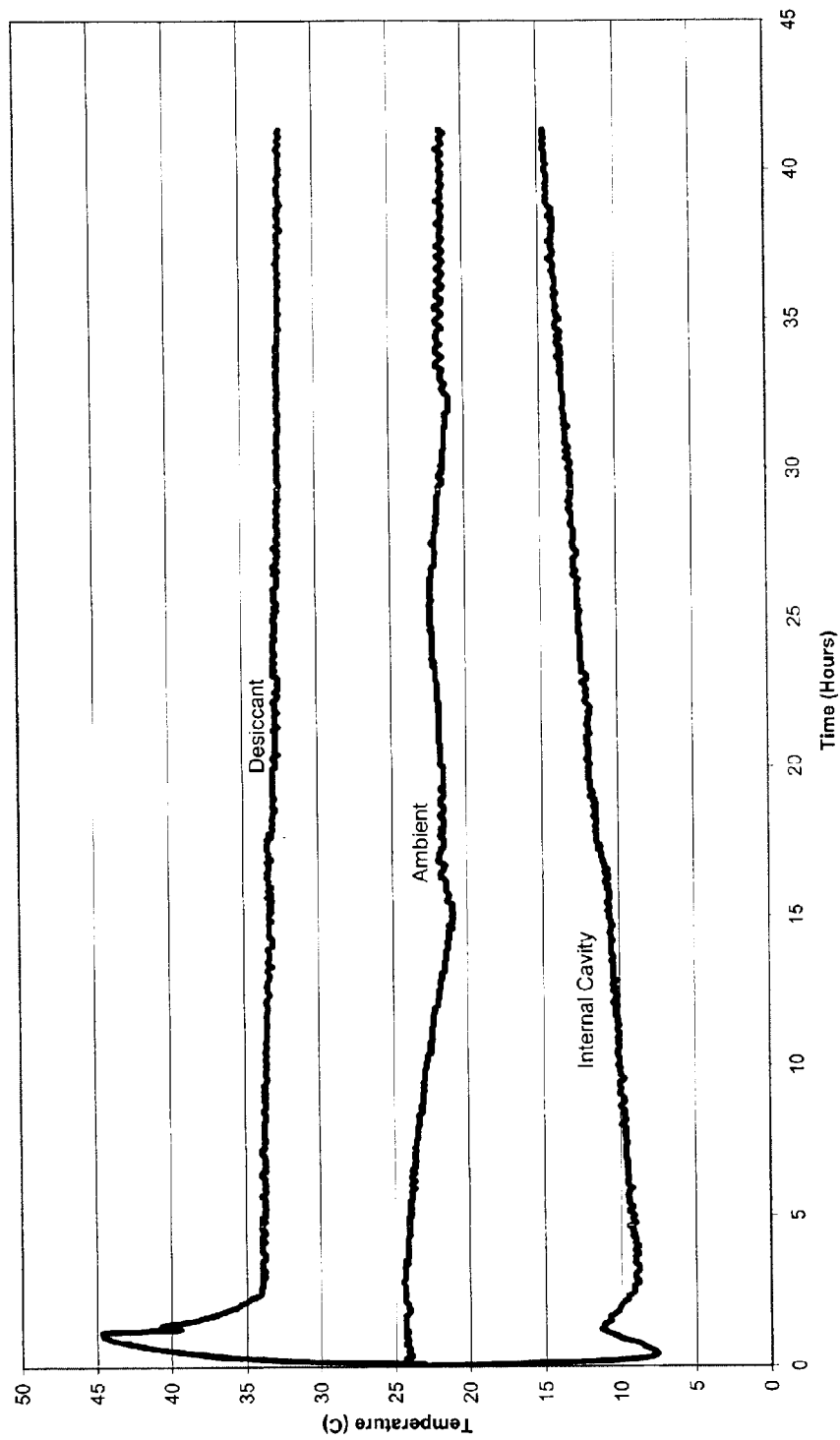
FIG. 46 illustrates the temperature of the desiccant and internal cavity of a temperature-controlled shipping container as a function of time in accordance with an embodiment of the present invention.

Two substantially identical temperature-controlled shipping containers were assembled, but Example 10A comprised an absorber with 80% weight desiccant and 20% weight Asbury Graphite (Asbury Carbons, Inc., Asbury, N.J.) as a thermally conductive material and Example 10B comprised an absorber with the same desiccant, but no graphite. The results are illustrated in FIG. 45 (Example 10B) and FIG. 46 (Example 10A). The cooling device with the graphite in the absorber had a longer useful cooling life than the cooling device without a thermally conductive material.

EXAMPLE 11

Varying Thickness of Thermally Insulating Material

Figure 47:
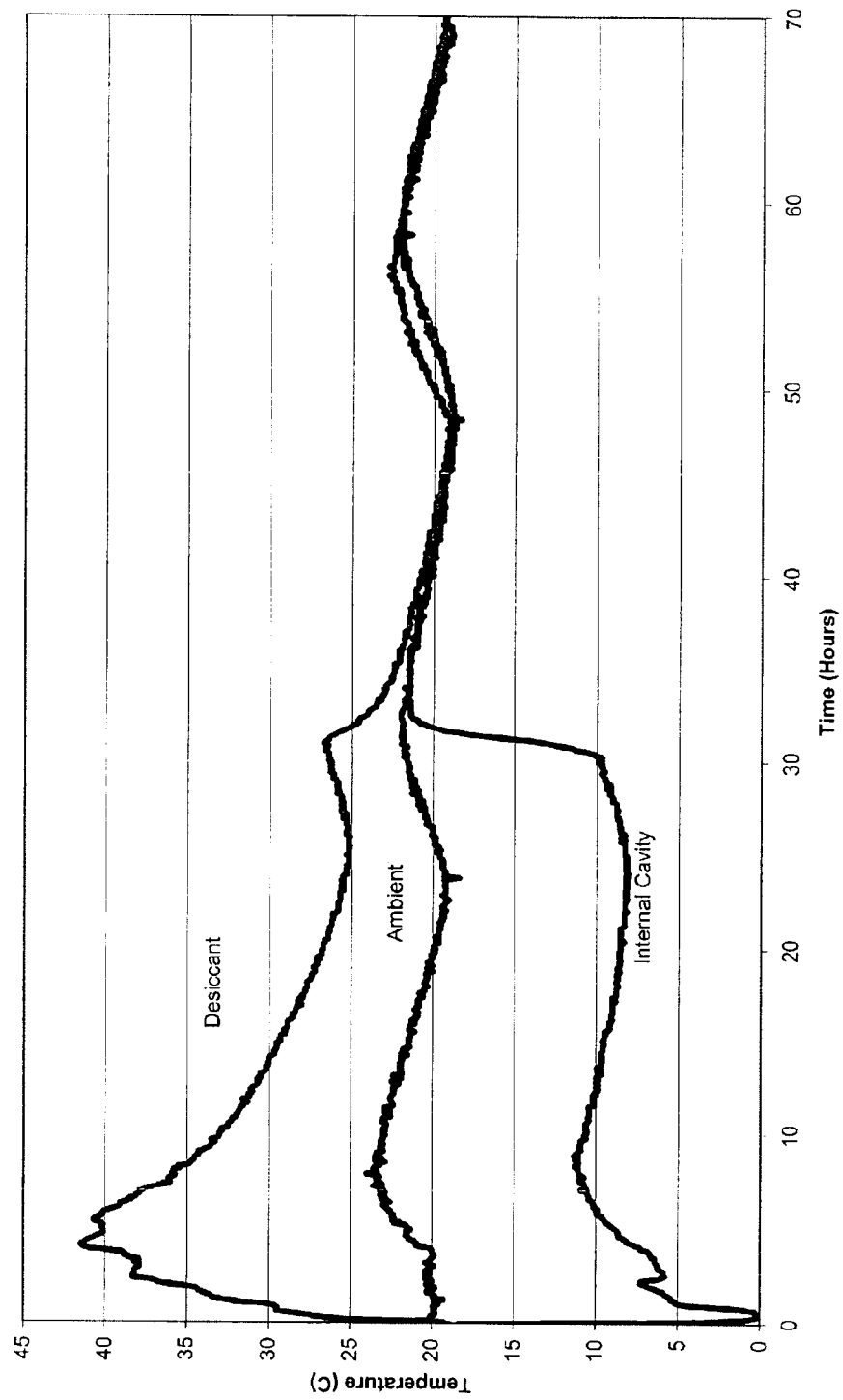
FIG. 47 illustrates the temperature of the desiccant and internal cavity of a temperature-controlled shipping container as a function of time in accordance with an embodiment of the present invention.
Figure 48:
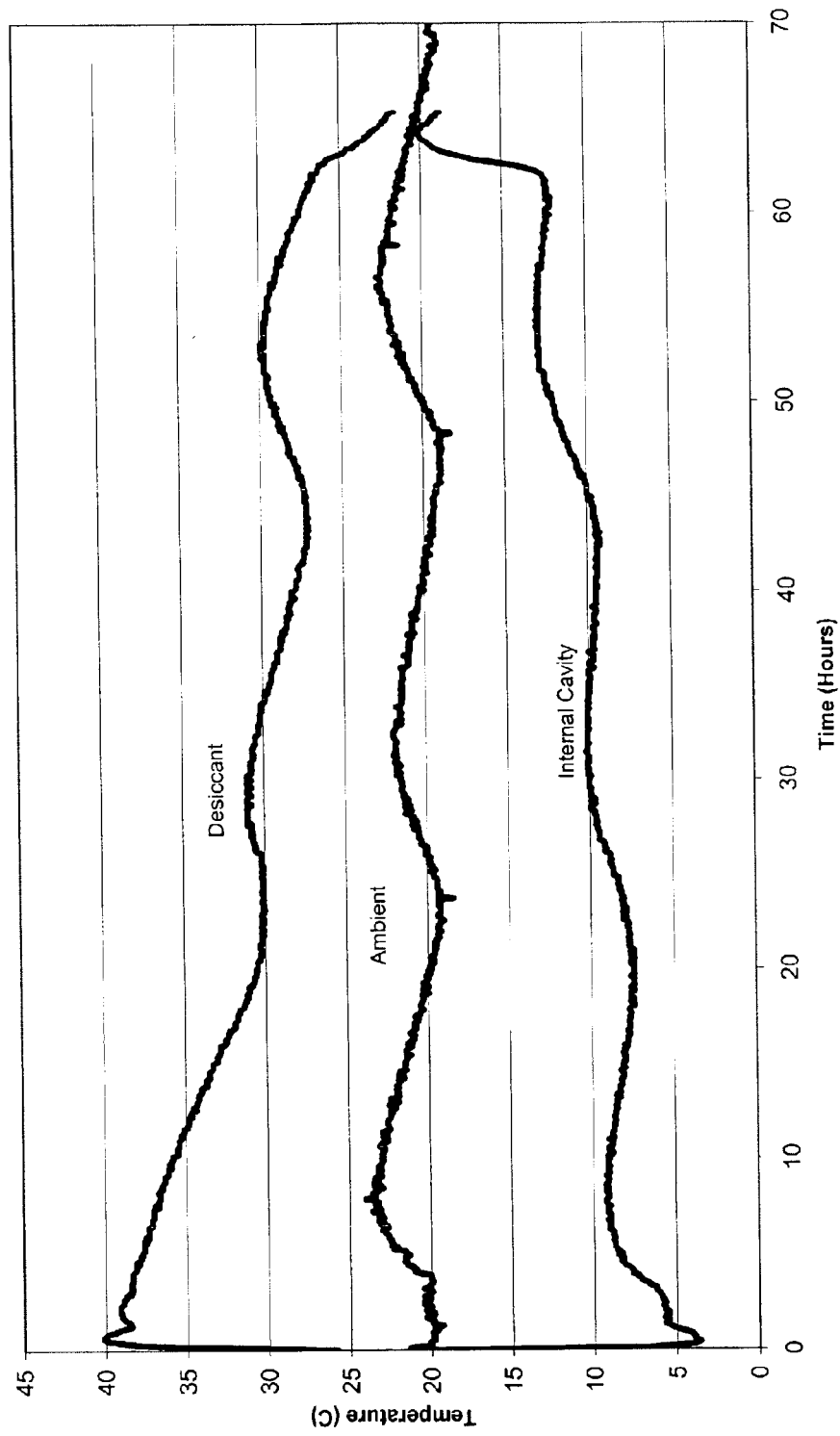
FIG. 48 illustrates the temperature of the desiccant and internal cavity of a temperature-controlled shipping container as a function of time in accordance with an embodiment of the present invention.
Figure 49:
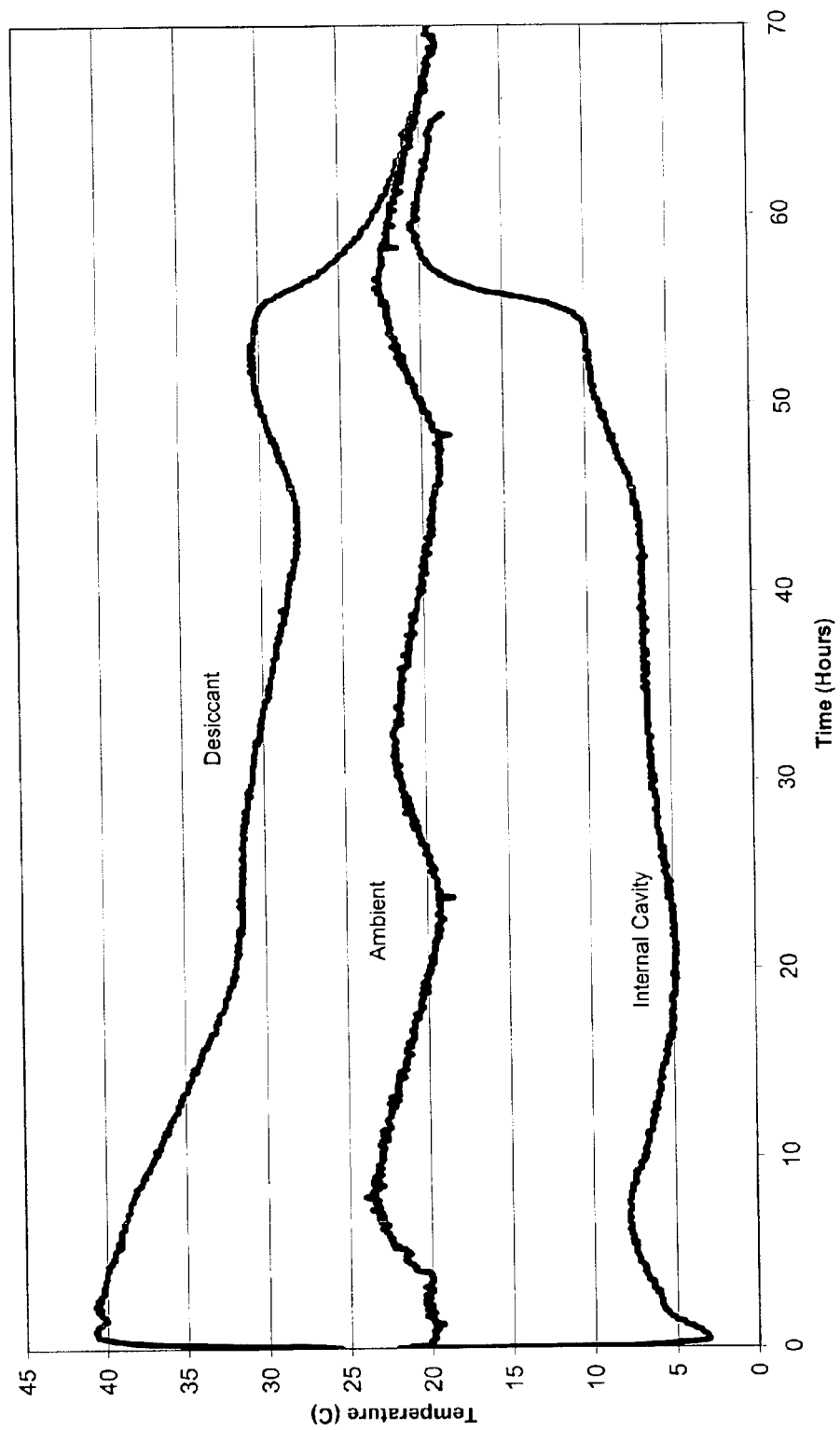
FIG. 49 illustrates the temperature of the desiccant and internal cavity of a temperature-controlled shipping container as a function of time in accordance with an embodiment of the present invention.

Three substantially temperature-controlled shipping containers were assembled. Example 11A included a vapor passageway thickness (INSTILL) of 1" (25.4 mm), Example 11B included a vapor passageway thickness (INSTILL) of 1½" (38.1 mm) and Example 11C included a vapor passageway thickness (INSTILL) of 2" (51 mm). The results are illustrated in FIG. 47 (Example 11A), FIG. 48 (Example 11B) and FIG. 49 (Example 11C). The best results were obtained with increased vapor passageway thickness.

While various embodiments of the present invention have been described in detail, is apparent that modifications and adaptations of those embodiments will occur to those skilled in the art. However, is to be expressly understood that such modifications and adaptations are within the spirit and scope of present invention.

What is claimed is:

1. A temperature-controlled container, comprising:
    a) a bottom container portion comprising a bottom wall and at least a first sidewall defining a cavity adapted to contain a product therein;
    b) a top container portion comprising a top surface and a bottom surface and adapted to combine with said bottom container portion to define a product cavity, said top container portion forming a top wall for said container;
    c) at least a first sorption cooling device disposed in and integral with said top portion and comprising an evaporator having a cooling surface for providing cooling to said product cavity and an absorber for absorbing vapor formed in said evaporator.

2. A temperature-controlled container as recited in claim 1, wherein said absorber is disposed to dissipate heat generated in said absorber outside of said product cavity.

3. A temperature-controlled container as recited in claim 1, wherein said absorber is integral with said top surface of said top container portion.

4. A temperature-controlled container as recited in claim 1, wherein said top portion comprises a plurality of sorption cooling devices.

5. A temperature-controlled container as recited in claim 1, wherein said bottom container portion comprises at least a second sorption cooling device incorporated therein and adapted to cool said product cavity.

6. A temperature-controlled shipping container as recited in claim 1, wherein said sorption cooling device is removable from said top container portion.

7. A temperature-controlled shipping container as recited in claim 1, wherein said container is in the form of a substantially rectangular box comprising four sidewalls.

8. A temperature-controlled shipping container as recited in claim 1, wherein said container is in the form of a cylindrical container having one contiguous sidewall.

9. A temperature-controlled shipping container as recited in claim 1, wherein at least said first sidewall comprises a material having a thermal conductivity of not greater than about 0.05 W/m·k.

10. A temperature-controlled shipping container as recited in claim 1, wherein said first sorption cooling device is a multiple-stage sorption cooling device.

11. A temperature-controlled shipping container, comprising:
    a) a container comprising at least a sidewall and top and bottom walls defining a cavity that is adapted to contain a product therein;
    b) a sorption cooling device, comprising:
        i) an evaporator having a cooling surface in thermal communication with said cavity and adapted to cool said cavity;
        ii) an absorber adapted to absorb vapor formed in said evaporator,
        iii) a vapor passageway disposed between said absorber and said evaporator for providing vapor communication between said absorber and said evaporator;
        iv) a reservoir adapted to supply a refrigerant liquid to said evaporator, and
        v) a liquid conduit for providing liquid communication between said reservoir and said evaporator,
    wherein said reservoir is in thermal communication with the exterior of said container and a vapor pressure within said reservoir causes the flow rate of refrigerant liquid to said evaporator to increase with an increase in ambient temperature.

12. A temperature-controlled shipping container as recited in claim 11, wherein said reservoir comprises a rigid housing, a first flexible pouch disposed within said rigid housing and enclosing a high vapor pressure substance therein and a second flexible pouch disposed within said rigid housing adjacent to said first flexible pouch and enclosing a refrigerant liquid therein, wherein said high vapor pressure substance causes said first flexible pouch to exert pressure on said second flexible pouch thereby assisting the flow of refrigerant liquid from said second flexible pouch to said liquid conduit.

13. A temperature-controlled shipping container as recited in claim 12, wherein said high vapor pressure substance has a higher vapor pressure than the vapor pressure of said liquid.

14. A temperature-controlled shipping container as recited in claim 12, wherein the vapor pressure of said high vapor pressure substance increases by about 600 percent with a temperature change from about 20° C. to about 55° C.

15. A temperature-controlled shipping container as recited in claim 12, wherein said high vapor pressure substance comprises a substance selected from the group consisting of ethanol, methanol, isopropanol, n-butane, isobutane, n-pentane, n-hexane and fluorocarbons.

16. A temperature-controlled shipping container as recited in claim 12, wherein the pressure within said second pouch is greater than the pressure within said evaporator immediately prior to activation of said liquid supply apparatus.

17. A temperature-controlled shipping container as recited in claim 12, where the pressure within said second pouch immediately prior to activation of said liquid supply apparatus is from about 50 mbar to about 300 mbar.

18. A temperature-controlled shipping container as recited in claim 11, wherein said refrigerant liquid comprises water.

19. A temperature-controlled shipping container as recited in claim 11, wherein said liquid conduit further comprises flow restriction means for restricting the flow of liquid from said reservoir to said evaporator.

20. A temperature-controlled shipping container as recited in claim 11, wherein the pressure within said evaporator immediately prior to activation of said liquid supply apparatus is not greater than about 20 mbar.

21. A temperature-controlled shipping container as recited in claim 11, further comprising an insert adapted to be inserted into said container, wherein said sorption cooling device is incorporated in said insert.

22. A temperature-controlled shipping container as recited in claim 11, wherein said reservoir is disposed outside of said cavity.

23. A temperature-controlled shipping container as recited in claim 11, wherein said container is in the form of a substantially rectangular box.

24. A temperature-controlled shipping container, comprising:
 a) a container having at least a sidewall and top and bottom walls defining a cavity that is adapted to contain a product therein;
 b) a sorption cooling device comprising an evaporator, an absorber and a vapor passageway disposed between said evaporator and said absorber wherein said evaporator is disposed in thermal communication with said cavity to provide cooling to said cavity and wherein said vapor passageway comprises a thermally insulative material having apertures therethrough to direct the flow of vapor from said evaporator to said absorber; and
 c) a liquid reservoir wherein liquid contained in said reservoir can be provided to said evaporator upon activation of said sorption cooling device.

25. A temperature-controlled shipping container as recited in claim 24, wherein at least one of said top, bottom and sidewall comprises corrugated cardboard.

26. A temperature-controlled shipping container as recited in claim 24, wherein at least one of said top, bottom and sidewall comprises a material having an thermal conductivity of not greater than about 0.05 W/m·K.

27. A temperature-controlled shipping container as recited in claim 24, wherein at least one of said top, bottom and sidewall comprises expanded polystyrene.

28. A temperature-controlled shipping container as recited in claim 24, wherein at least one of said top, bottom and sidewall comprises a vacuum insulation panel.

29. A temperature-controlled shipping container as recited in claim 24, wherein said vapor passageway comprises means for controlling passage of vapor through said vapor passageway.

30. A temperature-controlled shipping container as recited in claim 24, wherein said sorption cooling device has a mass energy density of at least about 100 W·hr/kg.

31. A temperature-controlled shipping container as recited in claim 24, wherein said sorption cooling device has a volume energy density of at least about 80 kW·hr/m$^3$.

32. A temperature-controlled shipping container as recited in claim 24, wherein said liquid comprises water.

33. A temperature-controlled shipping container as recited in claim 24, further comprising a vapor-permeable membrane disposed between said evaporator and said absorber.

34. A temperature-controlled shipping container as recited in claim 24, wherein said absorber comprises a desiccant.

35. A temperature-controlled shipping container as recited in claim 24, wherein said absorber comprises a desiccant capable of absorbing at least about 0.2 grams of liquid per gram of desiccant at a vapor pressure of about 10 mbar.

36. A temperature-controlled shipping container as recited in claim 24, wherein said absorber is at least partially disposed on an outer surface defined by said top wall, bottom wall and sidewalls whereby at least a portion of heat generated in said absorber is dissipated to the exterior of said container.

37. A temperature-controlled shipping container as recited in claim 24, wherein said container is in the form of a substantially rectangular box having four sidewalls.

38. A temperature-controlled shipping container, comprising:
 a) an insert comprising top, bottom and sidewalls defining a cavity within said insert;
 b) a sorption cooling unit incorporated in said insert wherein said sorption cooling unit comprises an evaporator positioned adjacent to or within said cavity in a manner to provide cooling to said cavity and further comprises an absorber, and
 c) a container substantially encasing said insert, wherein said absorber is at least partially disposed on an outer surface of said insert whereby heat generated in said absorber is dissipated to the exterior of said insert and wherein said shipping container comprises venting means for dissipating heat generated by said absorber.

39. A temperature-controlled shipping container as recited in claim 38, wherein said insert comprises expanded polystyrene.

40. A temperature-controlled shipping container as recited in claim 38, wherein said insert comprises at least a first vacuum insulation panel.

41. A temperature-controlled shipping container as recited in claim 38, wherein said container is fabricated from corrugated cardboard.

42. A temperature-controlled shipping container as recited in claim 38, wherein said sorption cooling device has a mass energy density of at least about 100 W·hr/kg.

43. A temperature-controlled shipping container as recited in claim 38, wherein said sorption cooling device has a volume energy density of at least about 80 kW·hr/m$^3$.

44. A temperature-controlled shipping container as recited in claim 38, wherein said absorber is at least partially disposed on an outer surface of said insert whereby heat generated in said absorber is dissipated to the exterior of said insert.

45. A temperature-controlled shipping container as recited in claim 38, wherein said container is in the form of a substantially rectangular box.

46. A temperature-controlled shipping container, comprising:
 a) a shipping container having at least a sidewall and top and bottom walls defining a cavity that is adapted to contain a product therein; and
 b) a sorption cooling device, comprising:
  i) a liquid reservoir adapted to contain a liquid;
  ii) an evaporator disposed in thermal communication with said cavity to provide cooling to said cavity;
  iii) an absorber, wherein said absorber is thermally isolated from said cavity; and
  iv) means for supplying liquid from said liquid reservoir to said evaporator upon activation of said device.

47. A temperature-controlled shipping container as recited in claim 46, wherein said absorber comprises a desiccant.

48. A temperature-controlled shipping container as recited in claim 46, wherein said means for supplying liquid comprises a valving mechanism.

49. A temperature-controlled shipping container as recited in claim 46, wherein at least one of said top, bottom and sidewalls comprises corrugated cardboard.

50. A temperature-controlled shipping container as recited in claim 46, wherein at least one of said top, bottom and sidewall comprises a material having a thermal resistance of at least about 1 K·m²/W.

51. A temperature-controlled shipping container as recited in claim 46, wherein at least one of said top, bottom and sidewalls has a thermal conductivity of not greater than about 0.05 W/m·k.

52. A temperature-controlled shipping container as recited in claim 46, wherein at least one of said top, bottom and sidewall comprises expanded polystyrene.

53. A temperature-controlled shipping container as recited in claim 46, wherein said reservoir comprises a liquid and wherein said liquid comprises water.

54. A temperature-controlled shipping container as recited in claim 46, wherein said absorber comprises a desiccant.

55. A temperature-controlled shipping container as recited in claim 46, wherein said absorber is in thermal communication with the exterior of said container.

56. A method for transporting a product requiring cooling in a shipping container, said shipping container comprising an external container made from corrugated cardboard, said method comprising the steps of:
  a) placing said product in a product cavity defined by at least top and bottom walls of a shipping container;
  b) placing a sorption cooling device in thermal communication with said cavity whereby said sorption cooling device is adapted to cool said cavity upon activation, said sorption cooling device comprising an absorber positioned so as to dissipate heat generated in said absorber outside of said product cavity;
  c) activating said sorption cooling device to initiate cooling of said cavity;
  d) transporting said shipping container from a first location to a second location; and
  e) removing said product from said cavity.

57. A method as recited in claim 56, wherein said product is a pharmaceutical product.

58. A method as recited in claim 56, wherein said product is a biological product.

59. A method as recited in claim 56, wherein said product is maintained at a temperature of not greater than about 8° C. during said transporting step.

60. A method as recited in claim 56, wherein said product is maintained at a temperature of not greater than about 8° C. for at least about 24 hours during said transporting step.

61. A method as recited in claim 56, wherein said product is maintained at a temperature of not greater than about 8° C. for at least about 48 hours during said transporting step.

62. A method as recited in claim 56, wherein said product is maintained at a temperature of not greater than about 8° C. for at least about 72 hours during said transporting step.

63. A method as recited in claim 56, wherein said shipping container is in the form of a shipping envelope.

64. A method as recited in claim 56, wherein said shipping container is in the form of a substantially rectangular box comprising four sidewalls.

65. A method as recited in claim 56, wherein said shipping container is in the form of a cylindrical container having one contiguous sidewall.

* * * * *